(12) United States Patent
Ahissar

(10) Patent No.: US 6,581,046 B1
(45) Date of Patent: Jun. 17, 2003

(54) NEURONAL PHASE-LOCKED LOOPS

(75) Inventor: Ehud Ahissar, Rehovot (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 0 days.

(21) Appl. No.: 09/168,672

(22) Filed: Oct. 9, 1998

Related U.S. Application Data

(60) Provisional application No. 60/061,575, filed on Oct. 10, 1997.

(51) Int. Cl.[7] .................................................. G06N 3/06
(52) U.S. Cl. ......................................... 706/15; 711/200
(58) Field of Search ............................ 706/15; 331/25; 711/200

(56) References Cited

U.S. PATENT DOCUMENTS

| | | | |
|---|---|---|---|
| 5,495,512 A | | 2/1996 | Kovacs et al. |
| 5,602,884 A | | 2/1997 | Wieczorkiewicz et al. |
| 5,610,705 A | * | 3/1997 | Brosnan et al. ............. 711/200 |
| 5,625,506 A | | 4/1997 | Dovek et al. |
| 5,677,802 A | | 10/1997 | Saiki et al. |
| 5,682,112 A | | 10/1997 | Fukushima |
| 5,705,956 A | * | 1/1998 | Neely ........................... 331/25 |

OTHER PUBLICATIONS

Hoppensteadt, F.C.; Izhikevich, E.M., Pattern recognition via synchronization in phase–locked loop neutral networks, Neural Networks, IEEE Transactions on, vol.: 11 Issue: 3, Center for Syst. Sci. & Eng., Arizona State Univ., Tempe, AZ, USA, p. 7.*

Liu Wei–Ping; Chiang Chin–Kan, Phase–locked loop with neurocontroller, SICE '98. Proceedings of the 37th SICE Annual Conference. International Session Papers, Jul. 29–31, 1998, pp.: 1133–1138.*

Tokunaga, M.; Mori, S., Digital neuron model with DPLL for associative memory, Circuits and Systems, 1990., IEEE International Symposium on , May 1–3, 1990, pp.: 1069–1072 vol. 2.*

Judith Dayhoff, Pattern recognition with a pulsed neural network, Proceedings of the conference on Analysis of neural network applications, May 1991.*

Physica D 75 (1994) 103–128 "Dynamics of functional coupling in the cerebral cortex: an attempt at a model–based interpretation" Ad Aertsen, Michael Erb, Guenther Palm.

* cited by examiner

Primary Examiner—Wilbert L. Starks, Jr.
(74) Attorney, Agent, or Firm—Martin Fleit; Paul D. Bianco; Fleit Kain Gibbons Gutman & Bongini

(57) ABSTRACT

A neuronal phase-locked loop (NPLL) that can decode temporally-encoded information and convert it to a rate code is based on an algorithm similar to that of the electronic PLL, but is a stochastic device, implemented by neural networks (real or simulated). The simplest embodiment of the NPLL includes a phase detector (that is, a neuronal-plausible version of an ideal coincidence detector) and a controllable local oscillator that are connected in a negative feedback loop. The phase detector compares the firing times of the local oscillator and the input and provides an output whose firing rate is monotonically related to the time difference. The output rate is fed back to the local oscillator and forces it to phase-lock to the input. Every temporal interval at the input is associated with a specific pair of output rate and time difference values; the higher the output rate the further the local oscillator is driven from its intrinsic frequency. Sequences of input intervals, which, by definition, encode input information, are thus represented by sequences of firing rates at the NPLL's output. The NPLL is an adaptive device which can deal with signals whose exact characteristics are not known in advance and can adapt to changing conditions.

62 Claims, 29 Drawing Sheets

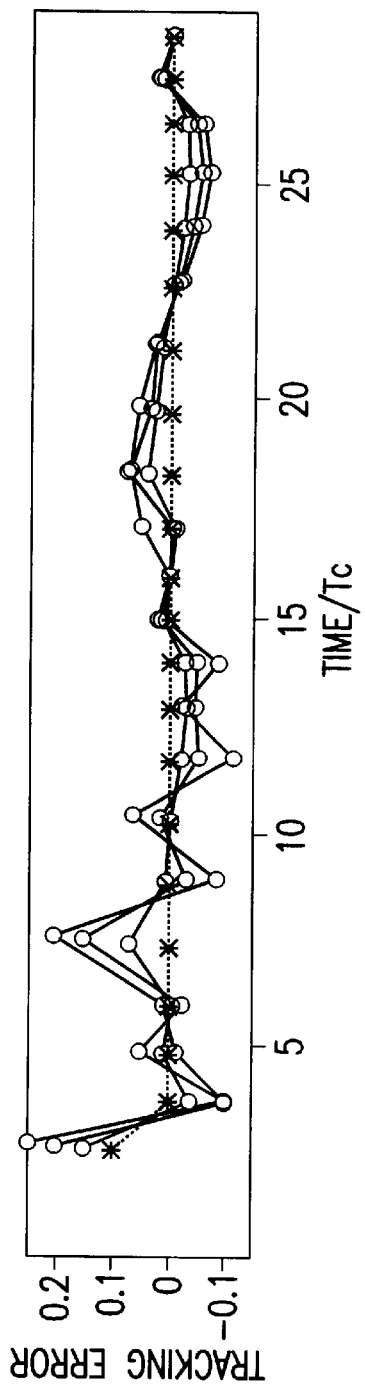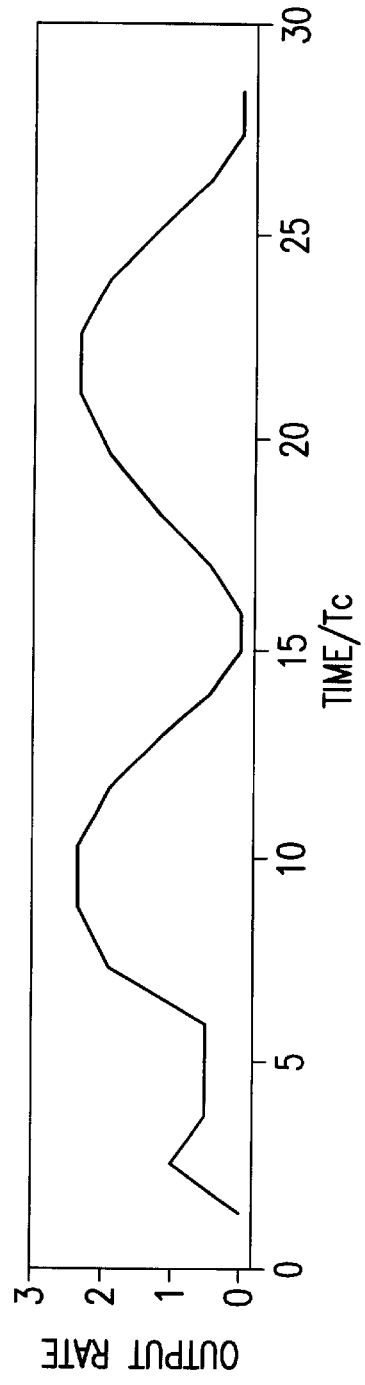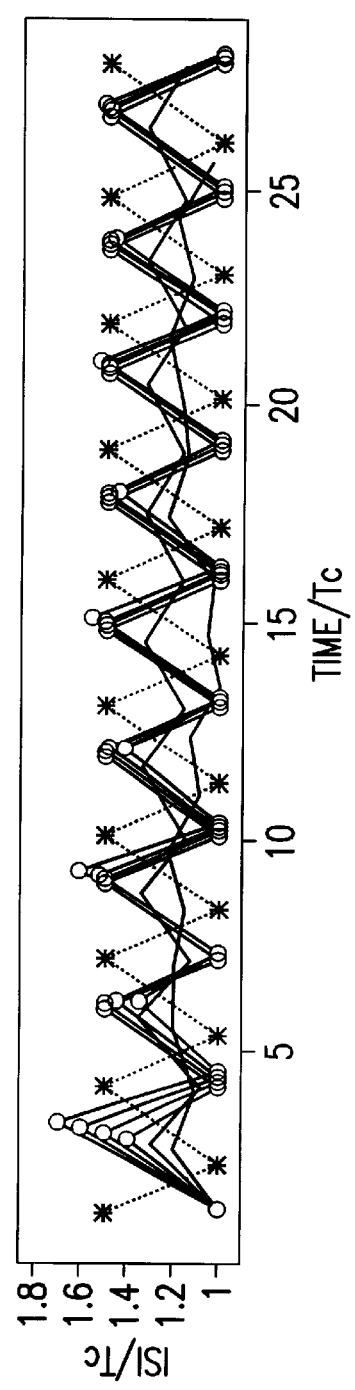

$$V(t) = g_v(R_{max} - R_{dc}(t)) + V_{other}$$

$$R_{dc}(t) = g_{pll}(T_i(t) - T_c)$$

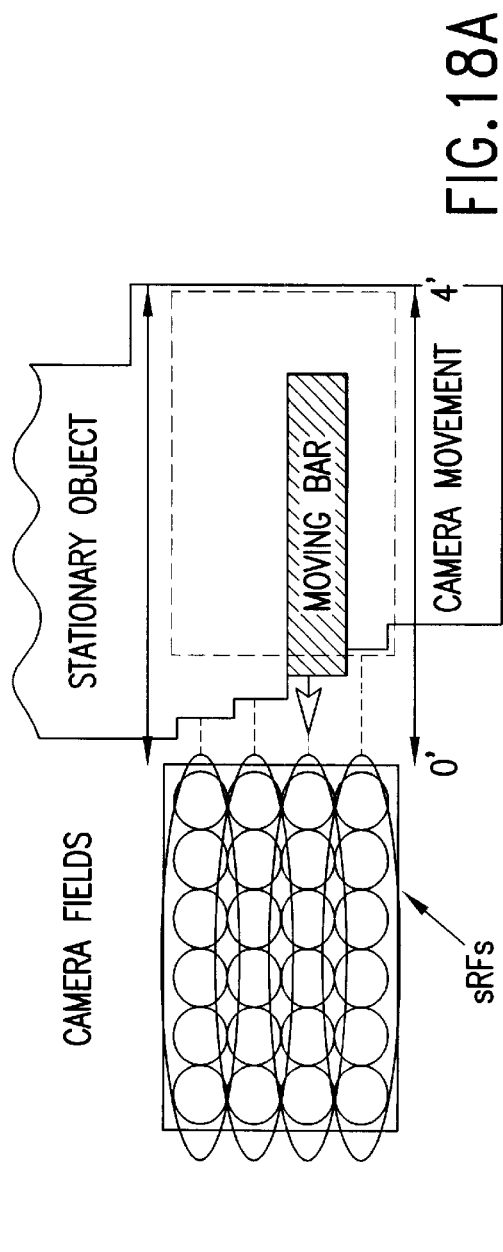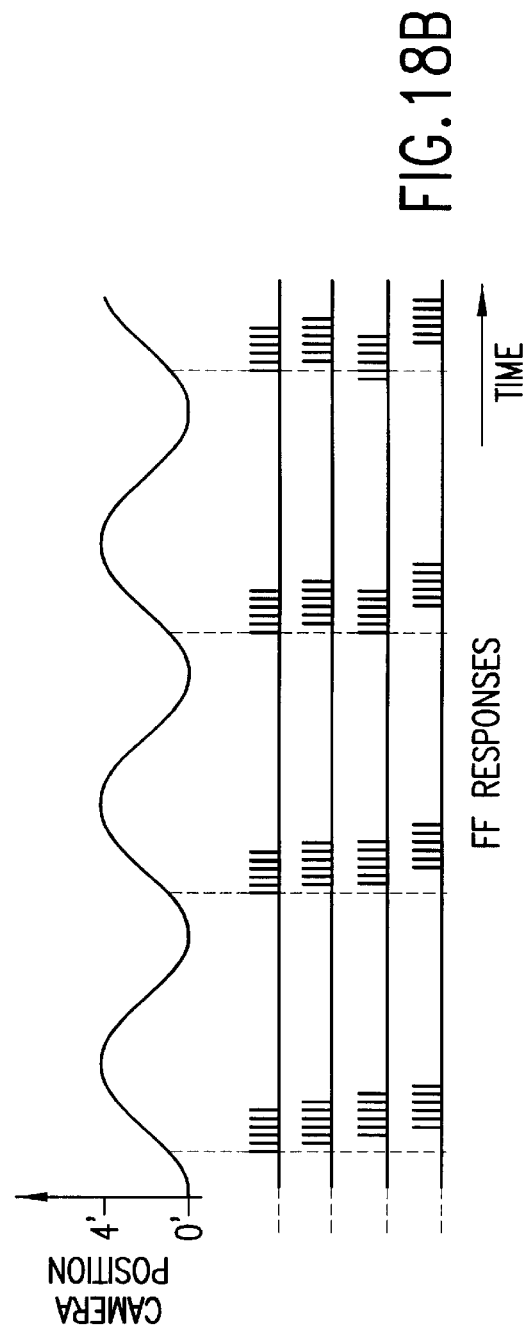
FIG. 18A
FIG. 18B

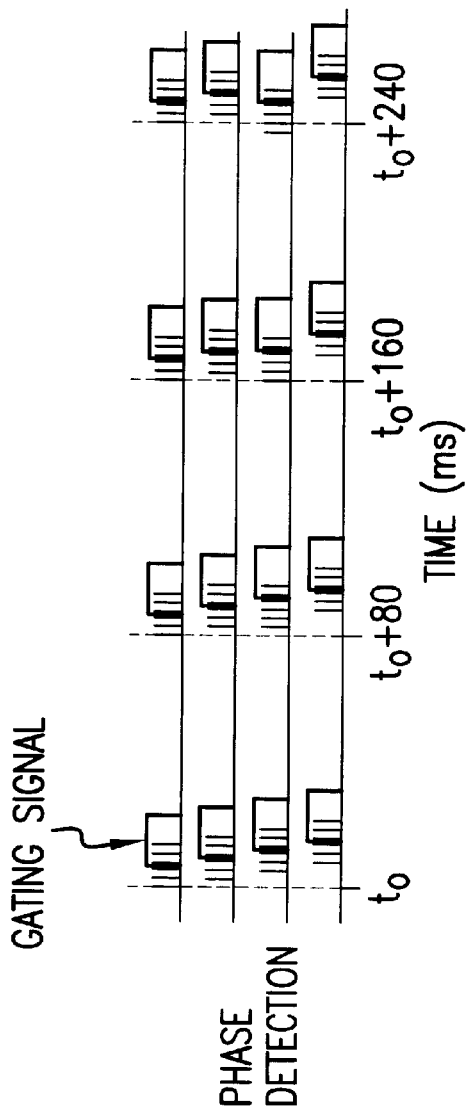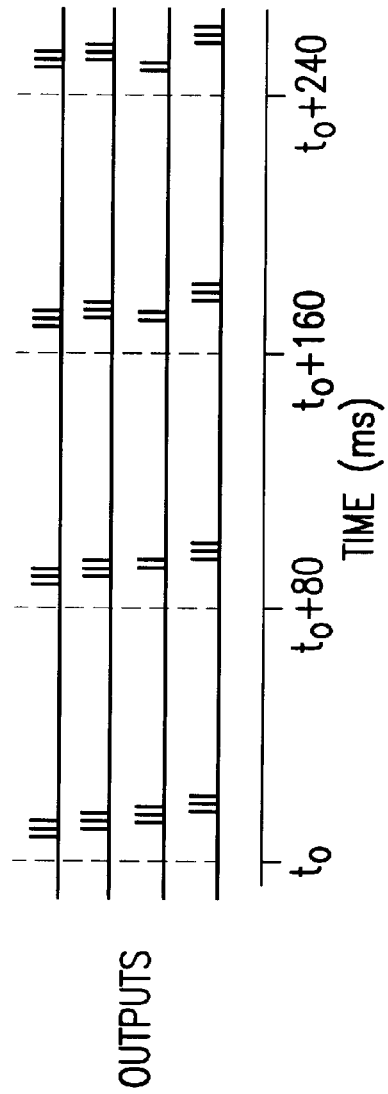

NEURONAL PHASE-LOCKED LOOPS

This application claims priority under 35 U.S.C. §119(e) and 37 C.F.R. §1.78(a) (3) based on the now abandoned provisional application Ser. No. 60/061,575, filed Oct. 10, 1997.

FIELD OF THE INVENTION

This invention is directed to a novel device, called a "neuronal phase-locked loop" (NPLL), that can decode temporally-encoded information and convert it to a rate code.

A phase locked loop ("PLL") is a circuit for synchronizing a local variable or rate controlled oscillator with the phase of a transmitted signal.. Electronic embodiments of PLL's are well known and widely used, for example, in communications technology.

The NPLL is based on an algorithm similar to that of the electronic PLL, but utilizes a totally different implementation. It is a stochastic device, implemented by neural networks (real or simulated). Nueral systems in general, while relatively recently developed, are well known to those skilled in the art. See for example, U.S. Pat. No. 4,937,872 to Hopfield et al.

The simplest form of the NPLL includes a phase detector (that is, a neuronal-plausible version of an ideal coincidence detector) and a controllable local oscillator that are connected in a negative feedback loop. The phase detector compares the firing times of the local oscillator and the input and provides an output whose firing rate is monotonically related to the time difference. The output rate is fed back to the local oscillator and forces it to phase-lock to the input. Every temporal interval at the input is associated with a specific pair of output rate and time difference values; the higher the output rate the further the local oscillator is driven from its intrinsic frequency. Sequences of input intervals, which by definition encode input information, are thus represented by sequences of firing rates at the PLL's output.

Unlike the electronic PLL, the NPLL is an adaptive device which can deal with signals whose exact characteristics are not known in advance and can adapt to changing conditions. It is ideal for low frequency applications (1–200 Hz). NPLLs can be applied to artificial, perceptual-like, operations such as auditory speech recognition, visual and tactile object localization, texture identification and motion detection.

BACKGROUND OF THE INVENTION

The distinction between rate and temporal coding is not always clear. For example, temporal coding is sometimes regarded as rate coding with a fine time resolution. Herein "temporal coding" will refer to coding in which the exact time of every spike (pulse) is informative. Whereas, rate coding will be associated here with a temporal window (the "rate-bin"), within which the information is carried by the average firing rate over the entire temporal window, and the exact temporal information is not informative. The rate-bin is usually determined by the integration times of the 'read-out' mechanisms. A "rate-encoded" signal can thus be described by a series of numbers each of which represents the average firing rate in a single rate-bin (Appendix A.1). Fluctuations in the average firing rate of a neuron over different rate-bins are considered here as fluctuations of rate-encoded information, and not as temporal coding, as has been considered previously.

A "temporally-encoded" signal is described by a series of numbers each of which represents either the timing of a single spike or a single inter-spike-interval (hereinafter referred to as "ISI"; see Appendix A.1) . The information contained in the spiking times can be presented in different ways, two of which are depicted in FIG. 1: M(n) describes the deviations of the actual train from an imaginary, ideally periodic, "carrier" train, and I(n) describes the ISI's.

FIG. 1 also demonstrates the distinction between temporal and rate coding; the spike train in this example carries a significant amount of information if a temporal coding is assumed (FIG. 1a), but almost no information if a rate coding, with a particular rate-bin, is assumed (FIG. 1b). Practically, this distinction is important for reading out the information of the spike train. A readout mechanism based on rate will lose more and more information as its integration time increases. To readout temporally-encoded information, on the other hand, a rate-based mechanism needs to employ integration times shorter than half of the input temporal resolution, an implementation that is both non-efficient and, with fine input resolution, not practical for neuronal application. The other alternative is to utilize pre-IQ processing by time-sensitive mechanisms, i.e., mechanisms that produce populations of spikes, where the number of spikes in a population directly represents the ISI at the input and the exact times of these output spikes is not important.

In mammals, sensory information is encoded by both rate and temporal coding. Whereas spatial static information is usually encoded by rate, dynamic information, that is generated during movements of either the stimulus or the sensory organ, is encoded also by temporal cues (see, for example, encoding of spatial intervals by ISIs of tactile and visual neurons). In contrast, motor control is assumed to predominately utilize rate-coding already at the early stage of motor planning. Thus, information carried by the sensory temporal components is likely translated, by neuronal circuits in the brain, to rate-encoded signals that are "readable" by the motor system. If such a translation occurs early in a sensory pathway, the translation would also facilitate integration of temporally-encoded information with other, rate-encoded, sensory information. This necessity for translation was elegantly demonstrated by Mountcastle and his colleagues, over the last few decades.

A mechanism that utilizes neuronal delay-lines to transform temporal coding to rate coding has been suggested. Such delay-lines exist in the electric sensory system of electric fishes and in the subcortical auditory systems of birds and mammals. These delay-lines are probably utilized to decode temporal disparities, which in the submillisecond and low millisecond ranges can determine interaural time differences and echo delays, respectively. As the delay increases above a few hundred microseconds, implementations of delay-lines require multiple neuronal elements and the accuracy decreases. A mechanism that Aid utilizes synaptic time-constants appears more suitable to decode temporally-encoded information in the millisecond range. Both these mechanisms describe "passive", open-loop decoding schemes that are based on classification of different ISI's according to their interaction with fixed neuronal temporal features.

The present inention, on the other hand, provides an "active", closed-loop decoding mechanism, which dynamically adapts its working parameters to match the incoming signal. This model, the neuronal phase-locked loop (NPLL) model, is based on a local oscillator "measuring" the instantaneous temporal period of the input by comparing it to its own period. During decoding, the local oscillator updates its period according to the result of the comparison, such that it remains tuned to the changing input.

The PLL is a well-known mechanism in electrical engineering and is often used for the decoding of phase-modulated signals. The present invention is based on continuous-time electronic PLLs, modified to fit discrete-time NPLLS. The implementation is totally different than electronic implementations and is based on neuronal, or neuronal-like, elements organized in small networks.

Other objects, advantages and novel features of the present invention will become apparent from the following detailed description of the invention when considered in conjunction with the accompanying drawings.

BRIEF DESCRIPTION OF THE DRAWINGS

FIG. 2b is a graphic representation of transfer functions of the NPLL of FIG. 2a;

A FIG. 6b shows the output of each of the respective phase detectors in FIG. 6a;

FIG. 10b is a graphic representation of transfer functions associated with FIG. 10a;

FIG. 18a is a schematic illustration of the temporal encoding and decoding of a stationary object and a moving bar;

FIG. 18b illustrates the response of horizontally oriented sRFs in FIG. 18a;

FIG. 18d is a conceptual graphic depiction of the two basic transfer functions of the NPLL shown in FIG. 18a;

FIG. 18e illustrates an optimal gating by means of phase detectors;

FIG. 18f shows the output code of the NPLL decoder;

DETAILED DESCRIPTION OF THE DRAWINGS

Neuronal PLLs appear suitable to decode temporally-encoded information in the range of a few to a few hundred milliseconds. However, decoding by a single NPLL is usually limited to phase modulations that are on the order of its intrinsic period. Thus, decoding in different frequency ranges requires different NPLL circuits and decoding of large modulations requires an ensemble of several NPLLs. First, the mechanism of a single NPLL is described in detail.

Depending on the parameters of a stimulus, sensory firing can implicate different temporal forms. For example, the peripheral tactile response to a moving grating can be one spike per bar or a burst of a variable length per bar. For clarity, simple temporal forms will be assumed here. Sensory firing with bursts does not affect the principles of decoding utilized by the invention.

The NPLL structure

Figure 2A:
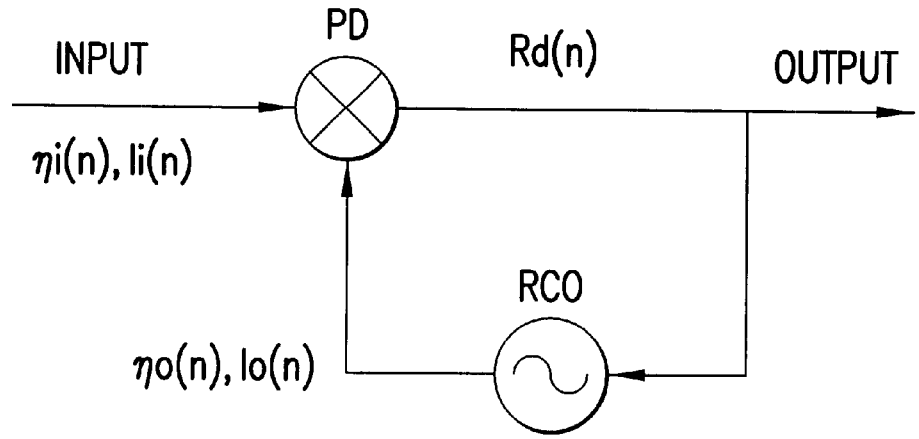
FIG. 2a is a schematic illustration of a first order neuronal NPLL.

The simplest version of an NPLL is based on a first-order PLL. As shown in FIG. 2a, a first-order neuronal NPLL is composed of two elements: a Phase Detector (PD) and a Rate-Controlled Oscillator (RCO). The RCO is a local oscillator whose output frequency (and thus, the timing of its output spikes) is controlled by the firing rate of its input; if the input is zero, the RCO will fire at its intrinsic frequency. The more excitatory the input, the higher the RCO's output frequency and the more inhibitory the input, the lower is the RCO's frequency. The PD compares the phase (i.e., the time-of-arrival) of each of the spikes of a repetitive input against the phase of the RCO spikes and produces an output that is a "measure" of (i.e., its firing rate is proportional to) the phase difference. The RCO can be regarded as a rate-to-temporal code converter and the PD as a temporal-to-rate converter. The PD's output ($R_d$) is fed into the RCO's input and changes the RCO's firing phase in the direction that will cancel the phase difference (in fact, cancel any deviation from some constant phase difference; see below), i.e., establishing a negative feedback loop (Appendix A.2). Note that in the following description 'phase difference' and 'temporal difference' are interchangeable terms, both expressed in time units.

The NPLL is "locked" when the RCO's instantaneous frequency equals the input's instantaneous frequency. If the latter is constantly different than the intrinsic oscillator frequency, there must be a constant driving term, and hence a constant phase difference between the input and the oscillator (Appendix A.4). While locked, the RCO generates one and only one oscillation cycle for each input cycle. For simplicity, assume that a single spike represents a single cycle (even though a short burst or an ensemble of single spikes over a cell population are also possible). In the absence of noise and with ideal NPLLs (Appendix A.3), the RCO's output spike train is a perfect replica of the input spike train, but with a delay of one cycle plus a constant phase-shift. This is because, with ideal NPLLs, any deviation of the input from the expected ISI is followed by an identical deviation of the RCO's ISI at the next cycle.

The decoding (or recoding) of the input information is based on the delayed internal replica of the input spike train. As long as the NPLL is locked, the RCO's ISI has to be modulated by the same information that modulates the input ISI. Thus, the input information is represented by the rate-encoded signal that drives the RCO (Appendix A.4). This signal is the NPLL's output. The same decoding mechanism can be described differently, at least for ideal NPLLs: every input ISI is "stored" as the next RCO's ISI. Thus, at each cycle, an input ISI is compared with the input's previous ISI and the change, which is the encoded information, is detected by the PD and presented as a rate-encoded signal (Appendix A.4). While the PD's (=PLL's) output is affecting the RCO at every cycle, it can be integrated over several cycles by a potential readout mechanism. The readout integration time, or rate-bin, determines the maximal rate of information that can be represented internally; higher rates require shorter integration periods. Note that unlike the frequency, the phase of the input is not re-encoded by rate but rather preserved by the firing phase of the NPLL's output which is phase-locked to the input. (See, for example, FIG. 6b, disclosed below.)

Thus, the output of the NPLL is a rate-encoded signal that is proportional to the difference between the RCO's intrinsic period and the input instantaneous ISI. This signal can be decomposed to two components: a DC component ($R_{dc}$), which represents the difference between the RCO's intrinsic period and the average input ISI, and an AC component ($R_{ac}$) which represents the dynamic input information (Appendix A.4). An ideal NPLL should be able to track any change in the input ISI within one cycle. Practical NPLLs, however, are limited in both their working ranges, i.e., the ranges of trackable input frequencies (Appendix A.2), and lock-in times, i.e., the time required for moving into a new locked state. The lock-in dynamics, which is mainly determined by the loop gain (Appendix A.2), limits the maximal rate of change in the input frequency that a given NPLL can track and decode.

NPLLs of higher than first order have low-pass filters between the PD and RCO. Such filters improve the loop performance, especially in noisy conditions. Low-pass filtering, also referred to as input integration, is an elementary feature of nerve cells. It is assumed that the RCO utilizes such filtering in its input stage. However, for simplicity, higher order circuits will not be discussed here, since the first order version is sufficient for code translation.

Implementations of NPLLs

The PLL algorithm of neuronal circuits can be implemented in several ways. Herein a basic implementation of each of two families of implementations, excitatory PLLs (ePLLs) and inhibitory PLLs (iPLLs); is described in detail in its simplest form. In these descriptions, only essential components are included (a case that does not actually occur in the highly complicated brain). Such implementations in should be regarded as building blocks that can be used separately or in combination in the brain, or in a processing system patterned after the brain. Accordingly, the principles of operation of PLL circuits are discussed.

Figure 3A:
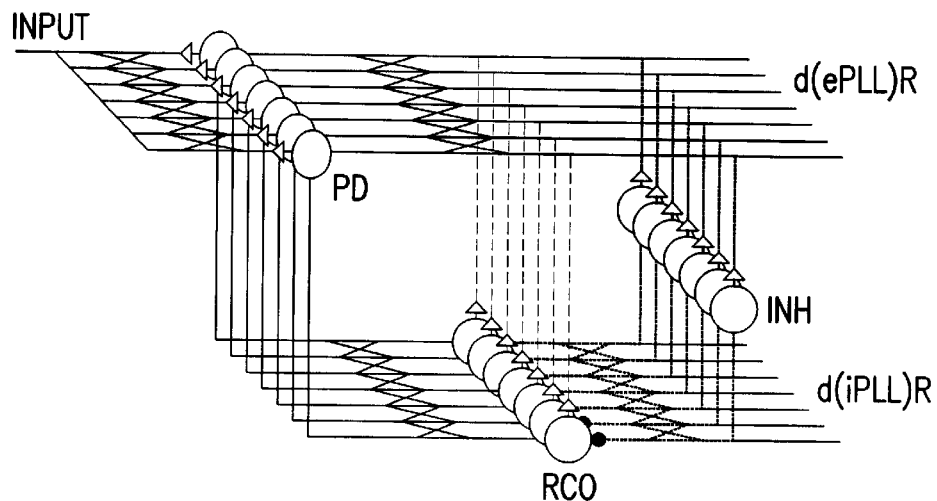
FIG. 3a is a schematic illustration of a single NPLL.
Figure 3C:
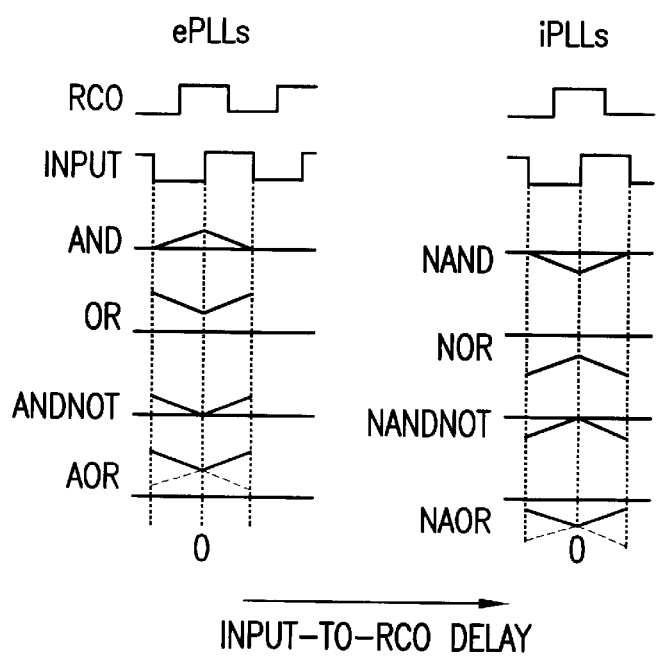
FIG. 3c shows waveforms which illustrate the operation of the configurations of FIG. 3b.
Figure 3B:
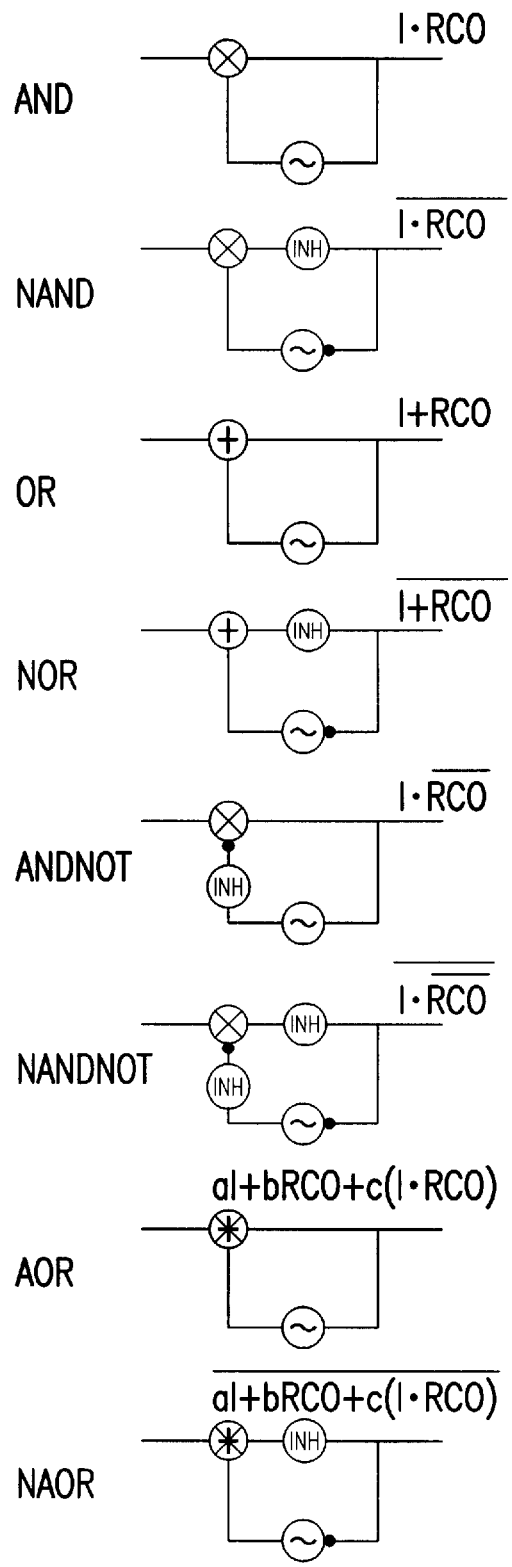
FIG. 3b shows schematic representations of NPLL circuits in various logic configurations.

An ePLL is an implementation in which the PD excites the RCO (FIG. 3a, dashed lines; FIG. 3b, AND, OR, ANDNOT and AOR), while iPLLs are those implementations in which the PD inhibits the RCO (FIG. 3a, dotted lines; FIG. 3b, NAND, NOR, NANDNOT and NAOR). Herein, AND-like and NAND-like neuronal implementations are described in detail. Thus, ePLL will refer to an AND-like and iPLL to a NAND-like implementation, unless mentioned otherwise.

The basic ePLL is a straight forward implementation of the NPLL algorithm (FIG. 2) and involves two sets of neurons: the PD and RCO sets (FIG. 3a). The basic iPLL, in addition to these two sets of neurons, involves a set of inhibitory cells (INH). In both ePLL and iPLL, every component is implemented by a set of neurons that are similar to each other. These sets of neurons are interconnected by "diverging/converging" pathways, i.e., every cell in the projecting set sends axons to many cells in the target set and every cell in the target set receives synapses from many cells in the projecting set. The set of RCOs, of a given NPLL, is regarded as a set of coupled oscillators, that oscillate at the same frequency. The redundancy of the RCO and INH cells has no specific role in the present invention, beyond improving robustness. However, as discussed below, the efficiency of phase detection by a PD which is composed of a population of cells, is significantly better than the efficiency of a single coincidence detector. The number of coincidence-detecting neurons that compose the PD set defines the "width" (w) of a single NPLL. Arbitrarily, it is assumed that the other neuronal sets (INH and RCO) have the same width. A reasonable estimation for the minimal value of w can be derived from the number of peripheral fibers activated by a "point" stimulus. In the tactile case, for example, this number is around 20.

Implementations of PDs

In principle, each neuron can operate as a degenerated PD. When functioning as a "coincidence detector", a cell will fire only if a certain amount of its inputs will be synchronously active, i.e., a single neuron responds to ("detects") a zero or near zero phase difference among its inputs. Thus, to serve as a PD, the neuron's inputs should be predominantly organized into two groups, with the inputs always being temporally coordinated within each group. The neuron will function as an AND-like zero-phase detector if its threshold is set such that neither of these two groups of inputs is able to activate the cell by itself, but there is a high probability that synchronous operation of both inputs will activate it. Coincidence detection, however, is not sufficient for a PD. A usable PD should have a range within which its output is a monotonic increasing or a monotonic decreasing function of the phase difference (Appendix A.2).

A Single Neuron AND-like PD

Figure 4A:
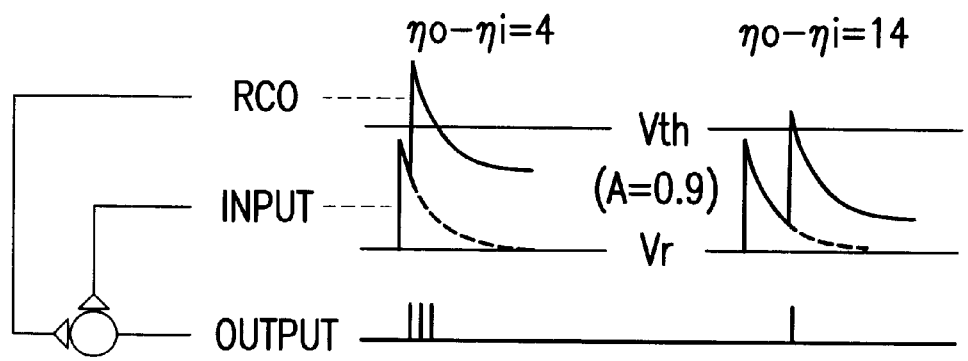
FIG. 4a shows a single cell phase detector configuration.

The PD capacity of a single neuron depends on the non-zero time constants of its inputs. If a neuron receives two major inputs, the range of delays that it will be able to resolve (i.e., its working range) will depend on the amplitude and time constants of the two inputs. For example, suppose the excitatory post-synaptic potentials (EPSPs) of both inputs, when measured at the axon hillock, exhibit short rising times, long decays and relatively strong amplitudes. (FIG. 4a). The longer the delay between the inputs (i.e., the phase difference), the shorter the period in which the membrane potential will be above threshold, and thus, the fewer the spikes that will be emitted. Thus, the output rate of a single neuronal PD is generally a monotonic decreasing function of the input phase difference.

FIG. 4a illustrates a single-cell PD. The two inputs, which are massive, generate two giant EPSPs with exponential decays (A=0.9, τ=10 ms). More spikes are emitted when the overlapping time is larger, i.e., when there is a smaller time difference between the inputs. $V_r$ is the resting voltage; and $V_{th}$, is the threshold voltage.

For frequencies near 30 Hz, for example, the working range of an appropriately tuned neuron covers about half a cycle (Appendix A.5), which is satisfactory for a PD. However, the refractoriness of a single neuron results in a poor output resolution, usually poorer than 2 ms. At the same time, it should be noted that tracking a frequency of 30 Hz with an error less than 1 Hz requires the RCO to be informed about deviations as small as 1 ms in the input spike train. A single neuron, with a refractory period of 2 ms or more cannot provide this resolution. In addition, single-cell reliability is limited, and noise will significantly influence the single neuron PD's performance.

A Population AND-like PD

Figure 4B:
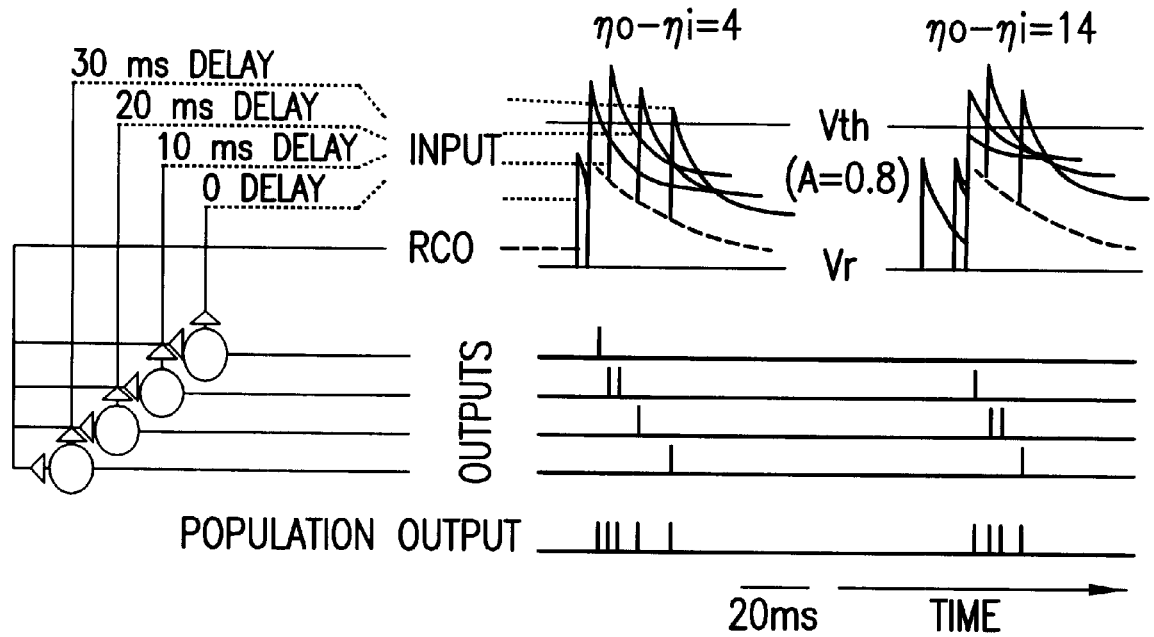
FIG. 4b shows a population phase detector including a plurality of cells.

To increase a PD's resolution, a number of single-cells, say w, can be arranged in parallel such that all receive the same input, but with different delays (FIG. 4b). Let $T_{wo}$ denote the effective width (Appendix A.5) of the RCO's output and $T_{wi}$ the effective width of the Input. The most efficient phase detection occurs with $T_{wo}=T_{wi}$. In this case, every phase difference between 0 to $T_{wo}$ produces a different population sum (Appendix A.1) at the PD's output. Since the population sum is directly related to the overlap period, this dependency is monotonic. If the input delays are generated by constant and reliable delay line, the phase differences will be also coded by the PD's population vector (Appendix A.1). Both "sum PD" and "vector PD" are valid PD implementations.

FIG. 4b a population PD—a population of cells, in which each cell receives a delayed version of the Input, each after a different delay. The RCO signal decays slower (τ=33 ms) than the Input and arrives simultaneously to all cells. As the time difference between the arrival of the RCO signal and the Input increases, fewer cells will be activated.

Figure 4C:
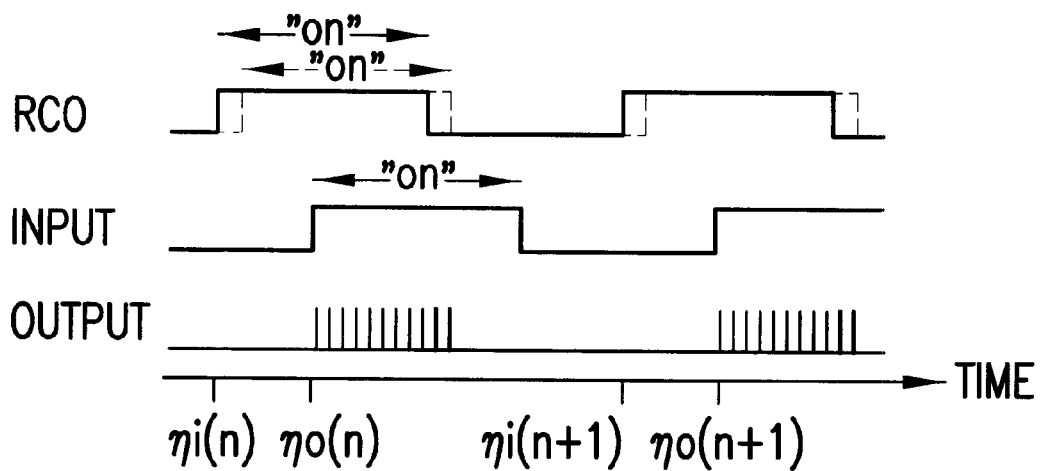
FIG. 4c illustrates the operation of a population AND-like phase detector.

FIG. 4c shows a schematic depiction of a population AND-like PD. The population signal of the Input is a pulse function which is the "envelope" of all the delayed versions of the Input, ignoring fluctuations due to EPSP shapes. At any time when both the Input and the RCO signal are "on", it is assumed that at least one of the PD cells will be activated. The RCO signal is described as a pulse function, where the pulse duration is defined by the part of the RCO-driven EPSP in which adding an EPSP of the Input (in any of the PD cells) will drive the membrane voltage above threshold. If the time difference between the two inputs decreases (dashed line of the RCO), the PD's output becomes stronger (2 additional, dashed, spikes).

Schematically, the two input signals to the PD (FIG. 4c) can be described as square-waves whose duty-cycles are determined by their effective widths. (An input will be considered as "on" at all times at which, had the other input been considered "on", summation of the generated EPSPs would be supra-threshold in at least one of the PD neurons). If the PD's output is a linear function of the inputs' overlap time, then the transfer function $g_d$ would take the form described in FIG. 4d (Appendix A.5).

It can be seen that the output is stronger for time delays $[\eta_o(n)-\eta_i(n)]$ that have smaller absolute values (larger overlap) and monotonically decreases in response to larger time differences. The exact form of the periodic transfer function depends on the input parameters (dashed lines). The working range of the iPLL includes ISIs that are longer than the intrinsic period ($T_c$), while the working range of the ePLL includes ISIs that are shorter than the intrinsic period.

Figure 4D:
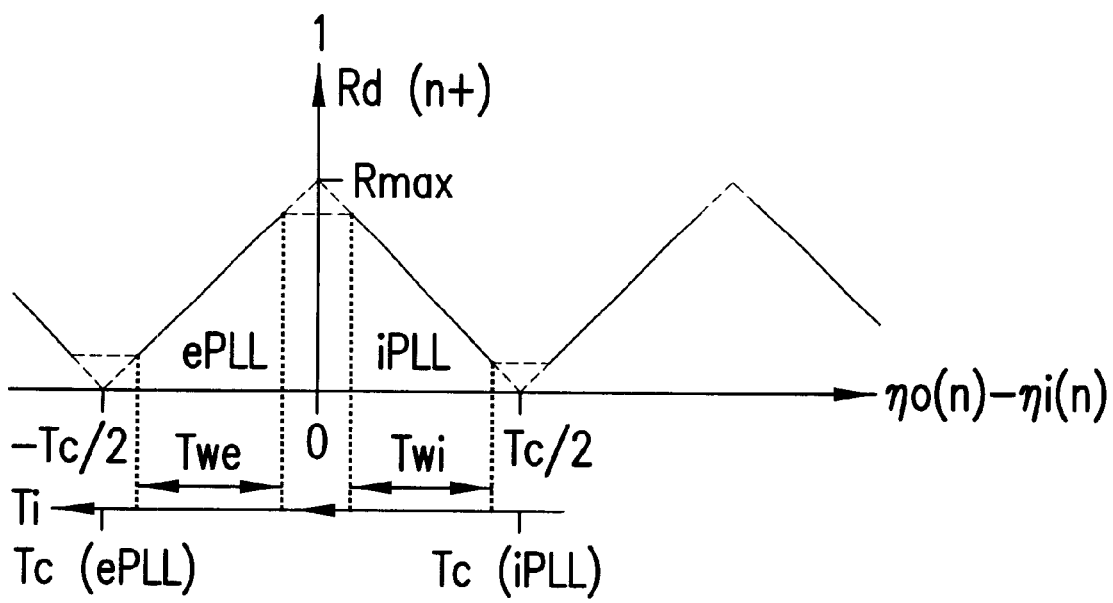
FIG. 4d is a graphic depiction of a linear AND-like phase detector transfer function ($g_d$)
Figure 12A:
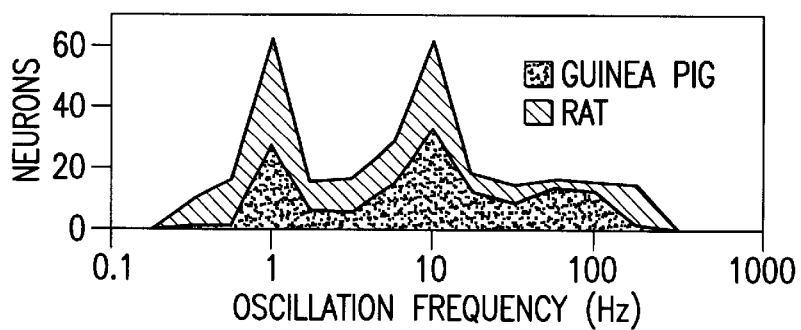
FIG. 12a illustrates the distribution of clear oscillation frequencies in the somatosensory cortices of rats and guinea pigs.
Figures 1, 12B:
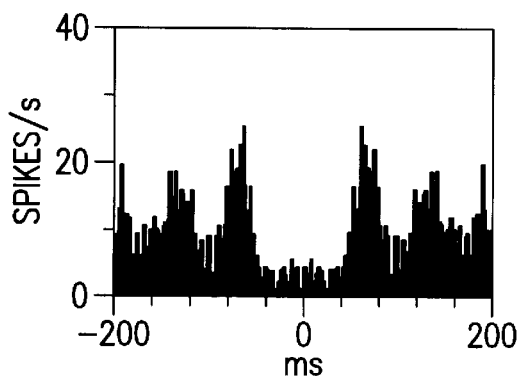
FIG. 12b illustrates the effect of glutamate on oscillation frequencies.

Since $g_d$ is required to be monotonic it is clear that an NPLL can function only in limited ranges of phase differences: either within one of the increasing monotonic ranges (FIG. 4d, ePLL) or within one of the decreasing monotonic range (FIG. 4d, iPLL). In the AND-like ePLL the RCO's output leads the input ($\eta_o-\eta_i<0$), and in the AND-like iPLL the RCO's output lags the input (FIG. 4d). Each of these implementations requires a different circuit to achieve the negative feedback (Appendix A.5). In the ePLL the PD excites directly the RCO while in the iPLL the PD excites inhibitory interneurons (INH) which, in turn, inhibit the RCO (FIG. 3 and Appendix A.5). Note that the PD transfer function is periodic. Thus, large instantaneous input modulations can move the NPLL from one working range to another, producing only instantaneous tracking errors, i.e., losing or 'filling in' one or more input cycles.

Other PD implementations and adaptive working ranges. As mentioned previously, AND-like implementations are not the only ones possible. Some possible PD implementations are depicted in FIG. 3b and their schematic transfer functions in FIG. 3c. In an AND-like implementation, the PD fires only when both its inputs are active. In an OR-like implementation, the PD fires when either of its two inputs is active. In an ANDNOT-like implementation the PD fires only when the Input is active and the RCO is silent. Variations of these three basic mechanisms are also possible. For example, each input can activate the PD by itself, but a synchronous activation augments the PD's output (an AOR operation). All these mechanisms can be implemented in either ePLL or iPLL configurations (FIG. 3b). Since the transfer function of the RCO is probably always a decreasing one (see below), the potential working ranges for each implementation are those ranges in which the PD function is increasing (FIG. 3c; Appendix A.2).

A significant advantage of neuronal PDs is that transitions from one implementation to another can occur within a given circuit by changing cellular parameters. For example, at low excitability levels a PD neuron can implement an AND-like function, at high excitability levels an OR-like function, and at intermediate excitability levels an AOR-like function. Thus, neuronal PLLs can dynamically change their loop parameters, including gain and working range, to accommodate to global sensory changes or requirements. For example, a full-cycle working range can be implemented by asymmetrical PDs that employ an AND-like function for negative phase differences $[\Delta\eta=\eta_o(n)-\eta_i(n)<0]$ and an OR-like function for positive phase differences. In such an asymmetrical AOR-like PD the order of input activation determines the sensitivity of the PD neurons such that c<a+b for $\Delta\eta>0$ and c>a+b for $\Delta\eta<0$ (FIG. 3b and c). The periodic PD transfer function of such asymmetrical PDs has a shape of a saw-tooth, instead of the triangular shape of the symmetrical PDs (FIG. 4d). The advantages of a saw-tooth PD function are: (i) the working ranges are larger and (ii) with very large input modulations the PLL immediately shifts to another valid working range.

Implementations of RCOs

Almost any single neuron can be regarded as a voltage-controlled oscillator (VCO or VCON). However, the NPLL circuit presented here requires that the RCO exhibit an explicit periodic output activity. One possible model for a neuronal intrinsic oscillator is Calvin's "regenerative firing mode". According to this model, each spike is followed by a strong after-hyperpolarization (AHP), which recovers at some rate until it reaches the threshold again, generates a new spike, and then restarts the process. The average ISI, $T_o$, is determined by the depth of the AHP and by the average input to the neuron. Modulations of the input produce modulations of the RCO's ISI. (Inhibition extends $I_o(t)$, whereas excitation shortens it.)

Figure 5A:
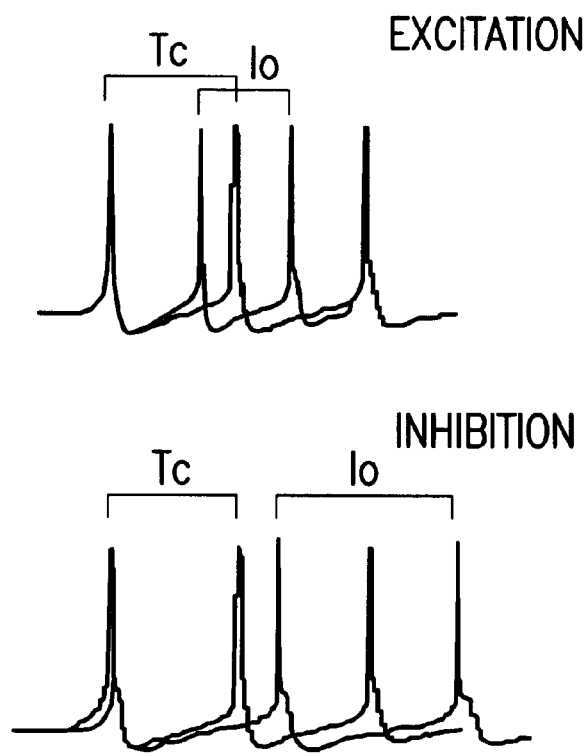
FIG. 5a illustrates the relationship between input and output signals for excitatory and inhibitory NPLL configurations, respectively.

FIG. 5a shows output signals for both the excitation and inhibition modes. The thick traces describe the membrane voltage of an RCO with no modulating input. (The RCO oscillates at its intrinsic frequency.) Additional excitation or less inhibition will increase the depolarization slope, and thus, increase the frequency of the RCO's output (top, thin trace). Additional inhibition or less excitation will decrease the slope, and hence decrease the frequency (bottom, thin trace). FIG. 4b is a schematic transfer function of the RCO plotted as in FIG. 2b. As the input ($R_d$) increases the ISI ($I_o$) decreases.

In another possible model, the RCO has intrinsically generated sub-threshold oscillations that become supra-threshold with an appropriate DC input. The frequency of such oscillations is often controlled by the input. Both sub-threshold and supra-threshold intrinsic oscillations often present close-to-linear input-output (current to frequency) transfer functions. This implies that the input-rate - to - output-frequency transfer function of these oscillators is close to linear, since the amount of input current accumulated during a cycle is directly related to the rate of synaptic activation.

Three different frequencies are associated with an RCO. The intrinsic frequency ($f_c = 1/T_c$) is the RCO's frequency when the input to the RCO is quiescent. The local frequency is the RCO's frequency when the input to the NPLL is quiescent, a situation which may include spontaneous activity within the loop. The working frequency ($f_o=1/T_o$) is the RCO's average frequency during the decoding of a specific input.

Simulation

Figure 6A:
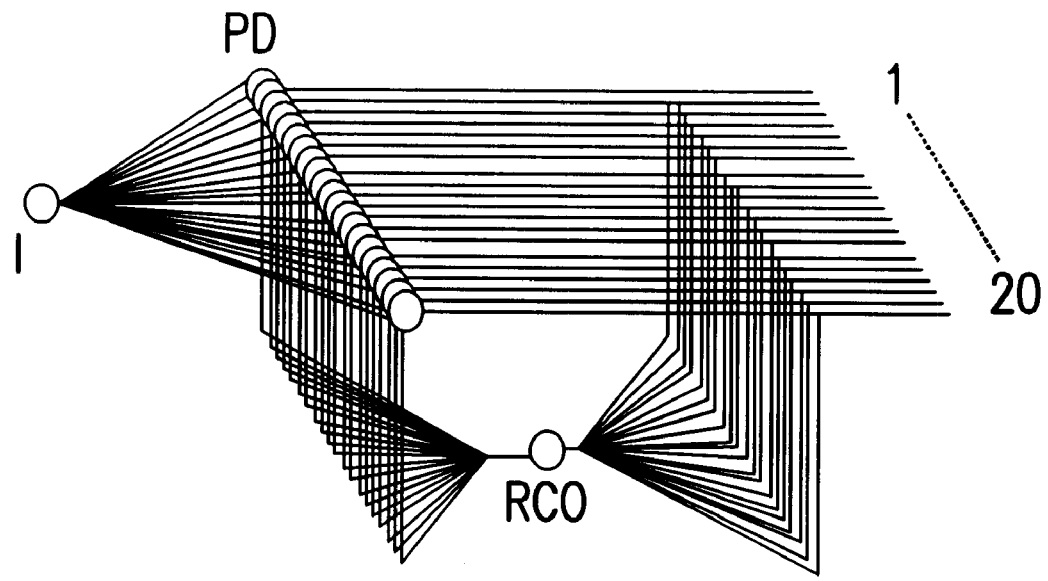
FIG. 6a is a schematic illustration of a simulated NPLL circuit having a width of 20 cells.
Figure 6A:
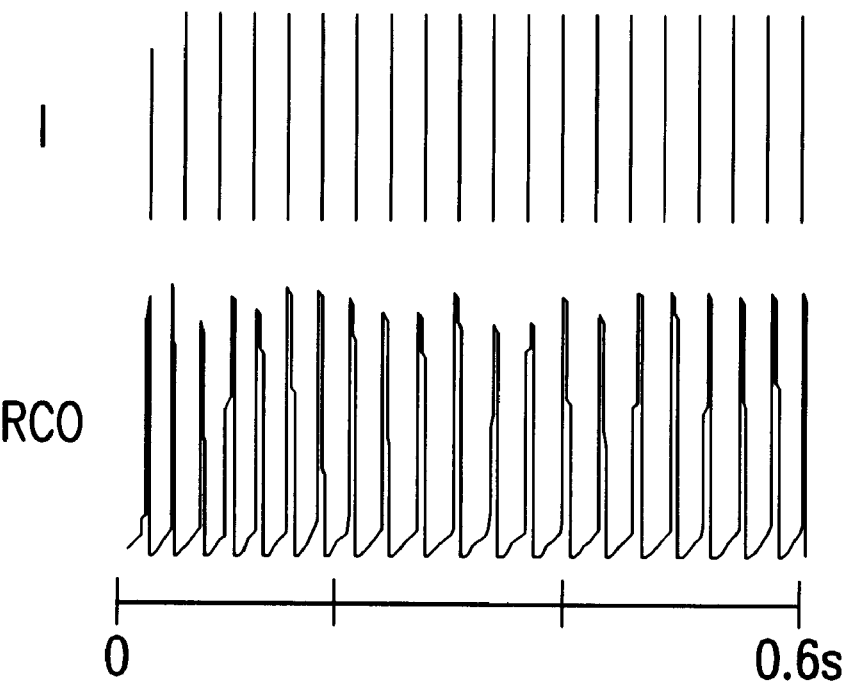

Validation of the basic idea of a neuronal PLL circuit, and a demonstration of such a circuit's operation, is provided by a simulation of a simple circuit that includes only the essential elements of the iPLL, an example of such a simulated circuit and spike trains is shown in FIG. 6a.

The simulation was performed on a DEC 3100 work station using Genesis, a general purpose neuronal simulator. Neurons were represented by two compartments, one that represented an excitable soma that obeyed Hodgkin-Huxley kinetics, and another that represented the dendrites. Three types of synapses were simulated: 1) fast-excitatory, non-NMDA-like synapses with a conductance time constant ($\tau$) of 1 ms; 2) slow-excitatory, NMDA-like synapses with $\tau$=20 ms, and 3) slow-inhibitory, $GABA_B$-like synapses with $\tau$=20 ms. Axons were simulated by delay-lines that conducted action potentials. Intrinsic oscillations were simulated by increasing the maximal sodium conductance by approximately 50 percent. The intrinsic oscillating frequency of the simulation was set by tuning the membrane capacitance.

The circuit is composed of one input cell (I), 20 PD neurons (PD), 20 different delay-lines from the input to the PD neurons, and one RCO neuron (RCO) receiving an inhibitory input from each of the 20 PD neurons. The timings of the input spikes and the membrane voltage of the RCO are presented at the bottom.

The width of the loop was set to w=20. The input was simulated by a single input cell (I) whose output was conveyed to the PD neurons via 20 axons, whose delays to the 20 PD neurons were uniformly distributed between 14 and 20 ms and which formed fast-excitatory synapses on PD neurons. All 20 PD neurons converged on a single RCO neuron via slow-inhibitory synapses. For simplicity, the INH neurons were discarded and replaced by direct inhibitory connections from the PD to the RCO. A single RCO neuron represented the hypothesized 20 RCO neurons. This RCO neuron fed back, by slow-excitatory synapses, each of the PD neurons.

Figure 6B:
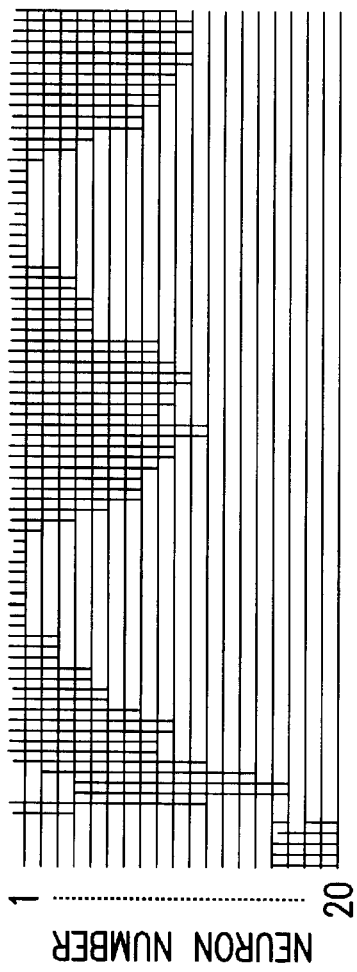
Figure 6C:
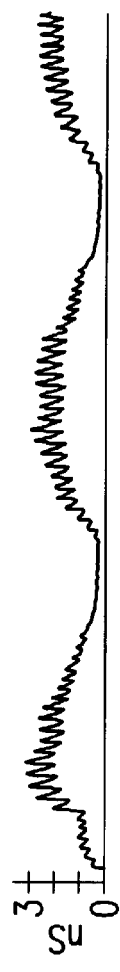
FIG. 6c shows the integrated output of the rate controlled oscillator.
Figure 6D:
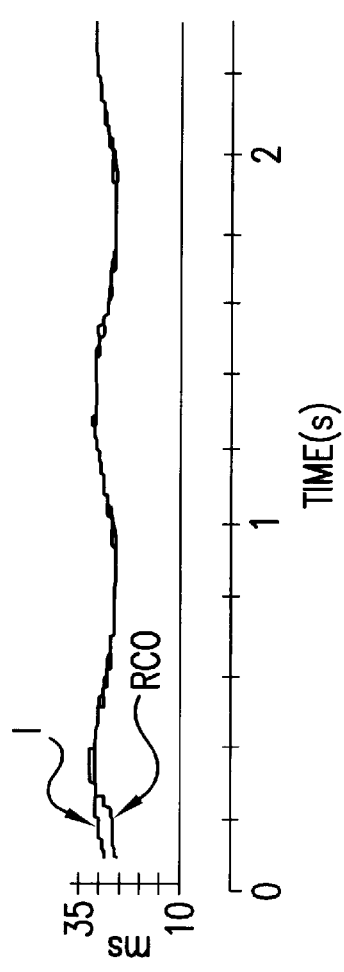
FIG. 6d shows the instantaneous ISI's of the input I and the RCO output as a function of time.

The ability of this simplistic simulated NPLL circuit to decode periodic modulations of periodic input signals was tested by "injecting" excitatory intracellular currents into the input cell's soma. FIGS. 6b–d depicts the results of one simulation. The input signal was a 1 Hz modulation of a carrier frequency (35 Hz), with a modulation depth of 20%. The RCO frequency "locks" to the input frequency as shown in FIG. 6d; the instantaneous ISI, of both the input and the RCO, are described by the two curves. After a lock-in stage, the two curves merge, which indicates the frequency locking. In the locked condition, the input modulation of 1 Hz is decoded by the NPLL, and approximated by a 1 Hz population signal (both population vector and population sum) at the PD's output, as shown in FIG. 6b. The spike trains of the 20 PD neurons are depicted. Each line represents, as a function of time, the membrane voltage of one PD neuron. At any given time, both the population vector (the actual firing neurons) and the population sum (total spikes across the population) describe the input ISI with a unique representation (within the PD resolution limits). As shown in FIG. 6c, the integrated inhibition (the total inhibitory conductance caused by synaptic input to the RCO neuron) modulates the RCO's frequency. This integrated signal is an integration of the NPLL's output, and it provides a measure of the population sum.

This simple simulated circuit was able to decode modulations of up to 2 Hz with a 20% modulation depth. However, one cannot learn about the decoding limitations of the NPLL from this simulation, since only a specific, limited circuit was simulated. For example, the resolution of NPLL decoding depends on the number of elements, and the range of decodable modulation depths and frequencies, as well as lock-in dynamics, depend on the loop gain. This simulation mainly demonstrates how NPLL neuronal signals should look in principle.

Figures 2, 12B:
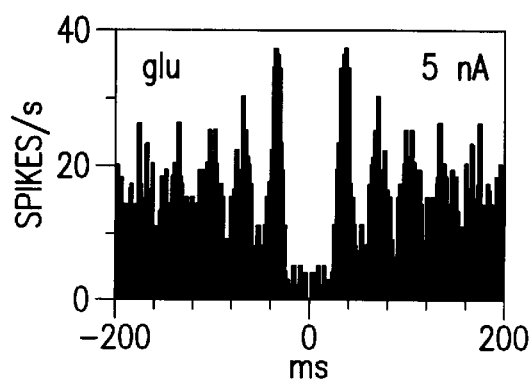
Figures 3, 12B:
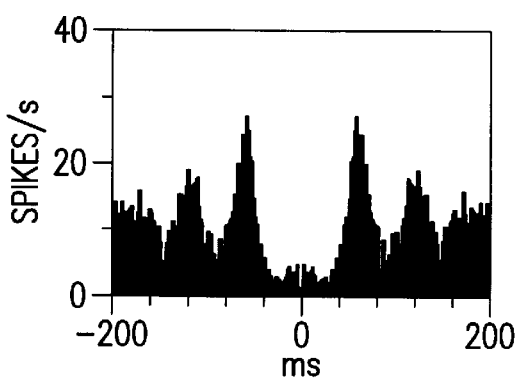
Figures 4, 12B:
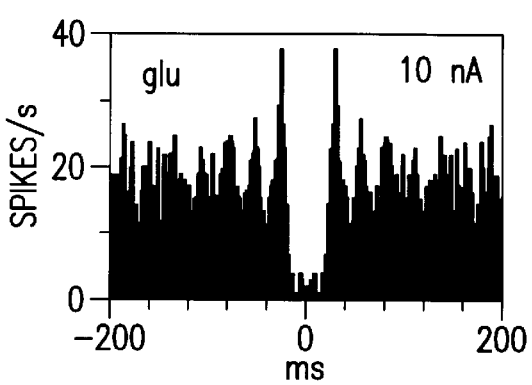

To demonstrate the dependency of lock-in dynamics on the loop gain a MATLAB simulation of the iPLL was performed, using the equations shown in see FIG. 2 and a periodic PD function with the profile depicted in FIG. 4$d$. The results are shown in FIG. 7. All time variables are expressed in $T_c$ (the RCO's intrinsic period—Appendix A.2) units. For an input period $(T_i)$ of $1.2T_c$ and an initial phase difference $[\eta_o(0)-\eta_i(0)]$ of $0.3T_c$, lock-in time was one cycle for loop gain (G) =−1 (FIG. 7$a$). When G was too small in absolute value (lower most trace) the RCO could not approach the input period. The reason was that with such gains the phase difference that was required to follow $T_i$ exceeded the PD's working range ($T_c/2$; FIG. 4$d$). Thus, with this specific PD function the working range of the iPLL was $T_c < T_i \leq T_c(1+|G|/2)$.

The iPLLs with G<−2 (upper most, oscillating trace) were not stable (see Appendix A.2, eq. 2.11). Between these two limits of G, iPLLs could lock-in to the input, where lock-in times increased with increased deviation of G from −1. However, lock-in times also depended on the initial phase difference (FIG. 7$b$). Thus, even with ideal NPLLs, having G=−1, lock-in to the onset of an input train might take more than one cycle, due to the casual phase difference. A single cycle lock-in is guaranteed only when the NPLL is already locked to the input, and a sudden change in the input periodicity is introduced, as demonstrated in FIG. 7$c$. Here, after four cycles of $1.1T_c$ the input ISI was changed to $1.4 T_c$ and from then on was modulated around $1.25T_c$ with a modulation period of $10T_i$ and a modulation depth of 0.4 (peak-to-peak).

Six iPLLs with $0.5 \leq G \leq 1.75$ were simulated. Lock-in to the input onset was not immediate, due to the non-optimal initial phase difference ($0.3T_c$). However, after the NPLLs were locked, those which could track the maximal input period (those with G $\leq$−1, see working ranges above) tracked it more or less smoothly. The tracking errors are plotted in FIG. 7$d$. It can be seen that the iPLL with G=−1 (x's) tracked the input modulations with no errors, while the other iPLLs exhibit tracking errors, as expected (see 2.1 and Appendix A.3). The output rate produced by the iPLL with G=−1 is depicted in FIG. 7$e$. Finally, the NPLLs that could reach the minimal $T_i$ (those with G$\leq$−1 in this case) were able to follow the highest possible rate of input modulations, i.e., $2T_i$ (FIG. 7$e$).

Note that the maximal rate of input modulations trackable by NPLLs do not indicate the maximal resolution of temporal decoding by NPLLs. The latter is indicated by the smallest deviation of input ISI that can be detected by an NPLL and is determined by the resolution of the PD's population output, e.g., the resolution of the y axis in FIG. 7$e$. Thus, NPLLs can detect (and represent by rate) temporal changes with a resolution that can be much higher than the maximal rate of temporal modulations that they can track. For example, an NPLL whose working range is 100 ms <$T_i \leq$150 ms can, with enough PD resolution, distinguish between inputs of 110 ms and 111 ms, although it cannot track 1 kHz modulation.

The following is a summary of the detailed data shown in FIGS. 7$a$–$f$. (Simulations steps (n) were counted from 1.) a. Input (stars and dotted line) : a steady input period at $T_i$=1.2$T_c$. G values (traces from bottom up at n=2) 0.2, 0.6, 1.0, 1.4, 1.8, 2.2. Initial phase difference [Δη(1)]=0.3$T_c$ b. Input: as in a. G=−1. Δη(1)=0.15, 0.30, 0.45, 0.60, 0.75, 0.90 $T_c$. c. Input: 4 cycles of $1.1T_c$ followed by $I_i(n)$=(1.25+0.25 sin (2π(n-4)/10))$T_c$, for n>4. G values (traces from bottom up at n=2): 0.5, 0.75, 1.0, 1.25, 1.5, 1.75. iPLLs with G>−1 are plotted without symbols. Δη(1)=0.3$T_c$. d. Tracking errors for the simulation in c were computed as ($I_o(n)$-$I_i$(n-1))/$T_c$, for n>1. Only G$\leq$−1 are shown. G=−1 is plotted with X's. e. The PLL's output rate ($R_d$), in arbitrary units, for the simulation in c. f. Input: $T_i$=1.25$T_c$, modulation rate $2T_i$, modulation depth 40%. G values as in c. Δη(1)=0.1$T_c$.

Tactile NPLLs

The mammalian tactile system contains the neuronal elements required for the function of thalamocortical NPLLs. The peripheral tactile system, which acquires sensations during exploration of textures, has been described in detail during the last three decades. The tactile system includes the three following sub-systems, which are classified according to the temporal nature of their responses. Slowly adapting receptors (SA), which respond optimally over the low range (~0–20 Hz) of stimulus frequencies; rapidly adapting receptors (RA), which respond best over frequencies of medium range (~20–40 Hz); and Pacinian receptors (PC), which mainly transfer information at high frequencies (>80 Hz). The glabrous fingertip is innervated mainly by RA receptors, by lower numbers of SA receptors, and by only a small number of PC receptors.

Less is known about the central mechanisms underlying tactile decoding and processing. The tactile pathways from the periphery to the cortex preserve the phase of the stimulus. However, the degree of phase locking gradually decreases along the afferent pathways, with the largest reduction probably occurring at the transition from the thalamus to the cortex; a transition that is also accompanied by an increased complexity of response. This increased complexity could be due to significant processing that occurs already at the thalamocortical level.

Temporal Encoding of Textures

For the purpose of illustration, it is useful to consider textures (of variable patterns and heights) on flat surfaces, e.g., textures of sand papers, clothes, woods, artificial gratings or Braille pages. A finger traversing these types of surfaces usually moves along sections of approximately straight lines (FIG. 8, top). The movement of the hand (arrow) across a surface generates skin displacements at the zone of contact. This series of displacements can be described as a spatial signal [$u_i(x)$] that represents the texture in this one-dimensional direction of movement.

The information contained in these textures consisting of a collection of ridges is expressed by three variables: Amplitude,,average spatial period (where, period is 1/frequency) and local spatial modulations. The information carried by the average spatial period ($X_i$) is called here the *roughness* of the surface and the information carried by local spatial modulations ($p_i$) the pattern of the surface. (*Italics* are used herein to distinguish this specific stimulus-defined *roughness* from the more general roughness percept.) As shown below, decoding *roughness* information can contribute to the roughness percept.

When a surface is traversed by finger tips, the spatial information is encoded in two ways: (i) spatial encoding:

across the contact area (~0.6 cm² in humans), at any given moment, the spatial features are reflected by the corresponding skin deformations leading to a spatially-encoded response of the relevant receptor population, and (ii) point encoding: at any given skin location receptors are responding to the fluctuations of the indentation amplitude produced by the movement (Appendix A.6). Spatial encoding is best mediated by the SA receptors and needs to be decoded by mechanisms utilizing spatial comparisons. Point encoding is probably best mediated by RA (and, to a lesser degree, PC) receptors which respond reliably to temporal modulations. Such temporally-encoded signals could be efficiently decoded by thalamocortical NPLLs. However, since point skin indentations are modulated both by amplitude (due to vertical surface fluctuations) and by time (due to horizontal interval fluctuations; FIG. 8, top), the interpretation of the decoded signals could by ambiguous. Electronic implementations of NPLL, facing similar problems, always include an amplitude limiter at the input stage. Interestingly, the RA peripheral system employs a similar mechanism. Responses of RA mechanoreceptive fibers to vibratory stimuli, or moving spatial gratings, having amplitudes between less than ten to hundreds of microns are often of a 1:1 type. That is, they fire one and only one spike per vibratory or grating cycle, regardless of the amplitude. Every RA fiber exhibits a 1:1 response within a specific range of amplitudes (termed the "plateau" range), and temporal frequencies. Outside these ranges, fibers respond with bursts of variable lengths per cycle, depending on the force and frequency of the stimulus.

Figures 8A, 8B, 8C:
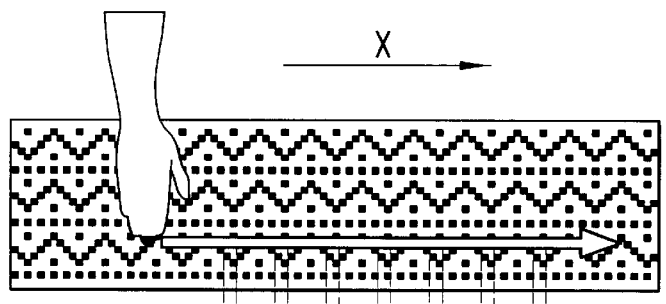
FIG. 8 is an illustration of a temporal encoding of spatially distributed features.

Thus, in the case of the RA system, and with a constant finger velocity, the encoding of the horizontal features of textures is straight-forward. The horizontal (or temporal) modulations of the periodic indentation profile, as a function of x (or t), can be described by the two methods used above to describe temporal periodic signals (FIG. 1 and Appendix A.1): either with respect to an imaginary "carrier" signal (FIG. 8a, $P_i(n)$) or with respect to the spatial intervals themselves (FIG. 8a, $p_i(n)$), (Appendix A.6). During scanning, the timing of the n-th mechanoreceptive spike is uniquely determined by the location of the n-th ridge (FIG. 8b). If the response type is 1:1, the RA mechanoreceptive fibers should fire one and only one spike per every ridge in the surface, and the sensory transformation takes a simple form: the horizontal spatial structure is directly represented by the temporal structure of the RA spike trains (Appendix A.6). With different ranges of finger forces the 1:1 response becomes 1:n response and the transformation is more complex. However, as long as the duration of the bursts is small relative to the input average cycle (which is usually the case), decoding efficiency should hardly be affected since input onset times, which are the important parameters for the decoding, are not affected. Yet, the increased input intensity and duration caused by the bursts should be compensated by a proper tuning of the PLL's loop parameters. Thus, for optimal performance, NPLL parameters should be tuned according to the expected form of input bursts.

Figure 7A:
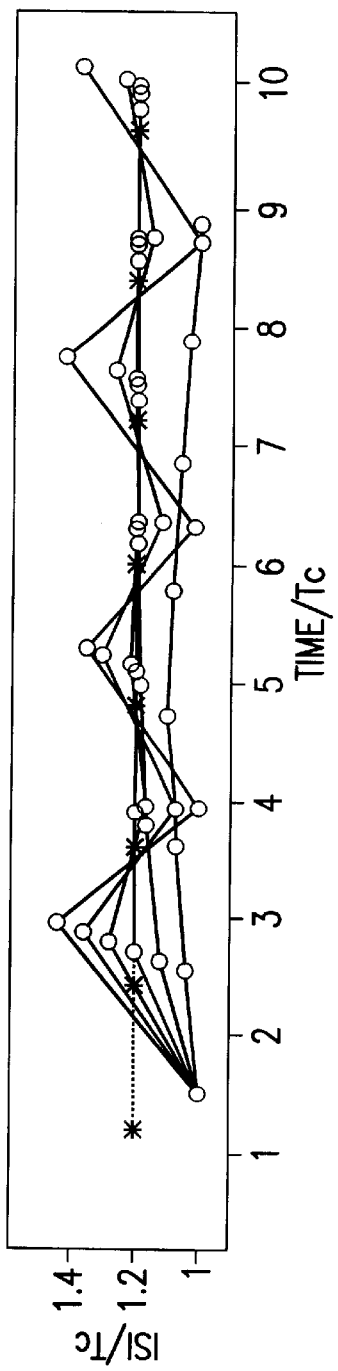
FIG. 7 contains a series of wave diagrams which illustrate the dependence of lock in dynamics on input parameters.
Figure 7B:
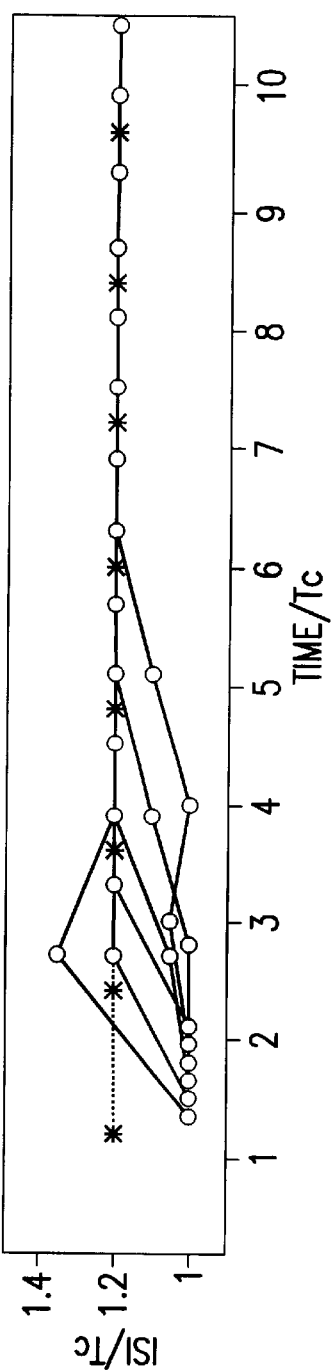
Figure 7C:
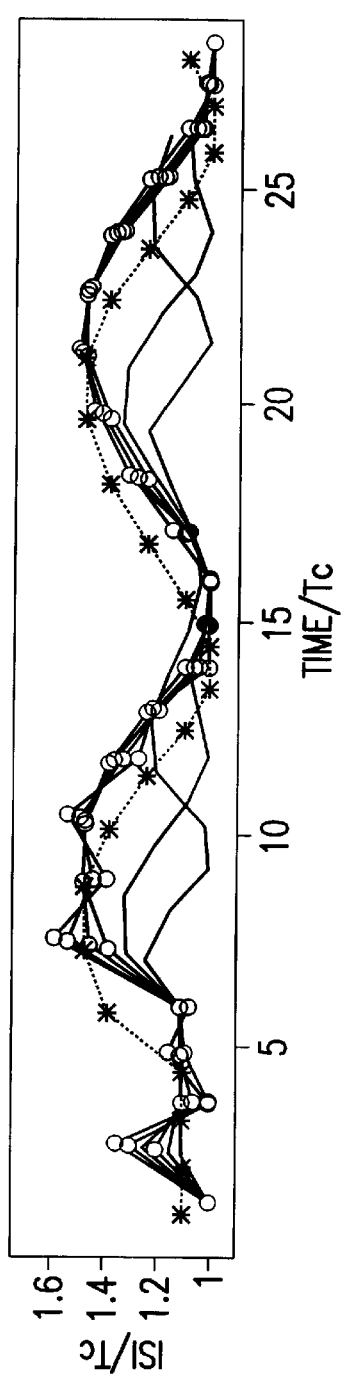

FIGS. 7a–c illustrate that the spatial signal $u_i(x)$ can be decomposed into vertical [$A_i(n)$] and horizontal [either an imaginary "carrier" +$P_i(n)$, or $p_i(n)$] components. The similarity between $P_i(n)$ and $p_i(n)$ in this example is due to the regularity of the pattern. $G_i(n)$ is the inter-ridge interval. Assuming a 1:1 response of mechanoreceptive fibers and a constant velocity, $u_i(x)$ is converted to a temporal signal described by $s_i(t)$. The temporal signal, which is carried by the mechanoreceptive fibers, can be also decomposed into sub-components. However, due to the 1:1 response, which neglects amplitude changes, the amplitude component is constant and equal to 1, and thus is ignored. $I_i(n)$ is the ISI. Refer to appendix A.1 for the definitions of other terms.

The phase-locking mechanism of the NPLL forces the RCO's output [$S_o(t)$] to track the peripheral input [$s_i(t)$] with a delay of one cycle ($T_i$) and a constant phase difference ($\Delta\phi$). As a result, the system can extract the modulation ($M_o(n)$ or $m_o(n)$) that describes the *pattern* and the average interval ($T_o$) that describes the *roughness*. See appendices A.1, A.3 & A.6.

Decoding by Thalamocortical NPLLs

Figure 9:
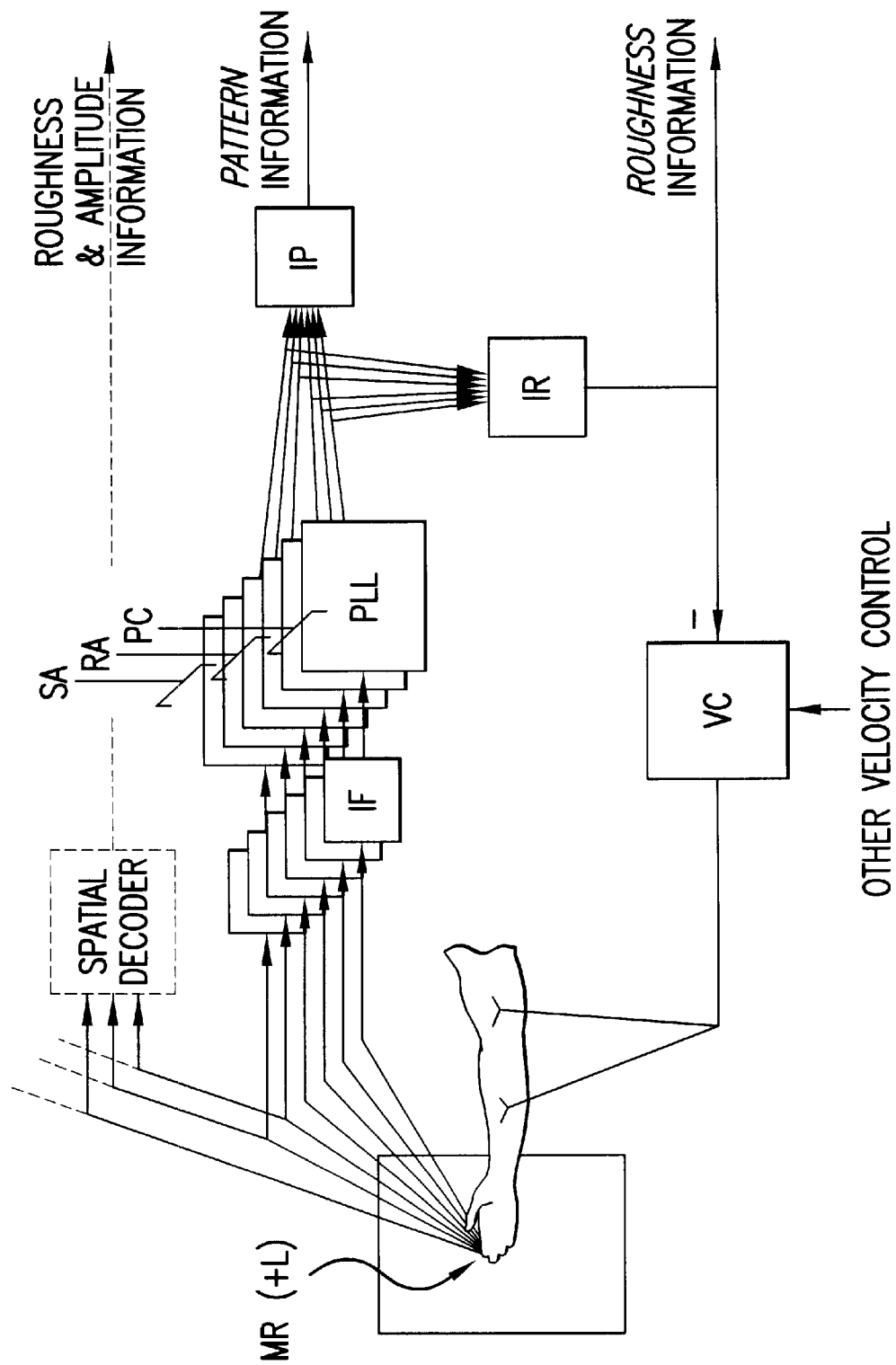
FIG. 9 shows a series of topographically organized NPLLs which are arranged in parallel within a global texture decoder.

The decoding of tactile signals by NPLLS requires an additional feedback loop. Thus, the temporal tactile decoder, as one module within a global tactile texture decoder, includes many parallel NPLLs embedded within a sensory-motor feedback loop, as shown in FIG. 9. Many, topographically organized, NPLLs reside in parallel; only six are shown in the figure, however. Each NPLL is tuned to a specific frequency range within a specific sub-modality: SA, RA or PC. The input of each NPLL is received from a set of mechanoreceptive fibers through a set of dorsal column nuclei relay neurons, which together comprise the input filter (IF). Most of the mechanoreceptors (MR) include amplitude limiters (L). IP and IR are readout networks that produce *pattern-* and *roughness*-related information, respectively.

The movement of fingers across a surface activates skin mechanoreceptors (MR) which convert the spatial details into temporal signals. The RA and PC mechanoreceptors at the finger tip include amplitude limiters (L) which eliminates amplitude modulations. The parallel array of input filters (IF; mechanoreceptors and their fibers) transfers the filtered signal to an array of somatotopic organized NPLLS, each of which is specifically tuned to a particular frequency restricted to one of the tactile sub-modalities (SA, RA, or PC). Therefore, every point on the skin is driving a set of NPLLs, each tuned to a particular frequency. The outputs of all the NPLLs are fed to two readout networks, IP and IR, for *pattern* and *roughness* evaluation, respectively. The IR's output drives the velocity controller (VC) which closes the loop by controlling the finger velocity.

Each NPLL, thus, processes information about different spatial frequencies of the explored surface. How does the brain know which NPLLs provide relevant information about the actual surface being explored and how can it focus on these NPLLs? If the PDs employ non-periodic, sigmoid-like transfer functions, the answer to the first question would be simple. Only NPLLs that are tuned to the relevant (i.e., informative) temporal frequencies should present modulated output signals. All other NPLLs should produce outputs that are saturated either at the highest or the lowest possible values. Thus, the modulation depth of the AC output component, or a related measure such as $|R_{ac}(t)|$, should provide a reliable measure of the-information contained in each PLL's output. This criterion appears to be valid also for periodic PDs (e.g., FIG. 4d).

As the input average frequency moves away from the center of the working range, the probability of the instantaneous frequencies, exceeding the bounds of this range increases. Once the input frequency exceeds one of these bounds, the PLL's output becomes closer to its average value and its modulation depth decreases. Thus, local maxima of $|R_{ac}(t)|$ represent maximal information. Furthermore, it is most likely that these local maxima will be graded among different NPLLS, and a global maximum will also be available. The reason is that each NPLL can obtain a larger working range if it tunes the slope of its PD function according to its average frequency—smaller slopes for lower frequencies. In this case, the global maximum will indicate the NPLL whose working range is fully exploited.

Since neuronal excitation is often sensitive to the variability at the input, circuits that detect maximal variabilities can be implemented. If such circuits are included in the NPLLs' readout networks (e.g., IP in FIG. 9), they can assist the selection of one of the sub-modalities (SA, RA or PC), and the specific NPLLs within that sub-modality, that is most informative. Other factors affecting this selection probably include visual, cognitive and additional tactile information, such as that obtained by spatial decoders (FIG. 9). According to this selection, the finger velocity is deliberately determined to be in the range that will generate temporal frequencies in the appropriate range for the chosen NPLLS. By setting the finger velocity, the system 'focuses' on the selected NPLLS, since they will generate the most informative output. To keep this focus steady, an automatic feedback system is required to carry out the fine tuning of the velocity. Such a feedback system could be tuned to maximize the amount of output information from the selected set of NPLLs, using $|R_{ac}(t)|$ as a measure. Although such an operation makes sense, it should be implemented as a higher-order feedback loop. For maintaining the input frequencies around the NPLLs' working point such a feedback system could simply operate on fluctuations of the averaged PLL's output, $R_{dc}$.

Let us represent each selected group of NPLLs by a single NPLL. Once a particular NPLL is selected, the sensorimotor circuit responsible for temporal decoding can be described by two loops (FIG. 10a): the inner loop is the selected NPLL, which extracts the input temporally encoded information (FIG. 8) and recodes it by rate (Appendix A.7), and the outer loop is an "Automatic Velocity Control" (AVC), which keeps the input frequency of the NPLL centered around the NPLL's working frequency. IP and IR are reduced in this description to single filters, assumed to produce outputs related mainly to the selected NPLL. The other inputs to IP and IR are assumed be 'averaged out'. The general case of processing in which the average input frequency can change (albeit slowly) over time, even beyond the working range of the NPLL, is assumed here. Thus, both the average input ISI and the average NPLL's output are functions of time ($T_i(t)$ and $R_{dc}(t)$, respectively).

The Automatic Velocity Control (AVC)

When the NPLL is locked, the RCO's average ISI is approximately equal to the average input ISI ($T_o(t) \approx T_i(t)$, appendix A3). If either the average input spatial period ($X_i(t)$) or the finger velocity ($V(t)$) are changed, the NPLL will move to a new working point in which $T_o(t) \approx T_i(t)$. Such a new working point will be associated with a new average output rate [$R_{dc}(t)$] of the NPLL. However, if the working range of the NPLL is limited, as it is the case for any practical implementation, this adaptive process is also limited and consistent drifts in the input average frequency can eventually lead to a loss of locking as the NPLL leaves its working range.

From the point of view of the sensory-motor system there are two possible solutions to this problem: it can either have many NPLL circuits, each of which is tuned to a different working range (the "open-loop approach"), or can actively maintain the input temporal frequency within a working window (the "closed-loop approach") The closed-loop approach, whose operation is incorporated here, requires that, while operating near the center of the NPLL's working range, if $T_o(t)$ is driven towards the limits of the working range, an action will be taken to bring $T_i(t)$ back to its original value via the control of the finger velocity, V(t) (Appendix A.8).

Figure 10A:
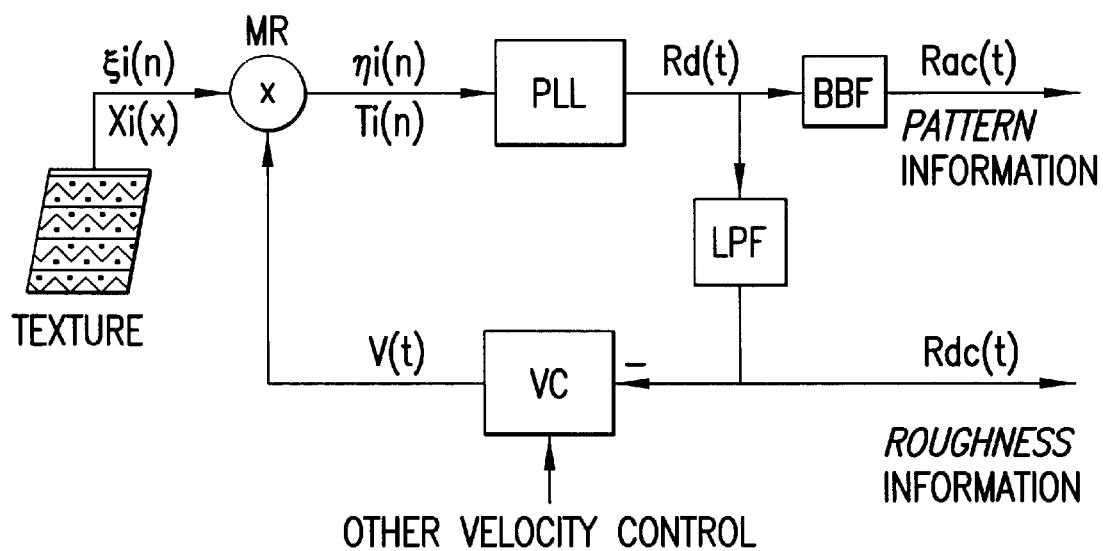
FIG. 10a is a schematic block diagram which illustrates the functioning of an automatic velocity control loop.

As shown in FIG. 10a, the implementation of tactile AVC is composed of 5 elements: 1 a Multiplier (MR), which multiplies the finger velocity by the spatial frequency of the texture; 2) an NPLL circuit, which converts the *roughness* and *pattern* information to the DC and AC components of a rate signal; 3) a base-band filter (BBF) that transfers only the frequencies related to the *pattern*; 4) a low-pass filter (LPF) that transfers only the frequencies related to changes in the *roughness*; and 5) a Velocity Controller (VC), which controls the finger velocity. $\epsilon i(n)$ is the location of the n-th input ridge; $X_i(x)$ is the average inter-ridge interval; $\eta_i(n)$ is the timing of the n-th input spike; $T_i(t)$ is the average input ISI; $R_d(t)$ is the firing rate of the NPLL's output; $R_{ac}(t)$ is the integrated signal representing the *pattern*; $R_{dc}(t)$ is the integrated signal representing changes in *roughness*; and V(t) is the finger velocity. The loop equations (inset) are explained in appendix A.8.

The negative feedback nature of the AVC maintains the NPLL's mean input ISI close to the NPLL's desired working point ($T_{cw}$, $R_{cw}$), which is the center of the working range of the selected NPLL. An increase in either the average spatial frequency or the finger velocity will result in the input's average ISI decreasing, $R_{dc}(t)$ increasing, and V(t) decreasing (FIG. 10 and appendix A.8) . As a result, $T_i(t)$ will be driven back towards $T_{cw}$ with a dynamic that depends on the actual transfer functions. An opposite reaction occurs when either the average spatial frequency or the finger velocity decreases. Note that this servo operation holds for any given transfer functions, provided that they establish a negative feedback. Thus, dependence of tactile inputs on motor outputs should affect the details of the AVC operation, but not its principles.

Figure 10B:
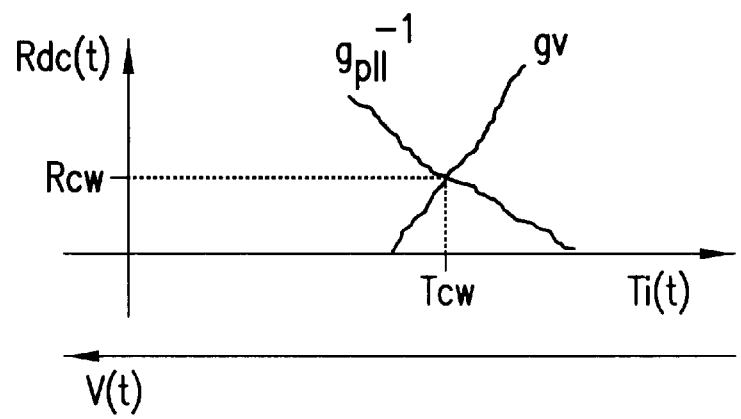

FIG. 10b illustrates schematic examples of transfer functions for the above AVC process. The crossing point ($T_{cw}$, $R_{cw}$) is the working point of the AVC which, optimally, fits the desired working point of the selected NPLL.

Implementations of Tactile NPLLs

Implementations of tactile PDs. The tactile RA system appears to have evolved such that thalamic RA relay cells can be utilized as efficient phase detectors. The main features of the RA system contributing to this efficiency are: (i) an essentially rectangular distribution of the conduction velocities of RA fibers; (ii) a close-to-uniform receptor sensitivity across the receptive field; and (iii) slow (long duration) cortical-to-relay neurons excitatory post-synaptic potentials (EPSPs). In general, the first two of these features are also typical of the PC, but not of the SA, sub-system, while the third is probably common to all three of the tactile subsystems.

If organized correctly, the lemniscal input to the thalamic "relay" neurons can implement a square-wave-like signal (FIG. 4c). Given features (i) and (ii) (above), of the RA system the lemniscal input contains sub-populations in which, for a given "point" stimulus, different sub-sets of the input are active at different times. A "point" stimulus (i.e., an abrupt indentation at a single skin location) will generate a uniform response across all RA receptors that include that point in their receptive field, due to the uniform sensitivity of each receptor across its receptive field. When light touch is used, the skin indentation is assumed to be within a "plateau" range of amplitudes where the response has the form of 1 spike per 1 "point" stimulus. If each sub-population of fibers that share a skin location contains fibers with different conduction velocities, these activations will arrive at the thalamic "relay" neurons at different times for each fiber (see FIG. 4b). In this case, each of the fibers can be considered as a delay line generating a specific delay from skin activation to the firing of a lemniscal fiber. For the conductance velocities and hand length (~50 cm) of monkeys, the spread of lemniscal firings probably contains mainly latencies between 7 to 14 ms, not including the duration of input bursts. This range corresponds to about ¼ of a cycle of 30 Hz oscillations and is a reasonable range for a PD, as discussed above. However, different spreads of the afferent signal are optimal for different NPLL working frequencies. Thus, it is expected that channels conveying lower frequencies will employ larger temporal spreads.

Implementations of tactile RCOs. Obvious candidates for RCOs are the posterior SII local oscillators. Many of the neurons in this area display oscillatory patterns; however, not all of them can be considered as local oscillators. At least 15% of the neurons in that area probably oscillate due to local mechanisms. The rest of the oscillating neurons (about 30% of the population) are either externally driven by the local oscillators, or their local oscillations are masked with significant amount of non-correlated input. These oscillators can either directly drive thalamocortical neurons, if they project to the thalamus, or drive corticothalamic neurons. Note that these single-cell oscillations do not merely reflect sleep-like thalamocortical spindles since they appear in wakefulness, include mainly gamma frequencies and are not correlated among neighboring neurons.

There is no direct evidence, yet, that indicates an RCO-like operation of the SII oscillating neurons. However, these neurons lose their oscillatory patterns when stimulated with non-periodic tactile stimuli. This finding is consistent with the cortical oscillators trying to track the non-periodic input. More important, the distribution of oscillating frequencies of these oscillators matches the peripheral distribution of best frequencies (FIG. 11). A more direct evidence was obtained for oscillators in monkeys, employing RA frequencies, and in rodents, employing whisking frequencies (~10 Hz). These oscillators can be entrained by tactile periodic stimuli near their spontaneous frequencies, but usually not with significantly higher or lower frequencies. Thus, NPLL circuits might exist in parallel in thalamocortical loops involving SI and SII cortices.

Figure 11A:
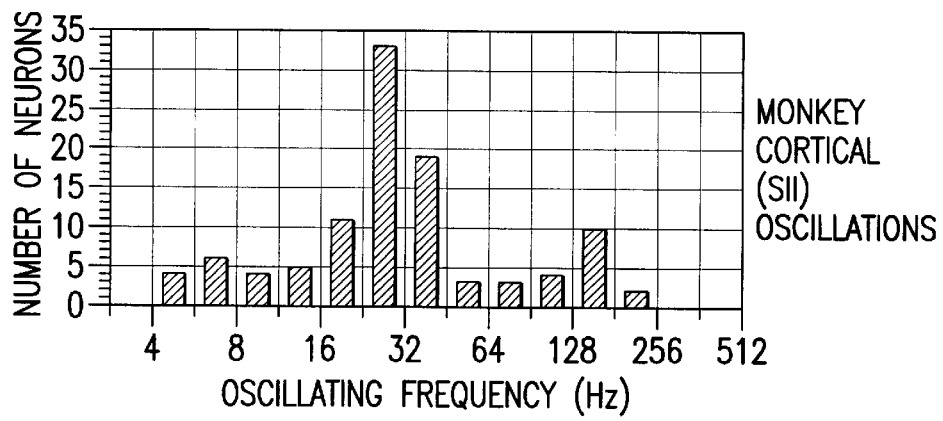
FIG. 11 illustrates cortical oscillating frequencies and peripheral frequency tunings for monkeys and human beings.
Figure 11B:
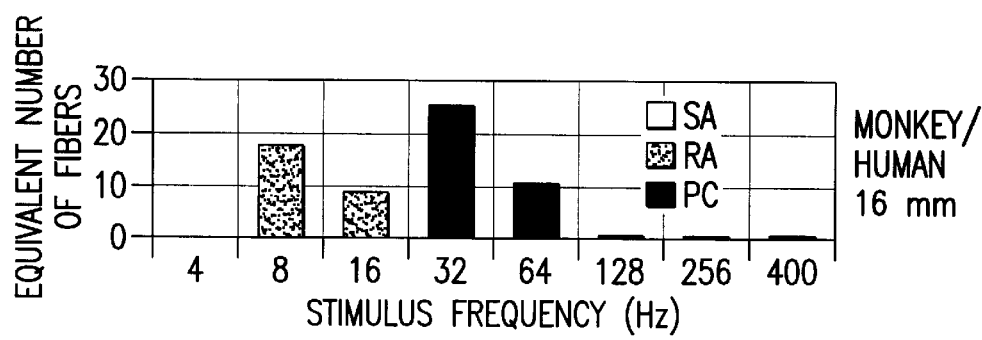
Figure 11C:
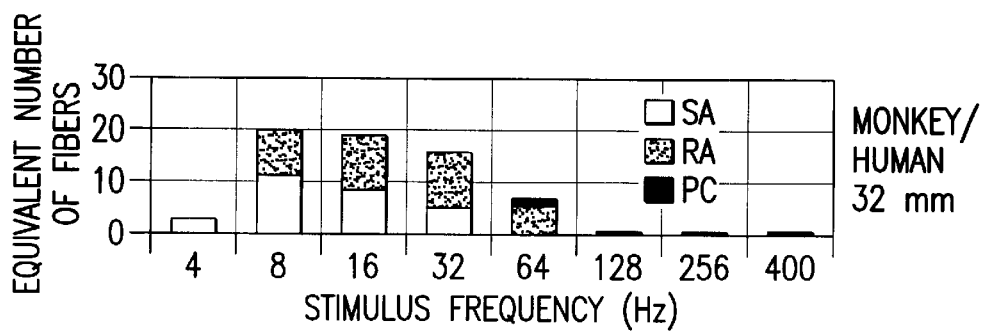
Figure 11D:
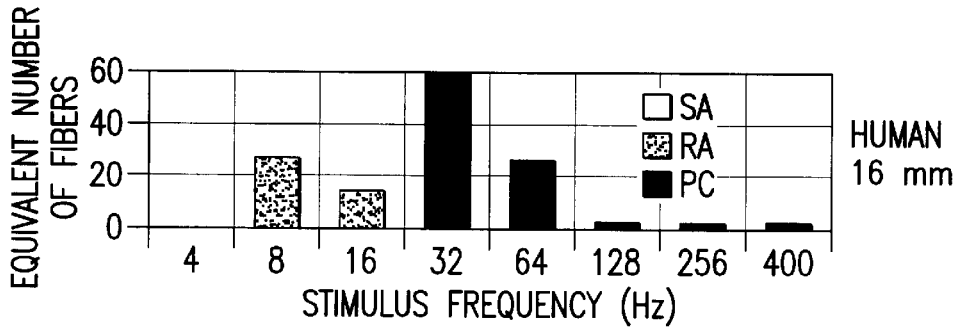

FIGS. 11a–d illustrate graphically cortical oscillating frequencies and peripheral frequency tunings for monkeys and humans. FIG. 7a shows the distribution of oscillating frequencies of cortical (posterior SII) single-cell oscillators (104 frequencies observed in 76 neurons of which 18 exhibited more than a single frequency). Only frequencies larger than 2.8 Hz were included for compatibility with the peripheral data. (modified from Ahissar and Vaadia, 1990). FIGS. 11b–d, are estimated distributions of peripheral tuning to the frequency of sinusoidal skin displacements. Ordinates depict estimates, for each input frequency, of the number of mechanoreceptive fibers that innervate the skin contact area and are tuned to that frequency. The distribution of tuning to vibratory frequencies among the input fibers was estimated here by calculating the "equivalent number of fibers" that are tuned to each frequency. The equivalent number of fibers per sub-modality is the fraction of the average response of that sub-modality at each frequency multiplied by the average number of fibers of the same sub-modality that innervates the stimulated area of skin. During light touch, the contact areas of skin for humans and monkeys are ~0.6 cm$^2$ (Lamb, 1983) and ~0.2 cm$^2$ (Goodwin and Morley, 1987), respectively. The mean responses of mechanoreceptive fibers shown in FIG. 11b were obtained from data published for humans (Johansson et al. 1982) and innervation densities from data published for monkeys (Darian-Smith and Kenins, 1980). Skin contact area was assumed to be 0.2 cm$^2$. Peak-to-peak indentation amplitude is 16 $\mu$m. FIG. 11c is the same as b, except that the indentation amplitude is 32 $\mu$m. FIG. 11d is the same as b, except that the innervation densities were obtained from data published for humans (Johansson and Vallbo, 1979) and skin contact area was assumed to be 0.6 cm$^2$.

Implementation of Readout Networks

Each of the two readout networks, IP and IR, should implement at least two functions. The simple one, which is required for the AVC operation, is filtering out unnecessary information. Both low-pass and band-pass filters are easy to implement by neuronal networks, utilizing synaptic integrations and decays. In addition, these networks should probably include circuits that compute and compare input variabilities (IP) and input averages (IR).

Although the NPLLs' outputs are described as converging to the readout networks, they do not necessarily have to converge. The readout networks can utilize parallel processing and produce population outputs. Accordingly, the single lines standing for the outputs of the two filters in FIG. 9 denote the unity of information conveyed by their outputs rather than the outputs' physical widths.

Decoding by NPLLs in Rodents: Experimental Results

Rats, like other rodents, possess a specialized system for active touch. During tactile exploration, their whiskers scan the environment by rhythmic movements of 5–11 Hz to obtain sensory information about the location and texture of external objects. Temporally, an object's location is encoded by the time interval between receptor firing at the onset of a whisking cycle and receptor firing due to perturbation of whisker motion by an external object. (First-order vibrissal neurons respond strongly to these two events.) This information could be decoded "passively". That is, by feedforward, bottom-up transformations utilizing neuronal temporal sensitivities. (Axonal delay lines are not efficient at the millisecond range.) Alternatively, temporal decoding could be obtained "actively", involving NPLLs whereby intrinsic cortical oscillators track the input and provide a measure of its instantaneous frequency. The ~10 Hz single-cell oscillators in the somatosensory cortices of rats and guinea pigs appears indeed to be engaged in NPLLs.

Methods

Recording and iontophoresis. Standard methods for anesthesia, surgery, and recordings were used. Briefly, the rats (n=7) were anesthetized by an i.p. injection of urethane (1.5 g/kg initially, plus 0.15 g/kg when required). The guinea pigs (n=7) were anesthetized by an i.p. injection of urethane (1.2 g/kg) and supplementary i.m. injections of Rompun (xylazine hydrochloride, 8 mg/kg) when required. Four electrodes were driven into the somatosensory cortices: 2 standard tungsten-in-glass electrodes and 2 "combined electrodes," each consisted of a tungsten electrode within the central barrel of a 7-barreled glass pipette. In these experiments, 2 barrels were filled with NaCl (3 M) and 4 with glutamate (1 M). Single-units were isolated by spike templates and multi-units by amplitudes using spike sorters Stimulations An electromagnetic vibrator was attached to the principal whisker associated with the cortical column containing the studied neuron. For each frequency, stimuli were applied in trains of 6 s vibrations +4 s pauses each, which were repeated 10 or 20 times. Two types of stimuli were used: (1) Square-wave stimuli—within each cycle, the whisker was protracted for half a cycle and then retracted with peak-to-peak amplitudes of 100–320 μm (5 mm from the face); (2) Pulse stimuli - during the first 10 ms of each cycle the whisker was protracted (rise time =5 ms, amp=160 μm) and immediately retracted (fall time =5 ms), producing a constant movement profile for all frequencies.

Data analysis

Auto- and cross-correlation histograms were calculated for all spike trains and simultaneously recorded spike trains, respectively, in all experimental conditions, and were monitored on-line for the appearance of oscillations. Oscillating correlograms were quantitatively analyzed off-line and were classified as "clear oscillatory" if passed pre-defined criteria.

Simulations

The iPLL was simulated with linear transfer functions for the PD and the RCO. The RCO was simulated as a single neuron and the PD as a population of $N_p$ neurons that inhibit the RCO. The afferent input to the PD was simulated as a sequence of ISIs. The PD's population output was active at every time step for which both PD's inputs (i.e., the afferent input and the RCO's output) had been active (not necessarily simultaneously) within a preceding time window of duration $T_w$. Therefore, the PD responded at a constant average rate for a duration whose length became shorter as the absolute time delay between the two inputs became longer (see FIG. 4). While the PD was active, the RCO's ISI increased (reflecting an inhibitory effect) at a constant rate, so that the total increment in the RCO's ISI was proportional to the number of spikes elicited by the PD (i.e., the integral of the PD's response) at the same cycle. The RCO and PD were thus simulated by the following equations):

RCO: $I_o = T_c + \gamma N_p N_d$

PD: $N_d = \frac{1}{N_p} round\left(N_{Max}\left(1 - \frac{|\eta_o - \eta_i|}{T_w}\right)\right); \quad |\eta_o - \eta_i| \leq T_w$ $= 0; \quad |\eta_o - \eta_i| > T_w$ where $I_o$ is the RCO's ISI; $T_c$ is the RCO's intrinsic period; γ is the sensitivity of the RCO to its input; $N_p$ is the number of neurons composing the PD; $N_d$ is the number of spikes elicited, on the average, by a single PD neuron during the current RCO's interval; $N_{Max}$ is the maximal number of spikes that can be elicited by the PD during a single RCO's interval; $T_w$ is the maximum time delay to which the PD responds and round(x) rounds x to its nearest integer. Parameters: $T_c$=100 ms, $T_w$=50 ms, $N_p$=20 neurons, $N_{Max}$=500 spikes (per cycle), γ=0.08 ms/spike. Delays: Input-to-PD=5 ms; RCO-to-PD=3 ms.

Results

Figure 12C:
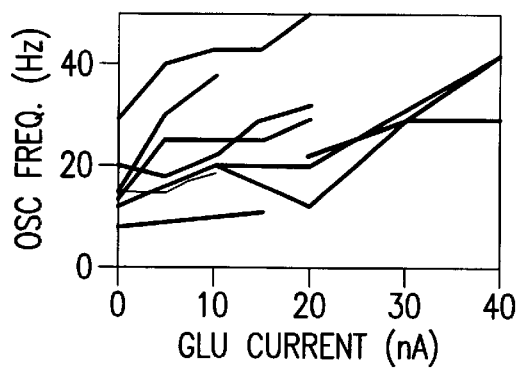
FIG. 12c shows a plurality of current-frequency curves for rats and guinea pigs.

FIG. 12a shows a comparative distribution of clear oscillation frequencies in the somatosensory cortices of rats (n=152 frequencies) and guinea pigs (n=132). Of the 256 clearly oscillating neurons, 26 exhibited more than one oscillating frequency. FIG. 12b illustrates the effect of glutamate on oscillation frequencies. Autocorrelograms of a guinea pig OSC before (panel 1), during (panels 2,4), and between (panel 3) glutamate applications. FIG. 12c shows current-frequency curves for 9 OSCs (2 from rats and 7 from guinea pigs).

Spontaneous Single-cell Oscillations

The spontaneous activities of single neurons from the somatosensory cortices were recorded under anesthesia to rule out whisking-locked oscillations. About half of the recorded neurons (533/1127) exhibited signs of spontaneous oscillatory activity, as characterized by multiple, equally-spaced peaks in the auto-correlograms (e.g., FIG. 12B). Of these neurons, 256 (23% of the total) exhibited "clear oscillations", i.e., their oscillatory pattern satisfied pre-defined criteria for periodicity. Clearly oscillating neurons were recorded from supragranular, granular and deep layers with similar probabilities. The majority of the frequencies of the clear oscillations (FIG. 12A) were either around 1 Hz, probably due to anesthesia and responses to respiratory body movements; 10 Hz; or. 100 Hz. Somewhat surprisingly, the distribution of oscillating frequencies was similar between hardly-whisking (guinea pigs) and vigorously-whisking (rats) animals. In both, but mainly in rats, the ~10 Hz oscillators could be utilized for active sensory decoding.

Efficient active decoding requires oscillatory mechanism whose frequency can be controlled locally. The dependency of oscillating frequencies on local excitation levels was tested by applying glutamate to the vicinity of the single-cell ~10 Hz oscillators (OSCs). Upon applications of glutamate, 17 (63%) of 27 neurons increased their oscillatory frequency, usually with a monotonic dose-response dependency (FIGS. 12B,C). Of the other 10, 8 (30%) did not change their frequency, 1 decreased its frequency, and 1 became non-oscillatory. Thus, the oscillating frequencies of the majority of the recorded oscillators could be controlled locally. This result and the fact that the spontaneous ~10 Hz oscillations were usually not correlated among neighboring cells suggest that the origin of the oscillations was local.

Frequency and Phase Locking to Vibrissal Stimulations

To participate in active decoding, the local oscillators should follow, at least to some extent, changes in whisker movement frequencies. While passive entrainment of non-oscillatory neurons (non-OSCs; neurons that show no spontaneous oscillations) is well documented, frequency locking of cortical single-cell oscillators by sensory stimulation was demonstrated only in monkeys.

Frequency locking of 13 OSCs was tested by applying periodic stimulations to the whiskers that best activated the cortical columns containing the studied OSCs (FIG. 13). FIG. 13 illustrates frequency locking of a single-cell cortical oscillator (OSC) recorded from layer II–III of the barrel cortex of an anesthetized rat during stimulations of whisker E2 with square-wave stimuli.

Figure 13A:
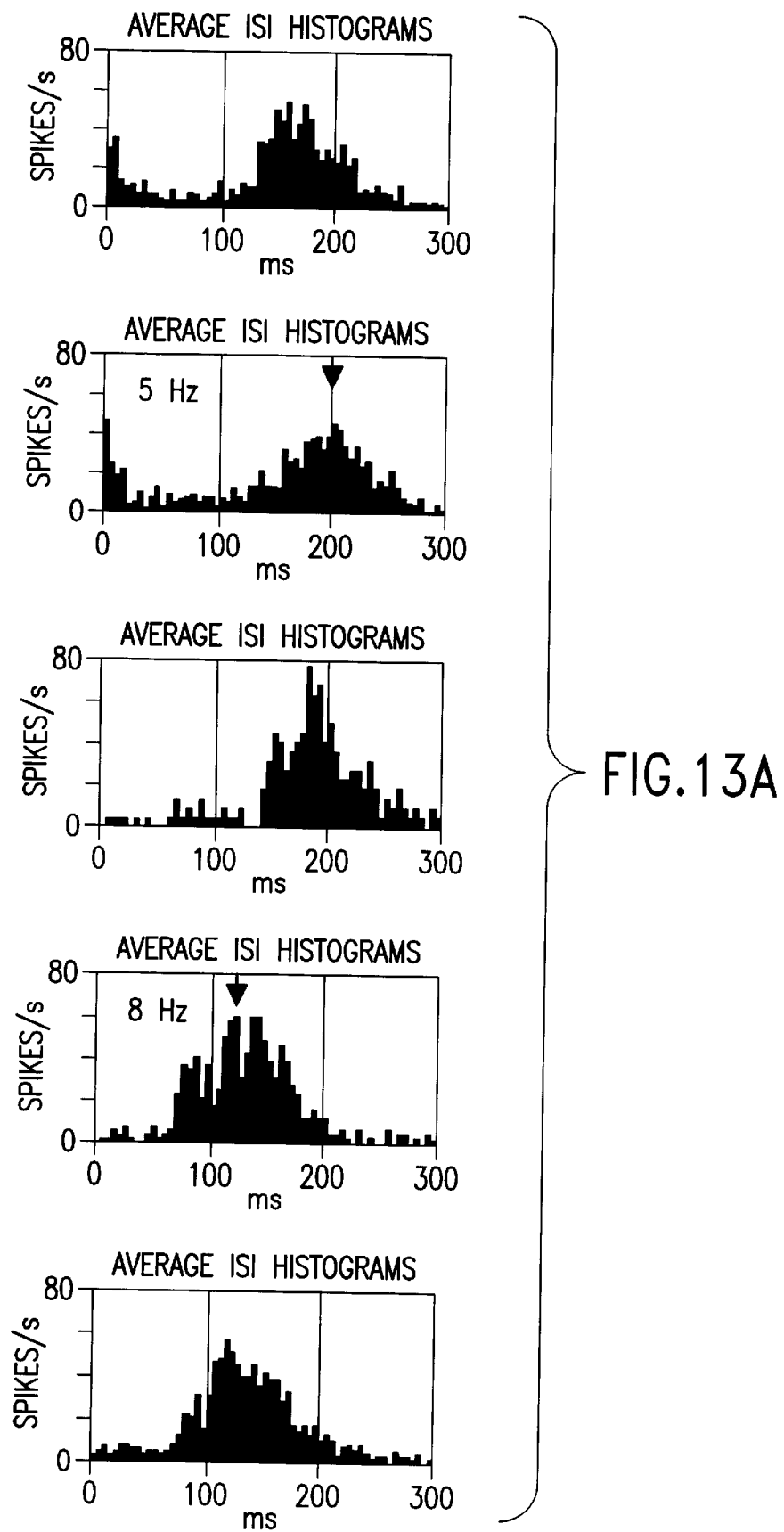
FIG. 13a shows ISI histograms computed during the entire simulation periods and interleaves spontaneous periods for a single cell cortical oscillator recorded from layer II–III of the barrel cortex of an anesthetized rat.
Figure 13B:
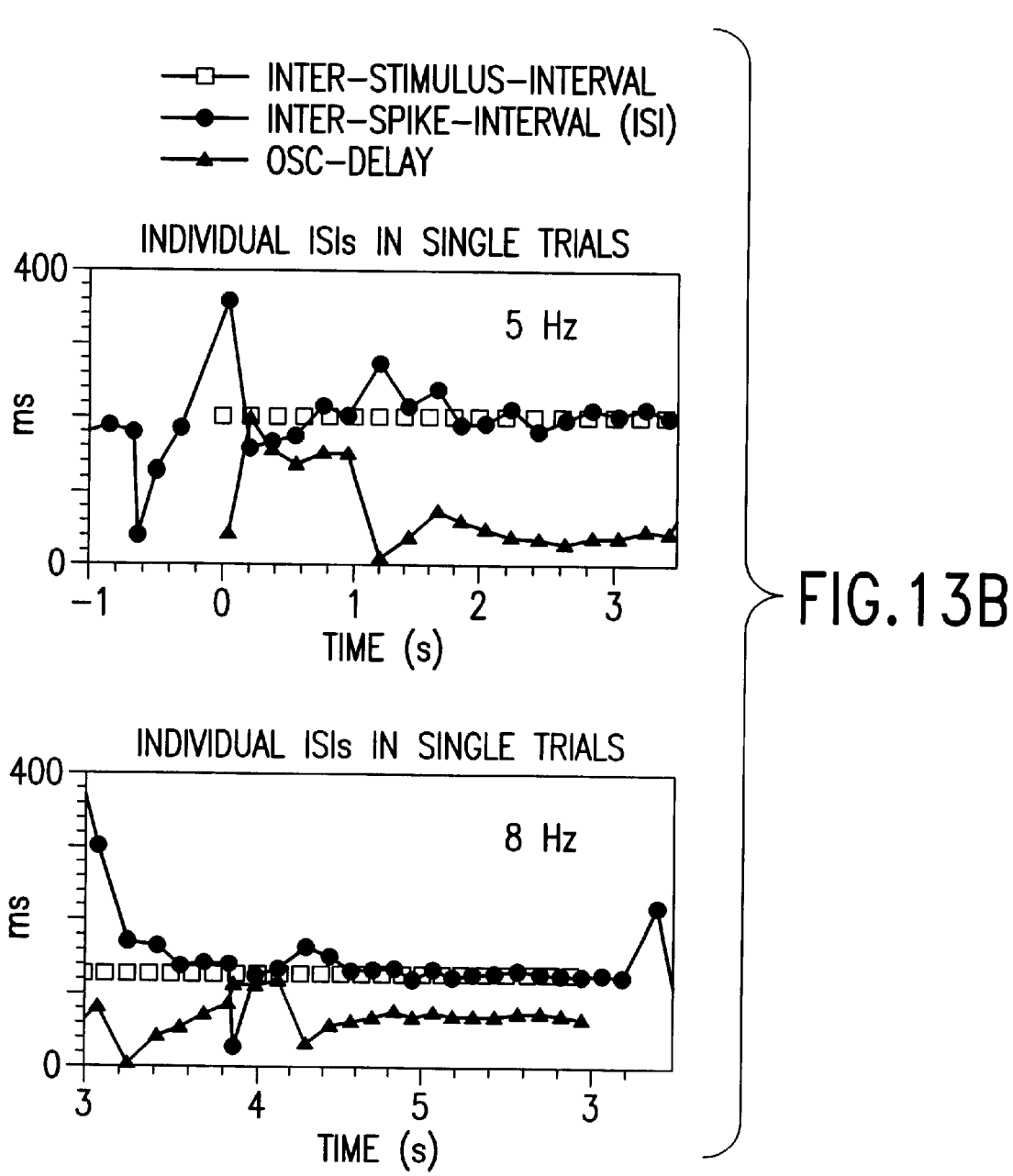
FIG. 13b illustrates the lock in dynamics which occur during single stimulus pulse trains.
Figure 14A:
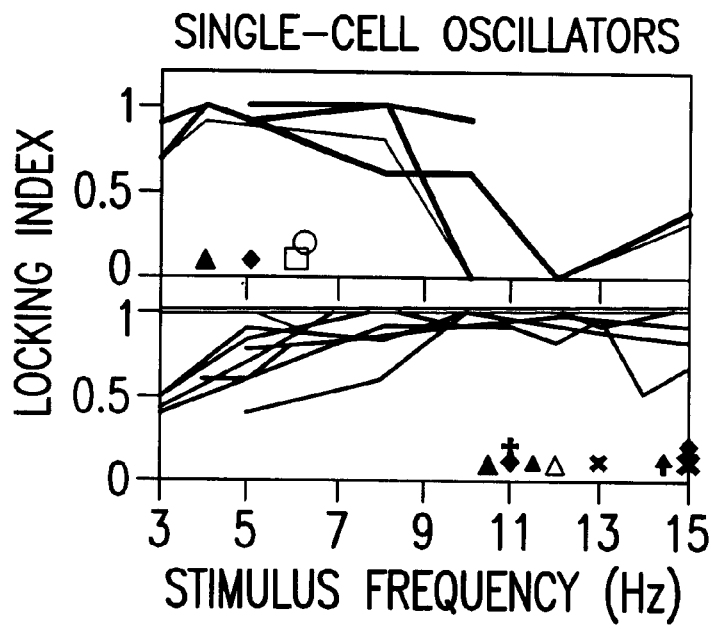
FIG. 14a illustrates entrainment tuning curves for 13 single-cell cortical oscillators of the barrel cortex.

All oscillators exhibited working ranges in which they locked to input frequencies that were both lower and higher than their spontaneous oscillating frequencies (FIG. 14a). With stimulation frequencies between 1–15 Hz, 4 OSCs could track only frequencies below 10 Hz (FIG. 14a, upper panel) and 9 could track frequencies both above and below 10 Hz (FIG. 14a, lower panel). During frequency locking (entrainment), the peaks of the OSCs' autocorrelations and ISI histograms were shifted from their spontaneous periods and became centered around the stimulation periods (FIG. 13a). Detailed examinations of individual ISIs indicated that OSCs locked in and out during presentations of oscillatory stimulations. FIG. 13b demonstrates early (middle panel) and late (lower panel) lock-in cases within single trials. ISIs (circles), inter-stimulus-intervals (rectangles) and OSC-delays (triangles) are plotted as a function of time. Time 0 and the dashed line denotes the beginning of a stimulus train. Note the 1:1 firing (one OSC spike per stimulus cycle) and constant phase difference during stabilized states. In the trial presented at the lower panel, the OSC remained "locked" for-2 additional cycles after the stimulus train ended. The locked states were characterized by stabilized ISIs and stimulus-to-OSC delays (OSC-delays; FIG. 13b) . Often, OSCs fired one or more "extra spikes", at the stimulus' ISI, after the completion of the stimulus train (e.g., FIG. 13b, lower panel).

Figure 14B:
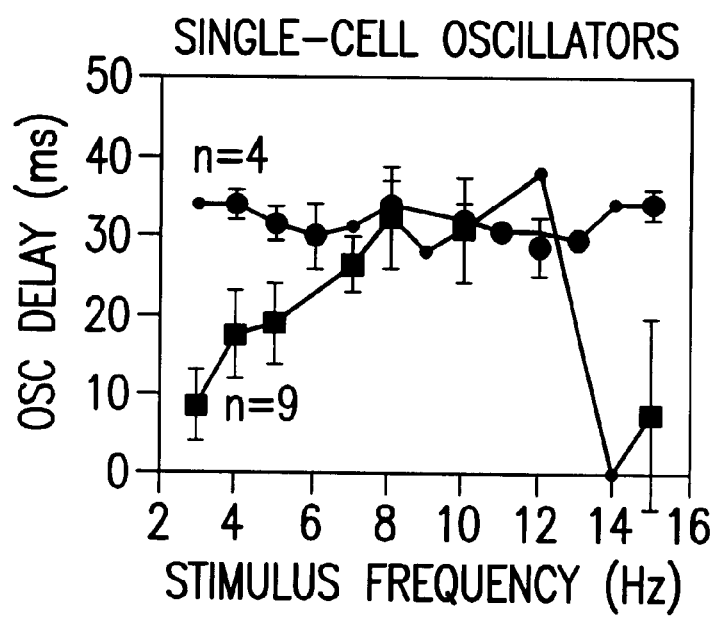
FIG. 14b shows OSC-delays of the 13 OSC's.

It was observed that, within the range of 3–12 Hz (i.e., within the whisking frequency range), the phase difference of all recorded OSCs increased with increasing input frequency (FIGS. 13B and 14B). Phase difference here refers to the ratio of the OSC-delay to the input ISI that varies in the interval [0,1]. The observed dependence of the phase difference on the input frequency is predicted by the theory of stable forced oscillations. It was further observed that in most cases the increase in phase difference was associated with an increase in the OSC-delay (FIGS. 13B and 14B). In 4 cases the increase in phase difference was a side effect of the change in the period of the oscillations at a constant OSC-delay (FIG. 14B).

Direct Coupling Rejected

Figure 1A:
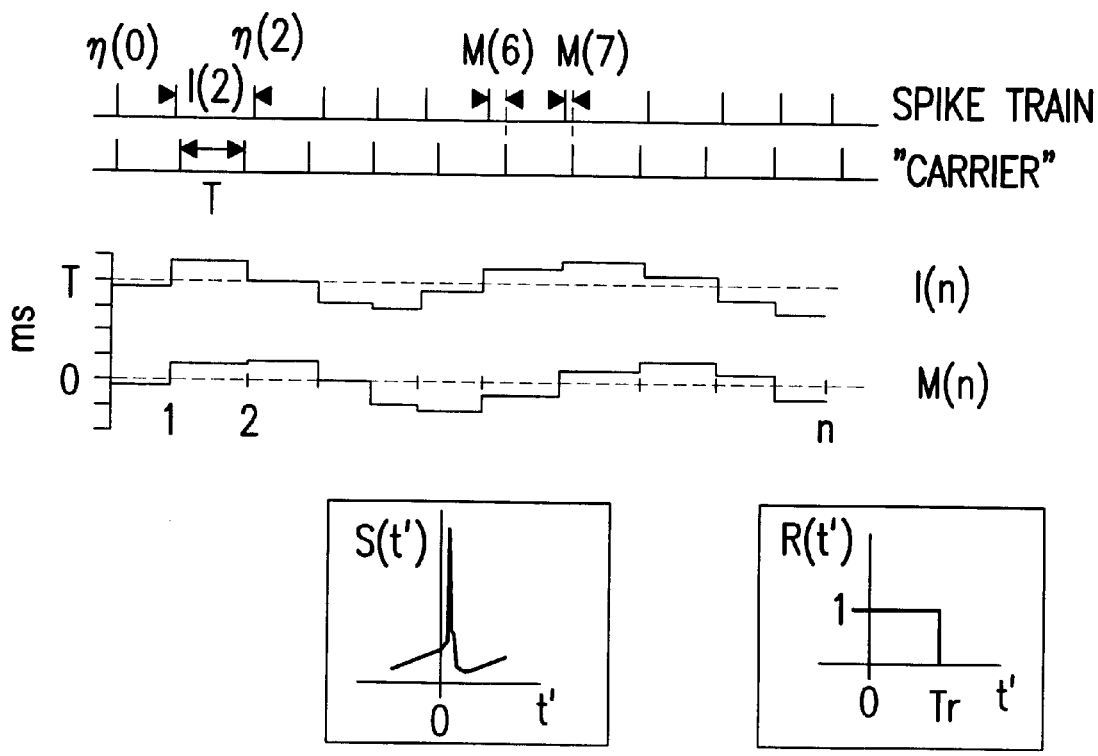
FIG. 1a shows a series of waveforms which illustrate temporal encoding of an input pulse train.

Forced oscillations at the level of the OSCs may simply indicate that the OSCs are forced directly by the input via thalamic "relay" neurons (FIG. 1C). This implementation gives rise to temporal-to-phase decoding: the temporal information is encoded in the relative phases of an ensemble of OSCs, where OSCs with different intrinsic frequencies oscillate at different phases. A strong indicator of such "direct coupling" is that the response characteristics of the thalamic neurons should follow the peripheral ones. The response intensities (per cycle) and latencies of most of the vibrissal afferents are determined by the amplitude and velocity of the whisker stimulations independent of the frequency (up to, at least, 50 Hz) at which the stimulations are repeated. Similarly, if thalamic neurons only relay input information, whisker stimulations at 1–12 Hz with constant amplitude and velocity should yield constant thalamic output rates (per cycle) and latencies (FIG. 1D).

Figure 14C:
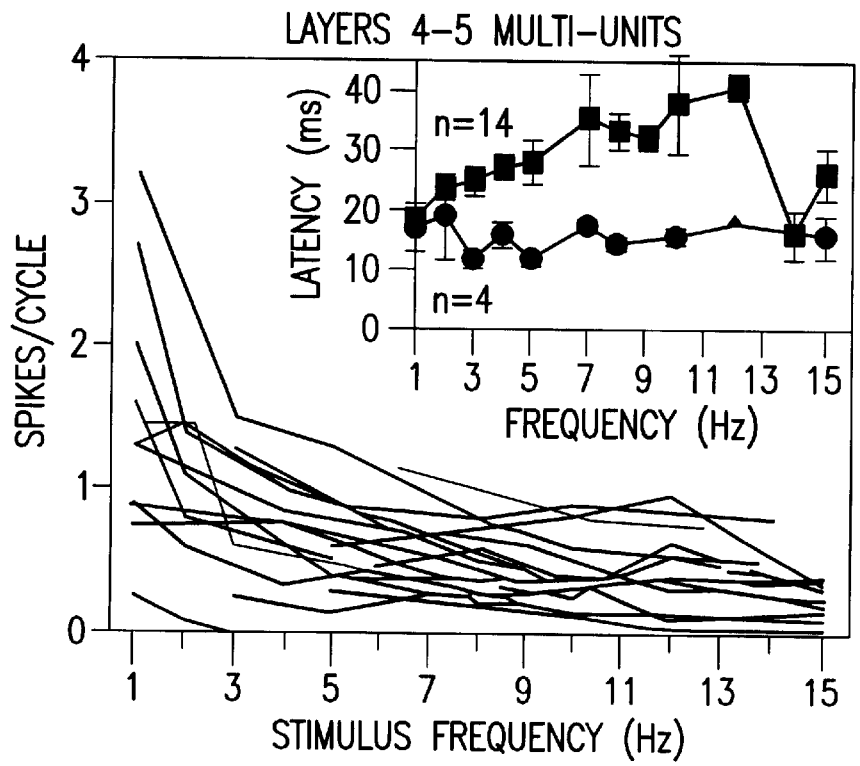
FIGS. 14c and 14d shows the responses of non-OSC multiunits from layers 4 and 5 of the rat barrel cortex to pulse stimuli applied to their principal whiskers.
Figure 14D:
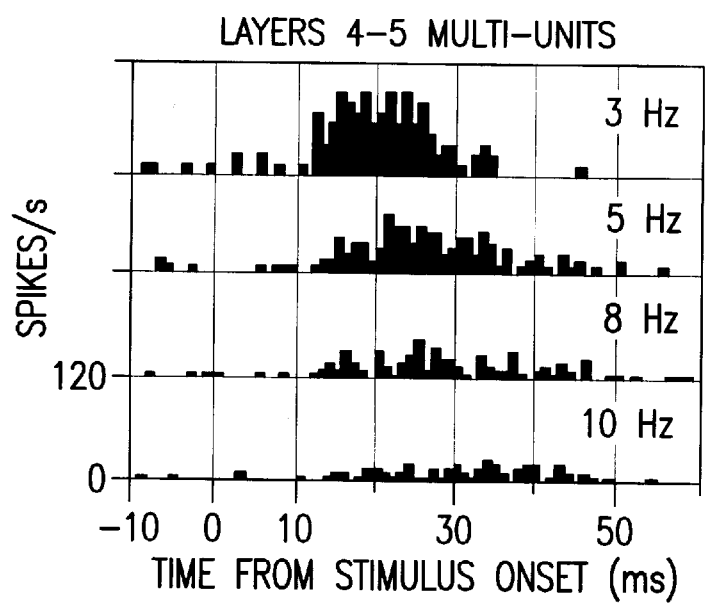

To characterize the thalamic input to the barrel cortex, during the same vertical penetrations in which OSCs were recorded, the activity of non-OSCs was recorded in layers 4–5, layers that receive most of the thalamic input. To keep peripheral responses (per cycle) constant, the whiskers were deflected with pulses of a constant amplitude and velocity, and varied only the inter-pulse-interval to obtain different frequencies (pulse stimuli, see 4.1.2). While layers 4–5 non-OSCs were entrained by almost all frequencies between 1 to 15 Hz, their response intensities and latencies, unlike the expected peripheral responses, usually varied (decreasing and increasing, respectively) with increasing frequency (FIGS. 14C,D). Both latency-to-onset and latency-to-peak increased with the input frequency, with the latter exhibiting a more pronounced dependency. The increased latency was not a by-product of the decreased intensity since, with constant input frequencies, there was no correlation between latencies and response intensities among these neurons ($r^2=0.03$, n=69, p>0.2). The dissociation between the response characteristics of layers 4–5 non-OSCs and those expected at the periphery strongly suggests that thalamic neurons did not merely relay sensory oscillations but, rather, participated in their processing. This finding is consistent with previous findings describing significant transformations at the level of thalamic "relay" neurons.

FIGS. 14a–d show a comparison of OSCs and non-OSCs response characteristics. FIG. 14a depicts entrainment tuning curves for 13 OSCs of the barrel cortex. OSCs were recorded from layers II–III (n=4), IV (n=3) and V–VI (n=6) and their principal whiskers were stimulated with either square-wave or pulse stimuli. Symbols show the spontaneous frequencies of these oscillators. Locking index =$1-|f_i-f_o|/(f_i+f_o)$ where $f_i$ is the stimulation frequency and $f_o$ is the oscillator frequency during stimulation. Oscillators were grouped by their locking ranges.

OSC-delays of the 13 OSCs are shown in FIG. 14b. OSC-delays were measured from PSTHs as the delays between stimulus onset and onset of the closest activity peak of the oscillator. Oscillators that showed no dependency [n=4, circles, all showed wide lock-in ranges (A, lower panel)] were pooled up separately. Different OSCs were tested with different frequencies. Small symbols indicate n=1 for that frequency. Vertical lines indicate standard errors of the means.

Finally, FIGS. 14c and d shown responses of non-OSC multi-units from layers 4–5 of the rat barrel cortex to pulse-stimuli applied to their principal whiskers. In FIG. 14c, dependency of multi-unit (n=18) output rates and latencies-to-peak (inset) on the stimulus frequency are shown. All spikes that were elicited between 10 to 60 ms from the stimulus onset were counted and averaged over all repetitions of the same stimulus frequency. Latencies to peak response were measured from PSTHs, such as those in D. Neurons that showed no dependency (n=4, circles) were pooled up separately. Symbols and vertical lines are the same as those in B. In the PSTHs of a layer 5 non-OSC multi-unit to different stimulus frequencies (FIG. 14d), increased latency and reduced output rate accompanied increased stimulus frequency.

The Phase-locked Loop Model

The above observations are consistent with the proposition that entire thalamocortical loops (containing the OSCs) behave as forced oscillations, and, in particular, implement NPLLS. FIG. 15 is a schematic depiction of a thalamocortical inhibitory phase-locked loop (iPLL) decoder. In the figure, PD is a phase-detector; RCO is an rate-controlled oscillator; INH is an inhibitory neuron;—is an inhibitory connection; $\eta_o$ is the time of the recent RCO spike; $\eta_1$ is the time of the recent input spike.

In general, the iPLL requires an increasing RCO transfer function and a decreasing PD transfer function (FIG. 15b) with the RCO-delay being directly related to the input frequency. The transfer functions should be monotonic, but not necessarily linear, within the PLL's working ranges. The PD's output decreases as the RCO-delay ($\eta_o-\eta^i$) increases (PD curve). The RCO's firing time is delayed as the PD's output is increased (RCO curves). The exact relation between the two transfer functions depends on the input frequency (f1<f2<f3); stable (crossing) working points for higher frequencies are associated with larger RCO-delays and lower outputs.

Thus, unlike direct coupling, the iPLL predicts that thalamic output rates (per cycle) will decrease while OSC-delays and thalamic latencies will increase with increasing input frequencies. Indeed, these predictions agree with the locking characteristics of cortical OSCs and the response characteristics of non-OSCs in the thalamic-recipient layers of the cortex (FIGS. 13 & 14). However, causal relationships between OSCs and layers 4–5 non-OSCs could not be determined since only rarely were these two cell types recorded simultaneously, and the non-OSC responses were averaged over the entire stimulation period, regardless of the locking state of the presumed underlying phase-locked loops.

Simulations

Figure 15A:
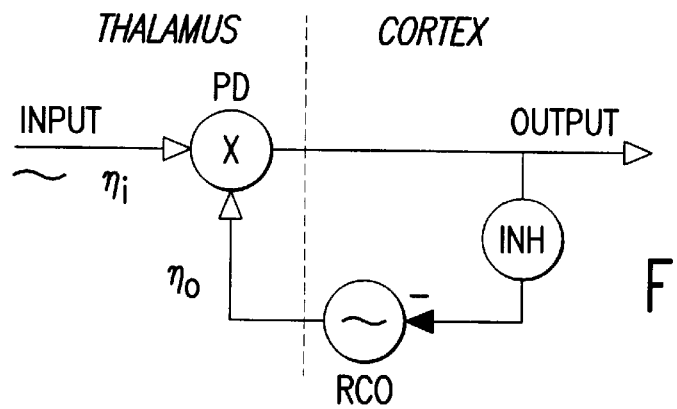
FIG. 15a is a schematic depiction of a thalamo-cortical inhibitory phase-locked loop (iPLL) decoder.
Figure 15B:
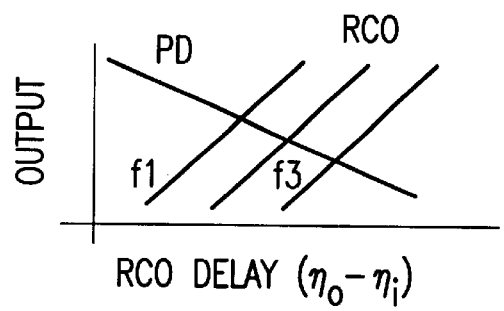
FIG. 15b is a graphic depiction of the iPLL transfer functions.
Figure 15D:
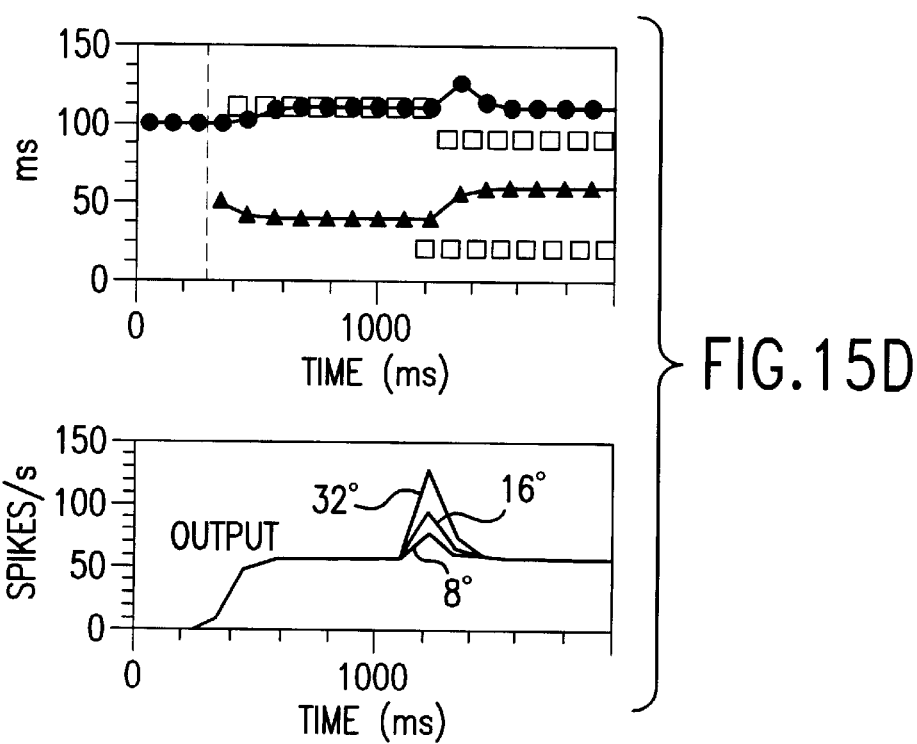
FIG. 15d is a graphic depiction simulating an iPLL: object localization.
Figure 15C:
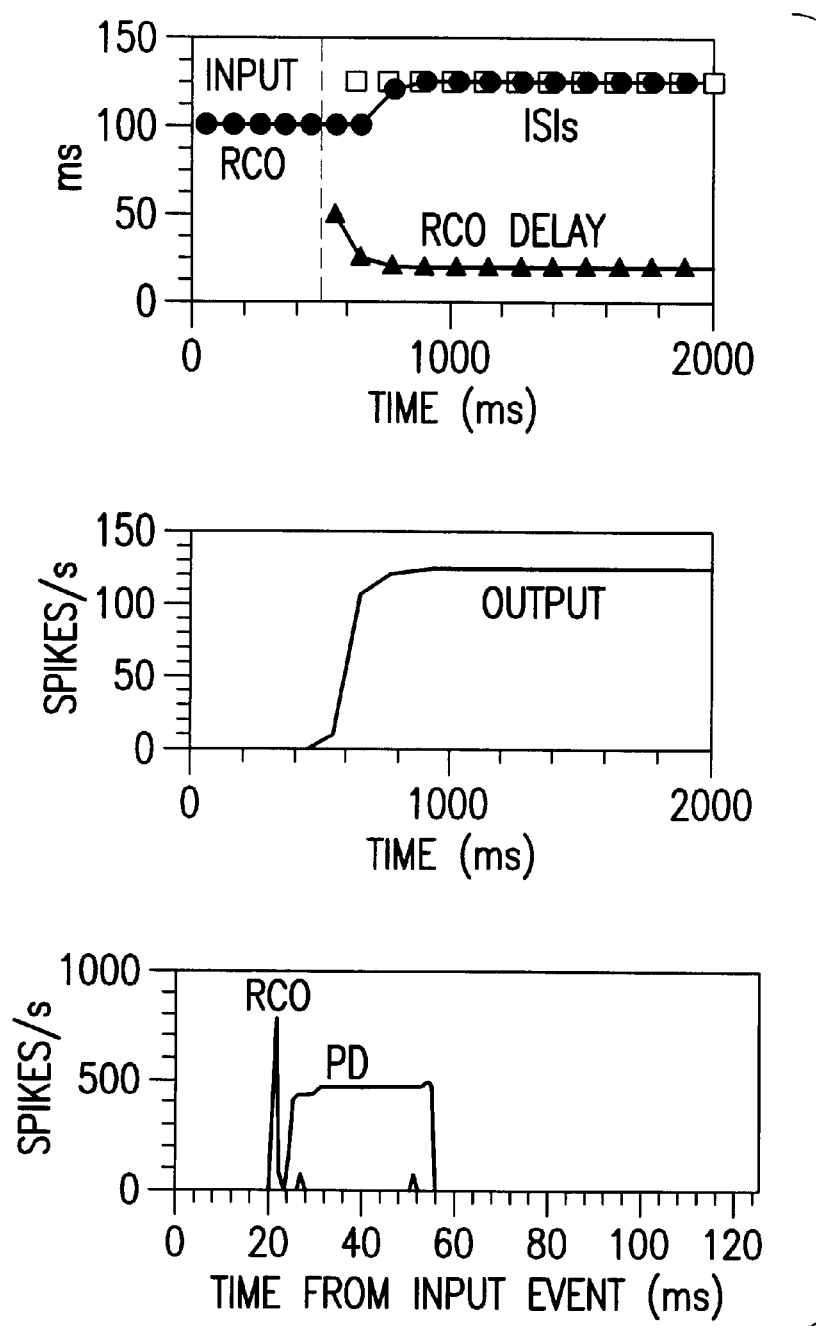
FIG. 15c is a graphic depiction simulating an iPLL: steady input.

The operation of the PLL, the compatibility of its response with the experimental data and its predicted behavior during object localization were demonstrated by computer simulations, as described above. The response of an iPLL to a steady input rhythm, such as whisking in a free-field, is depicted in FIG. 15c. Frequency and phase locking-in are depicted in the upper panel. Stimulus started at t=500 ms (dashed line). The RCO's ISI (J) followed the input's ISI (G) . During the phase-locked state, the RCO-delay (upper panel) and the output rate ($N_d/I_o$) of the average single PD neuron (middle panel) were stabilized at values that represented the input frequency. The cycle histograms (lower panel) describe the instantaneous firing rates of the RCO and of the PD as functions of the input phase. After phase-locking was achieved, the RCO's firing always preceded the PD's firing.

Once phase-locking is obtained, the RCO's ISI equals the input's ISI (FIG. 15c, upper panel), the RCO's delay (upper panel) and the output's firing rate (middle panel) stabilize at values that represent the input frequency, and, in agreement with experimental data, "cortical" RCOs phase-lead the "thalamic" PDs (lower panel). The location of an object that is introduced in the whisking field is encoded in the input ISIs by inserting, in every whisking cycle, an additional input spike at the time when the whisker would have touched the object (FIG. 15d, upper panel). The iPLL responds by temporarily increasing the rate of the PD (FIG. 5D, lower panel) until a new phase relation is established (upper panel). The level of the transient output rate of the PLL is directly related to, and thus re-encodes, the object's location. Such responses are predicted for thalamic, or thalamic-recipient, non-OSCs during active whisking that is perturbed by an external object.

FIG. 15d illustrates a simulation of an iPLL for object localization. The whisking (period of 110 ms) commenced at t=410 ms and the object was introduced at t=1200 ms and at a spatial angle of 32°. The introduction of the object was simulated by inserting, in every whisking cycle, an additional input spike at the time when the whisker would have touched the object (20 ms from the protraction onset). After a transient response, the PLL re-locked to the full whisking cycle, but with a new phase (upper panel). Different object locations (8°, 16° and 32°) yielded, and thus, are encoded by, different magnitudes of the transient response (lower panel).

Advantages and Limitations of NPLLS

The PLL algorithm is used extensively in electrical engineering for decoding of phase and frequency modulated signals, for frequency synthesis, and for pulse synchronization. When utilized as a phase. demodulator, an NPLL exhibits an excellent noise-immunity, due to its adaptive narrowband filtering. This narrowband filtering is achieved by comparing the input against a specific internal frequency, and becomes adaptive because of the feedback control of the internal frequency.

In principle, temporally-encoded neuronal signals (FIG. 1) are phase modulated signals, therefore, the brains utilization of an NPLL mechanism to decode temporally-encoded signals should be advantageous. However, there are limitations inherent in the NPLL mechanism that require compensation. One limitation arises from the adaptive behavior of the NPLL, which limits the PLL's capacity to track rapid changes in the input. As with any-other negative feedback loop, a few input cycles may be needed before the NPLL can lock-in to a new input and efficient decoding can commence. Nevertheless, learning-induced fine tunings of the loop parameters can reduce to a minimum (down to 1 cycle) the number of lock-in cycles.

Another limitation of NPLLs stems from the limited working ranges of their implementations. An NPLL cannot track, and thus, cannot decode, input modulations that are too large. The working ranges of basic neuronal NPLLs are usually around half a cycle, with the upper limit probably being one cycle (see 2.2). Thus, a typical "non-sophisticated" neuronal NPLL is limited to decoding inputs with modulation depths of less than 50%. If an RCO cannot produce the required frequencies, the PLL's working range will be limited even more. This limitation can be circumvented by having several NPLL circuits in parallel, each tuned to a different frequency range and decoding a different segment of the input information. In addition, "Sophisticated" implementations of PDs can extend working ranges and reduce lock-in times.

A significant advantage of neuronal PDs is that transitions from one implementation to another can occur within a given anatomical circuit by changing cellular parameters. For example, at low excitability levels a PD neuron can implement an AND-like function, at high excitability levels an OR-like function, and at intermediate excitability levels an AOR-like function as noted previously. Thus, neuronal NPLLs can dynamically change their loop parameters, including gain and working range, to accommodate to global sensory changes or requirements. For example, a full-cycle working range can be implemented by asymmetrical PDs that employ an AND-like function for negative phase differences [$\eta_o(n) - \eta_r(n) < 0$] and an OR-like function for positive phase differences. In such an asymmetrical AOR-like PD the order of input activation determines the sensitivity of the PD neurons. The periodic PD transfer function of such asymmetrical PDs has a shape of a saw-tooth, instead of the triangular shape of the symmetrical PDs (FIG. 4d). The advantages of a saw-tooth PD function are: (i) the working ranges are larger and (ii) with very large input modulations the NPLL immediately shifts to another valid working range.

Other options that are available for neuronal NPLLs are dynamic tuning of the RCO's local frequency, asymmetric RCO transfer functions, and combined excitatory-inhibitory implementations of NPLLs (FIG. 3a) with asymmetric or dynamically-shifted relative weights.

When included within AVC loops, extremely fine resolutions can be obtained by NPLLs by lowering the input temporal frequency by, for example, lowering hand velocity during tactile scanning.

Applications of NPLLs

Unlike the electronic PLL, the NPLL is a stochastic and adaptive device. NPLLs can deal with signals whose exact characteristics are not known in advance, and it can adapt to changing conditions. It is ideal for low frequency applications (1–200 Hz). NPLLs can be applied for the following tasks:

Speech Recognition

NPLLs can decode the speech information contained in the temporal envelope of speech signals. Their outputs can be utilized to trigger and synchronize spectral processing of the different phonemes.

Artificial Touch

Texture identification: NPLLs can decode the temporal information that is collected when a tactile sensor is traversing the surface of a static or moving object. Motion detection: NPLLs can detect the frequency shift produced by object motion against sensor motion.

The implementation of NPLLs to tactual tasks is based on the assumed operation of the human tactual system. It includes two main parts: Temporal encoding by finger oscillations ("tremor") and decoding using NPLLs. The benefits of this system are:

1. increased sampling resolution beyond the spatial resolution which is allowed by the sensor-array's grain.
2. extremely sensitive motion (slip) detection.
3. reliable and low-noise decoding of shape and motion by NPLLs.

Two main implementations are described here:
1. Object identification. Tactual implementation of NPLLs for object identification have been described in connection with FIGS. 8 and 9.
2. Grip control. The NPLLs can be implemented for the tactual control of grip. When a robot arm grips an object it uses two or three "fingers". The task is to prevent slip of the object across the fingers' surface.

Implementation requires that an array of tactual sensors (pressure or displacement or both) will be attached to at least one finger surface. This is analogous to the photodetector array of the video camera described below. This sensory array should be vibrated with at least two different frequencies, to produce the required temporal encoding with hyperacuity resolution and to allow aliasing protection. The rest of the implementation is essentially identical to the visual technique described below.

Figure 5B:
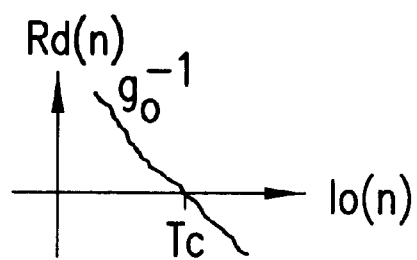
FIG. 5b is a diagram which shows a transfer function of a rate controlled oscillator.

FIG. 5 shows a global circuit design and servo-loop for grip control. The temporal decoder is a part of a global decoder which also includes a spatial decoder based on sensors locations. Two "fingers" are shown. At least one should include a sensor array on the finger-tip. The sensor-array in the figure is enlarged for illustration. The sensor-array movements ("finger tremor" only vertical movements are shown) is controlled by an oscillator (not shown). As in FIG. 19, IF's are a set of intermediate filters that are centered around the working NPLL frequencies; while delta, alpha, gamma are different frequency ranges to which NPLLs are tuned and in which the fingers are vibrated.

The task here is similar to the visual task of preventing image slip across the photodetectors array. The circuit thus is similar to that in FIG. 19, except that the sensory array is constructed from tactual sensors, and the output control of the servo-loop controls the finger's force.

Artificial Vision

Position and shape identification: NPLLs can decode the temporal information that is collected when an optical sensor is scanning a static or moving image Motion detection: NPLLs can detect the frequency shift produced by object motion against sensor motion.

In principle, NPLLs can be used in almost any task that requires decoding of temporally-encoded information. Such an encoding usually occurs when a sensor is moving against a solid object or when the object is moving. In the cases of sensor movements, extremely fine resolutions can be achieved by manipulating the scanning velocity.

The implementation of NPLLs to vision is based on the assumed operation of the human visual system. It includes two main parts: Temporal encoding by camera oscillations and decoding using NPLLs. The benefits of this system are:
1. increased sampling resolution beyond the spatial resolution which is allowed by the camera's photodetector grain (the increased resolution is called here hyperacuity).
2. extremely sensitive motion detection.
3. reliable and low-noise decoding of shape and motion by NPLLs.

Temporal Encoding

During fixation on an image, the video camera is vibrated along at least two axes (termed: horizontal and vertical) and with at least two frequencies (termed: alpha and gamma). The two frequencies and movement directions can be superimposed or cascaded in time. Each frequency epoch in each direction should consist of at least 3 cycles, depending on the NPLL parameters. These fixational camera movements will be referred herein as "FcamM".

Figure 16A:
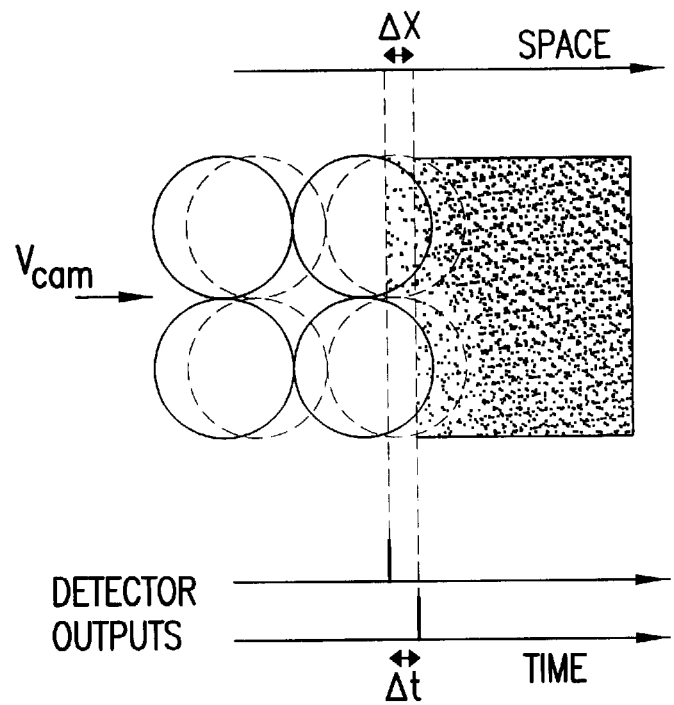
FIG. 16a illustrates the scanning of an irregularly shaped rectilinear object by a camera having four sensor elements.
Figure 16B:
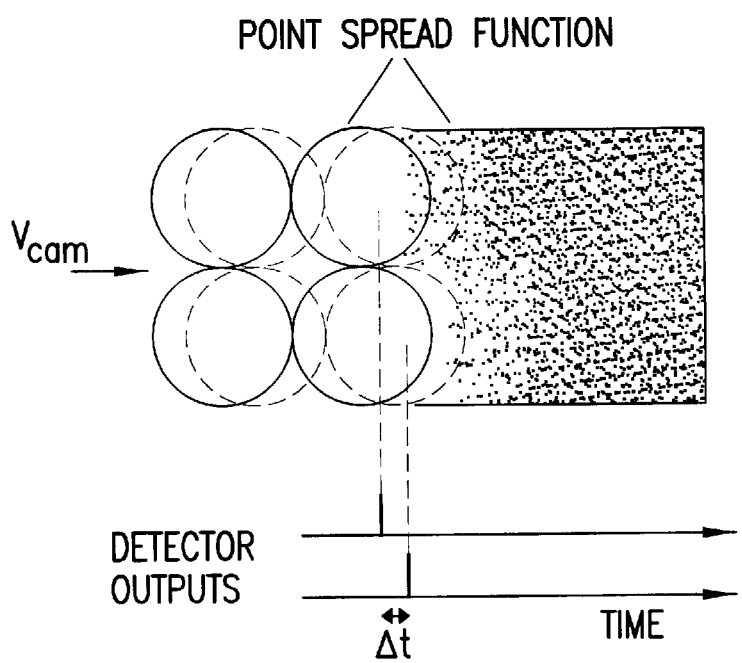
FIG. 16b illustrates the resistance of the sensing system of FIG. 16a to the effect of blurring of the edges of the sensed object.

During FcamM, spatial phases (i.e., locations) are translated to temporal phases (i.e., delays) of the camera's photodetectors (hereafter, detectors) activations. In FIG. 16a, for example, 4 camera detectors are depicted scanning an irregularly shaped object. During rightward camera movement, the detectors move to the right. (Circles at time t are solid, and circles at time t+$\Delta$t are represented by broken lines.) Since the camera detectors are activated by a threshold crossing, the spatial offset ($\Delta$x) is translated to a temporal delay ($\Delta$t=$\Delta$x/V, where V is the camera velocity) between the activations of spatially aligned detectors. The resolution of this temporal encoding is not limited by the spatial resolution of the detector mosaic but rather by the temporal resolution and temporal noise (jitter) of detector activations and it depends on the velocity of the camera. For example, with camera velocities between 10 and 100 '/s, (' stands for arcminute and " for arcsecond) two edges that are displaced by 6" will activate their corresponding detectors with relative delays between 10 and 1 ms, respectively. This temporal encoding is resistant to optical blurring due to its differential nature; optical blurring of a sharp edge (FIG. 16b) will shift spikes of both detectors by, roughly, the same amount such that the temporal delay ($\Delta$t) is not affected, except for an increased noise due to the reduced intensity gradient.

Dynamic Sampling of Stationary Image

Figure 17:
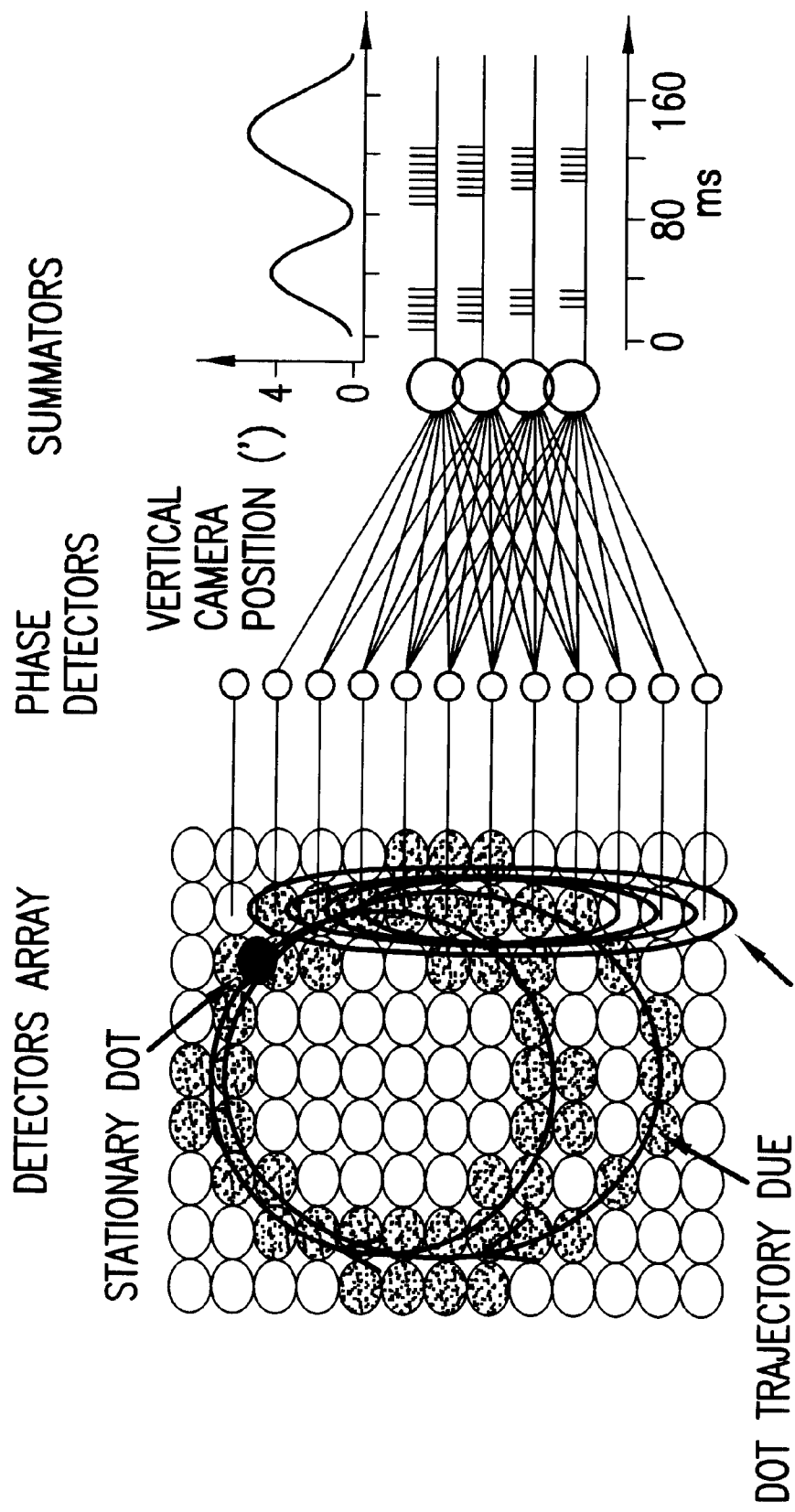
FIG. 17 is a schematic depiction of a sensor array and the processing of signals therefrom.

In FIG. 17, a rectangular detector mosaic (left) scans a stationary dot. Every circle represents a single detector. Two consecutive cycles of FcamM are depicted, producing two cycles of dot trajectory. The four summation units receive their inputs, via phase detector units, from elongated detectors fields. Every entrance of the dot to a detector field produces a spike that can propagate to the summation units' output (right). Different sRFs produce spike bursts with different phases and lengths depending on their intersection with the dot trajectory.

Each detector samples the external visual field with the frequency of the FcamM and neighboring detectors sample the same location in the visual field one after another. The movement trajectory of the camera determines the trajectory of each external dot or edge ("edges" herein refer to localized, not necessarily elongated, brightness changes) across the detectors array, as depicted in FIG. 17, left.

To illustrate the encoding process, a part of the decoding circuit, referred to herein as the feedforward part, is first described schematically. The complete decoding circuit is described below. Linear arrays of detectors (FIG. 17, sRFs, or "simple receptive fields") send their outputs, via phase detectors, to single summation units. The summation units produce one output spike for each input spike arriving from their corresponding phase detectors.

If only feedforward circuits are assumed, the duration of a response burst (a sequence of pulses) of the summation units should be proportional to the duration of the intersection of the dot trajectory and the sRF (FIG. 17). This is referred to as a "feedforward (FF) response" to distinguish it from the actual closed-loop response that occurs during active vision (see below). The FF responses contain information about the spatial details of the image and about the actual movement of the camera. The camera-movement information can be utilized within a global framework when processing the entire scene or resolving absolute localization. The present invention is directed, however, to the level of local decoding, in which hyperacuities are, obtained and in which the absolute location of the camera is not required.

In the schematic example in FIG. 18a, the external image includes a stationary object, which contains a stepped edge, and a moving bar, both having the same color and luminance. When traversed by the camera, these objects are encoded in time by the horizontal sRFs. The right-most camera position is marked by the dashed rectangle.

To illustrate the temporal encoding, the simple case is used: a single FcamM epoch in which the fovea scans the stimulus periodically, with a single frequency of 12.5 Hz, and a typical horizontal peak-to-peak amplitude of 4' (FIG. 17a). A burst of 6 spikes per FcamM cycle comprises the FF spike train of each of the 4 horizontal sRFs that traverse the objects (FIG. 18b). Note that each of these bursts describes a population response of detectors incorporated within a single sRF.

Encoding of Shape

Since the movement of the stationary object across the detector array is spatially coherent, the relative temporal phases of the FF bursts encode the relative spatial locations (spatial orientation) of the edge-steps. In this example, spatial offsets of 15" are encoded by temporal delays of ~2.5 ms.

Encoding of Motion

Movements of objects within the visual field produce Doppler-shifts of the detector activation frequencies. For example, an edge moving towards an sRF (FIG. 18a) shortens the interval between successive detector activations caused by the FcamM oscillation (peak-to-peak amplitude 4' and frequency 12.5 Hz). This shortening, which is proportional to the object velocity, results in increased FF inter-burst and intra-burst frequencies relative to adjacent FF signals whose sRFs scan stationary objects. In the example, the horizontal bar starts to move leftward (arrow) during the first FcamM cycle at $t_o$+20 ms, with a velocity of 3'/sec, as shown in FIG. 18b. As a result, the FF frequencies increase: the inter-burst period is shortened by 2.5 ms, whereas the intra-burst shortening is too small to be expressed by our graphic resolution.

The decoding of these signals requires the determination of the times of burst initiations; if two neighboring sRFs are compared at the wrong time, say at the middle of a burst, the temporal relationships between the two will not represent the external shape.

Temporal Decoding

Figure 18C:
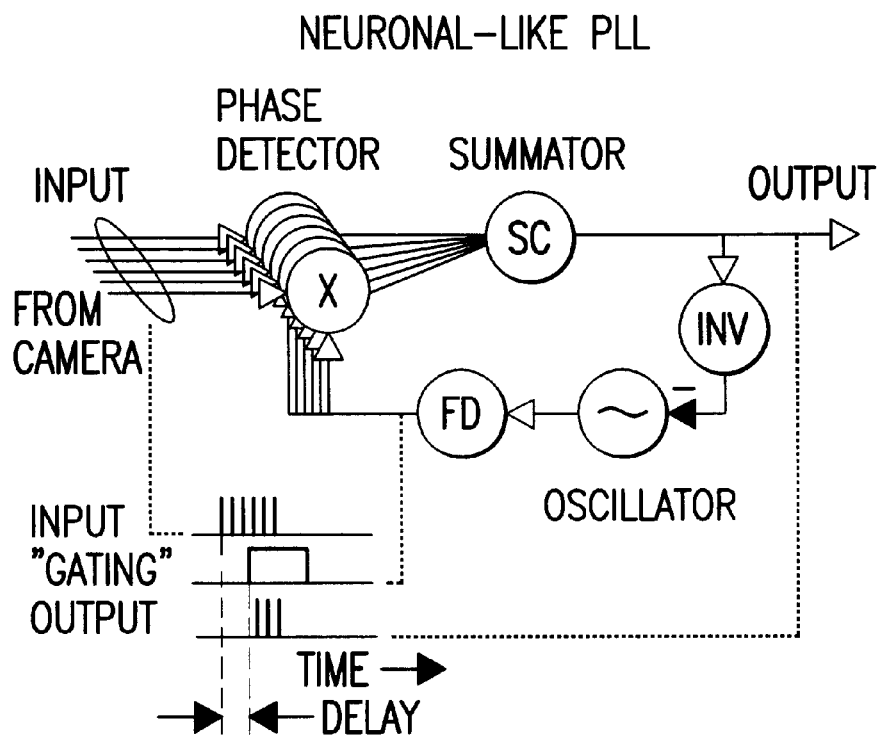
FIG. 18c is a schematic illustration of an NPLL decoder circuit, and also illustrates the implementation of phase detection by gating.

Decoding is performed by NPLL circuits. Every summation unit and phase detector array is included within a single NPLL as described in FIG. 3c, which is a schematic description of the NPLL decoder. In FIG. 18c, solid arrows represent inversions. SC are summation units; INV is an inverter; and FD are feedback drivers. The waveforms illustrate implementation of the phase detection function by gating, with dotted lines indicating the origin of the signals. This now completes the description of the decoding circuit, part of which was schematically described in FIG. 17. The phase-locking machinery ensures that the processing is done cycle-by-cycle, where every processing cycle is locked to an FcamM cycle (by the NPLL). While locked, the output of the NPLLs recode the detector frequency by spike count (per cycle) as discussed below, according to the loop transfer functions, and preserve the temporal phase relationships of the detector outputs.

FIG. 3d shows schematic examples of the two basic transfer functions of the loop, plotted on the same axes. The solid curve describes the transfer function of the summation units, relating their outputs to the Delay. The dashed curve describes the transfer function of the oscillators, relating the Delay to the summation units' output. The crossing point is the loop working point for a specific detectors temporal frequency.

Phase Locking

The oscillations produce internal expectations regarding the timing (phase) of the next detector output. For a given detector location and its corresponding NPLL, deviations of the detector output from its expected timing are detected by the phase-detectors. Such deviations affect the summation units' spike count, and thereby, re-adjust the period of subsequent internal oscillation cycles, in the manner described below. For example, assume that the input period changes from 80 to 77.5 ms, as is the case with the moving bar in FIG. 18a, b. Since the internal expectation for the next cycle (second cycle in FIG. 18) is still 80 ms, the phase difference between the input and the internal oscillations will decrease (from 3 to 2 spikes, FIG. 18f), the internal inhibitaiton will decrease and, thus, the internal oscillating period of the next cycle will decrease.

In this example, optimal loop parameters were depicted in which the first correction of the oscillating period is the required one, and thus the loop is already stabilized at its new working point (that is, period=77.5 ms, Delay=10 ms, output=2 spike/cycle) one cycle after the change in the input occurred. With less optimal parameters a new stabilization might take more than a single cycle. In any case, if the detector frequency is within the loop working range, the internal period is forced to converge to the input period since, due to the negative feedback, the phase=detector "error signal" will always drive the internal oscillations in the direction that will tend to cancel the "error".

Note that the stabilized output spike count is determined by the inter-burst frequency; for decreasing detectors periods (increasing frequencies) the loop working point (FIG. 18d) will move to the right, towards longer delays. Variations in conduction velocities or changes in the intra-burst frequency will be compensated by suitable adjustments of the Delay.

Internal Representations

Figure 18D:
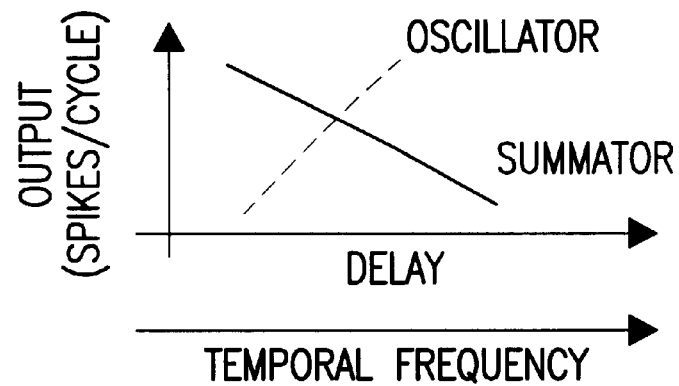

During fixation, if thresholds and synaptic gains are optimally tuned, only those detector signals that phase-lag (that is, arrive after) the internal feedback will pass the phase-detector "gate" (FIG. 18c inset and FIG. 18e) and activate the summation units (FIG. 18f). With less optimal tuning, some background activity will add to these signals. In any case, the phase differences are translated into spike counts (per cycle) of summation units (FIG. 18d). The phase difference is proportional to the internal oscillating frequency which is locked (and thus is identical) to the inter-burst frequency of the detectors output. Thus, inter-burst frequencies of detectors composing an sRF, are translated to spike counts of their corresponding summation units.

Since detector inter-burst frequencies represent external velocities, these velocities are represented, at the internal level, by spike counts of summation units. In our example (FIG. 18a), the leftward movement is represented by a reduction of one spike cycle from the corresponding summation units' output (FIG. 18f). Note that this coding scheme is differential: local motion is coded by the difference between the spike counts of neighboring summators. Thus, although absolute values of spike counts can vary with variations in FcamM, the local difference due to external motion will remain. External shapes are also coded differentially in this scheme and are represented by temporal phase relationships among neighboring summation units (FIG. 18f, first cycle)

Complications

To prevent aliasing (which occurs when the sampling frequency is too close to the sampled frequency), and to improve efficiency, temporal encoding should rely on different frequencies (at least two). During a fixation period, different frequencies can be superimposed or appear sequentially. The decoding demonstration (FIG. 18) assumes the latter. With superposition of different FcamM frequencies, higher frequencies will be spatially drifting and consequent cycles will not start at the same detector location. Thus, NPLL circuits should be coupled such that locking information propagates to neighboring circuits, which continue to track the drifting image. A significant facilitation of this process, as well as of initial locking-in after large camera movements, for example to new fixation points, can be provided by efferent copies of the FcamM commands.

With the camera position drafts, the frequency of the Ff bursts can change also with stationary stimuli, due to the same Doppler shifts described above, now caused by the camera drift. However, this change will be common to the entire image and should not interfere with the differential coding. Reading out this differential information should involve lateral comparisons of outputs of the summation units.

The internal representations depend on the ratios between the amplitude of the FcamM (A), the sRF length (L) and the external spatial periods (SP,=1/spatial frequency). The description so far focused on the cases in which A<SP and L<SP. In these cases, external velocities (V) are represented by internal spike counts could be induced by different combinations of SP and V. In cases in which L>SP, aliasing problems are introduced, causing additional ambiguities. However, there should be enough information available to the system to resolve all these ambiguities, utilizing intra-burst frequencies, lateral comparisons, and orientations of sRFs. Alternatively, such ambiguous coding can be avoided by relying only on those NPLL circuits for which, in given epoch, A=L<SP. This can be implemented by having high-frequency low-amplitude FcamM for foveal vision and FcamM with increasing amplitudes (and decreasing frequencies) for increasingly eccentric vision.

Local Hyperacuity Versus Absolute Acuity

The temporal encoding/decoding scheme presented here is optimal for local hyperacuity—it emphasizes local differences in both spatial phases and motion, and allows a resolution that is significantly better than that of the spatial detectors. For absolute hyperacuity the exact camera movement should be computed and compared with the detector activation times.

Global Arrangement and Servo-loop

Figure 19:
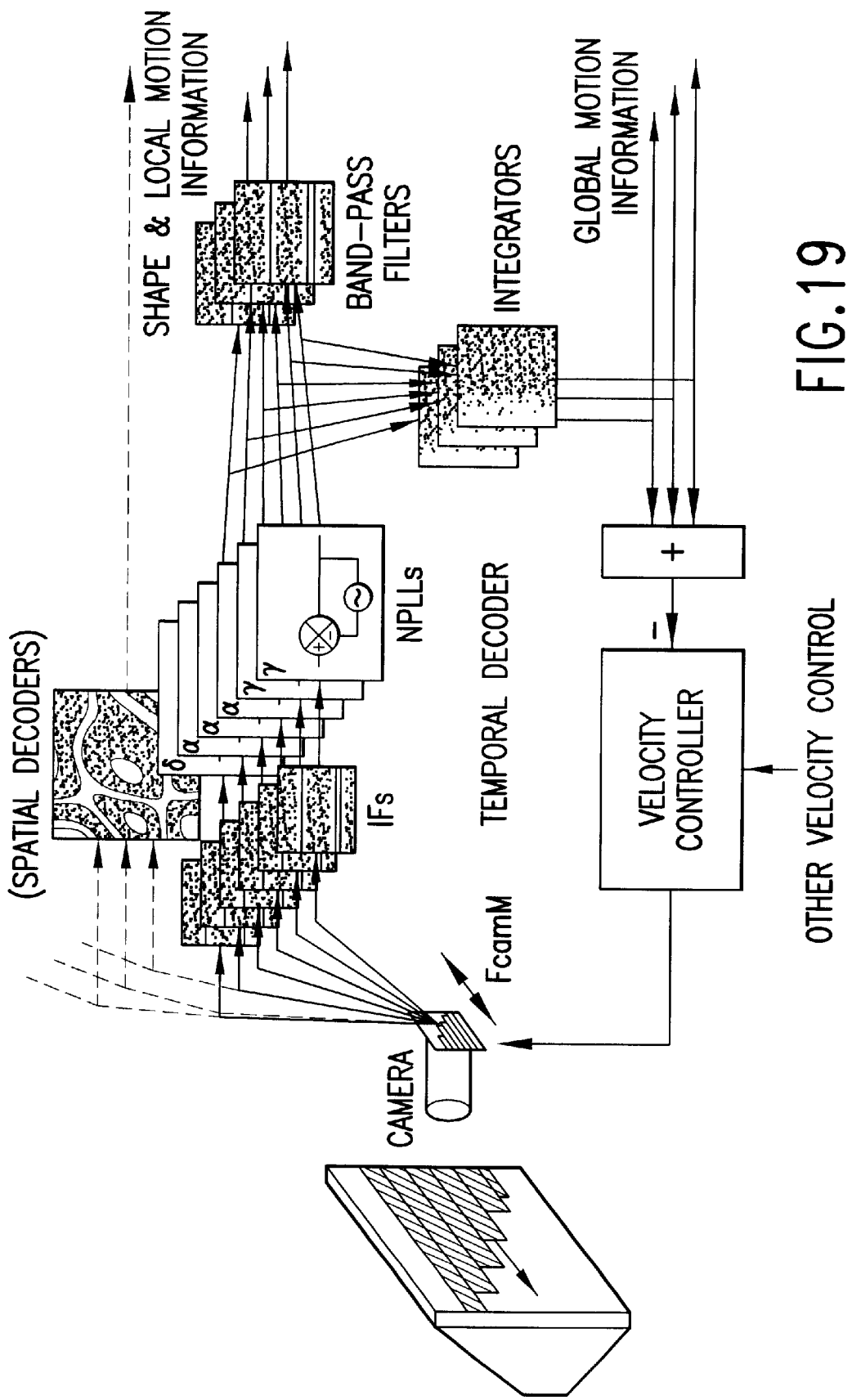
FIG. 19 shows a global circuit design and servo-loop for a visual system based on the NPLL.
Figure 20:
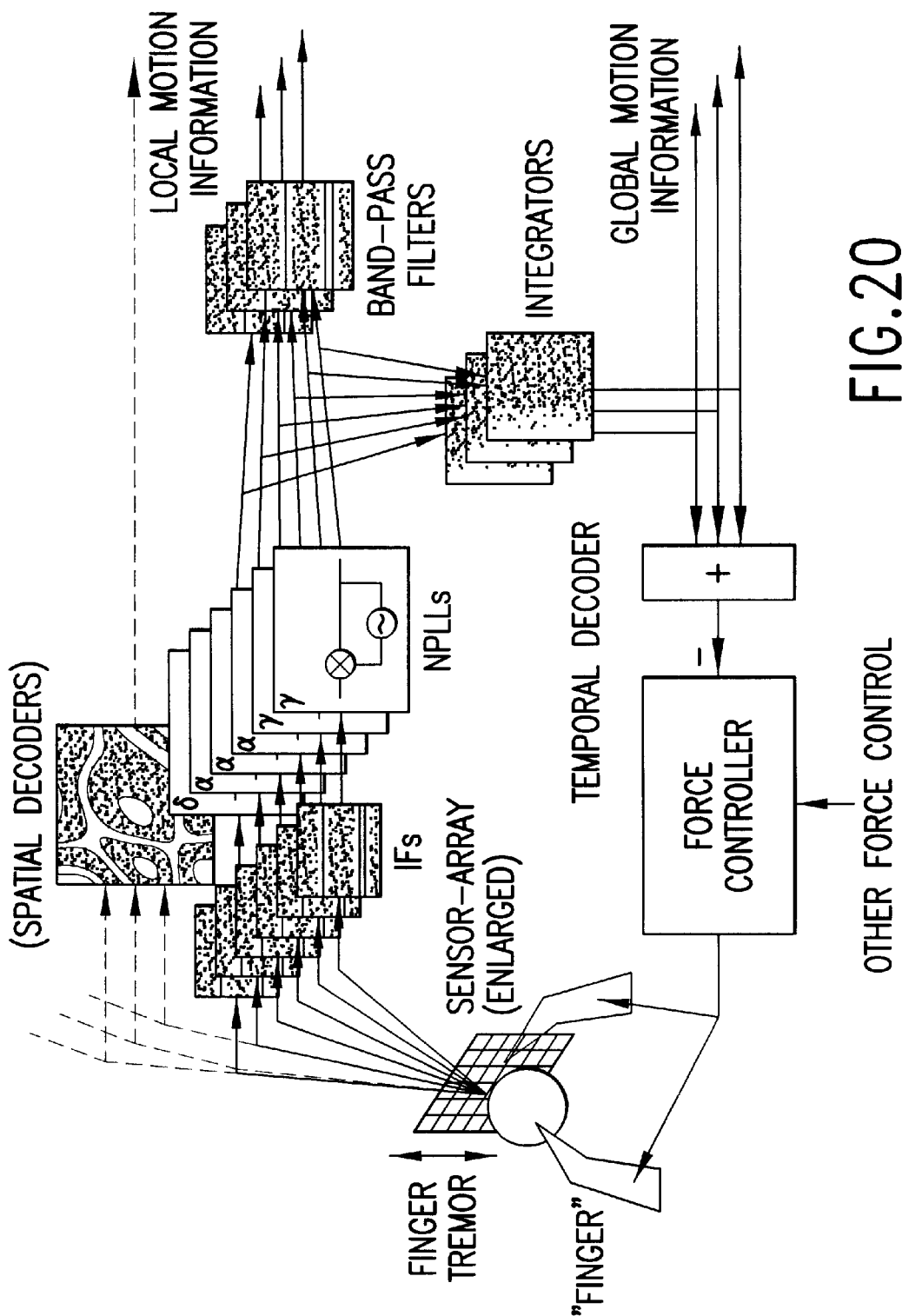
FIG. 20 shows a global design and servo-loop for implementation of grip control, utilizing the NPLL.

To efficiently decode different encoding frequencies and locations in parallel, many NPLL circuits should operate in parallel. FIG. 19 shows such a global circuit design and servo-loop for visual system. The temporal decoder is a part of a global decoder which also includes a spatial decoder, based on detector locations. The camera movement (only horizontal movements are shown) is controlled by the velocity controller. IFs are a set of intermediate filters that are centered around the working NPLL frequencies; delta, alpha, gamma are different frequency ranges to which NPLLs are tuned and in which the camera is vibrated.

Different NPLLs should work around slightly different intrinsic frequencies, distributed around the main sampling frequencies employed (e.g., delta, alpha, gamma). To allow object tracking, or to keep the retinal velocity around a desired value, the system has to compensate for object motions. From the NPLL point of view, the optimal control parameter is the collective output of all relevant NPLLS. The system can employ a servo-loop such as the one depicted in FIG. 19, in which the collective NPLLs' output is the controlled parameter. The system will drive the camera with amplitude and direction that will keep the NPLLs' collective output constant.

The circuits that readout the NPLLs outputs ideally use lateral comparisons (i.e., between parallel NPLLs) to solve ambiguities and to prevent aliasing (by comparison of the outputs of at least two different NPLLs tuned to different frequencies)

Experimental Evidence for Thalamocortical Tactile NPLLs

Current physiological and anatomical data are compatible with NPLLs being implemented within and across the thalamic ventrobasal nuclei (VB), SI, and SII areas. Neurons that can be considered as local oscillators in the SA, PC and mostly RA ranges exist in SI and SII areas of primates. The high percentage of posterior SII oscillators and the grouping of oscillators with frequencies that correspond to the three sub-modalities (FIG. 11) suggest an important role for SII in temporal decoding of textures. In fact, it has been shown that lesions in SII of primates significantly impair tactile texture decoding. Furthermore, the direct motor connections of SII to the primary motor cortex (MI) would facilitate participation of SII in a basic sensory-motor loop, such as the one described by the AVC loop.

Experimental data are consistent with (i.e., can be explained by) the NPLL model and are more consistent with the NPLL model than with other models.

Data Consistent with NPLLs Functioning in the Tactile Thalamocortical System (i) The RA system employs amplitude limiting, uniform receptive fields, and temporal dispersions, all required for efficient thalamic phase detection as discussed above.

(ii) The RA pathway exhibits a high degree of phase-locking that preserves the temporal information up to the thalamus, as also noted previously.

(iii) The mechanoreceptors and their fibers act as band-pass filters; that is, they emphasize a certain range of the input frequency spectrum (Johansson et al. 1982; Freeman and Johnson, 1982; Goodwin et al. 1989), as required for efficient NPLL decoding.

(iv) The reciprocal connections between the thalamus and cortex are modality- and somatic-specific (Jones, 1986; Doetsch et al. 1988; Hoogland et al. 1987).

(v) The circuitry required for the function of thalamocortical ePLLs and iPLLs exists in mammals (Jones, 1986; White and Keller, 1987; Agmon and Connors, 1992).

(vi) Thalamic relay neurons are activated with short EPSPs from afferent projections and long EPSPs from cortical inputs (Deschenes et al. 1984), an arrangement that facilitates thalamic PD operation (vii) Oscillating frequencies of SI neurons can be controlled locally (Silva et al. 1991; Amitai, 1994; Ahissar et al. 1996).

(viii) Two successive stimuli to the same location on the skin are not differentiable for delays between 0 to 15–40 ms (Rosner, 1961), consistent with a NPLL-like mechanism that 'samples' the input using RA-range frequencies, (ix) Talbot et. al. (1968) suggested the existence of a central mechanism that "alters its own activity (which "measures") the dominant period in the input train of impulses." The NPLL, by altering its own activity (the RCO's frequency), can 'measure' the dominant input period.

Data that Support NPLLs in the Tactile Thalamocortical System (i) Local oscillators in SI of monkeys (Lebedev and Nelson, 1995) and of anesthetized rats and guinea pigs (Ahissar et al. 1996) can be entrained by oscillatory tactile stimuli when the input frequency is close to the local frequency.

(ii) When vibratory stimuli are applied within series of decreasing intensities, minimal detection thresholds were consistently slightly lower than during series of increasing intensities (Talbot et al. 1968). While this result cannot be explained by neural mechanisms involving adaptation or habituation, it is easily explained by NPLL-like mechanisms: A minimal input intensity is required to lock-in the NPLL (increasing series), but once the NPLL is locked (decreasing series), less input intensity is necessary to keep it locked, since the local oscillators already fire in phase with the input.

(iii) A qualitative coding transformation, from temporally-oriented at the thalamus (Sinclair et al. 1991) to rate-oriented at the cortex (Sinclair and Burton, 1991) appears to occur at the thalamocortical level of monkeys performing a texture discrimination task. The gradual nature of the cortical responses is more consistent with the NPLL, then with alternative open-loop mechanisms producing labeled-line coding.

Data Consistent with Inhibitory NPLLs (i) There is evidence " . . . that presumed inhibitory interneurons in the cat SI could be activated first by thalamic inputs among cortical neurons and set to inhibit the output cells . . . " (Yamamoto et al. 1988; p. 199).

(ii) Activities of local oscillators in SI of the behaving monkey are often inhibited by vibrotactile stimuli (Lebedev and Nelson, 1995).

(iii) Local oscillators in SI of the rat receive strong inhibitory input (Chagnac-Amitai and Connors, 1989).

(iv) With SII neurons of cats, firing in phase with a vibratory stimulus is impaired when GABA receptors are blocked (Alloway et al. 1988). This is consistent with cortical phase-locking being achieved by inhibitory NPLL circuits.

(v) In response to thalamic (VB) stimulation, corticothalamic neurons in SI of cats exhibit inhibitory postsynaptic potentials (Landry and Dykes, 1985). Synaptic excitation is also observed in some of these neurons, which suggests a combination of ePLLs and iPLLs.

(vi) Somatosensory cortical neurons of rats have been classified according to whether they are co-activated with fast (~20 Hz) EEG waves (CoE cells) or not (CoI cells) (Angel, 1983). CoE neurons exhibit rhythmic firing around 20 Hz, dominate the EEG when CoI neurons are quiet, respond to peripheral inputs with longer latencies then CoI neurons, and activate thalamic (reticular) cells with a shorter latency then CoI neurons do. All of these phenomena are consistent with CoE functioning as RCO neurons and with CoI functioning as inhibitory interneurons (INH).

(vii) About 25% of the SI neurons of the monkey exhibit a sharp positive sigmoidal dependency on the spatial period (Sinclair and Burton, 1991; see also Darian-Smith et al. 1982), as expected by iPLLs (see FIG. 6). Negative sigmoidal dependency, as predicted by ePLLs, was not observed.

Summary of Experimental Evidence

Experimental data indicate that, under some conditions, operation of a NPLL-like mechanism is feasible at the thalamocortical level of mammalian tactile systems. In this system, current data favor the existence of iPLLs over ePLLs, although combined operation of both implementations has been indicated. If such NPLLs exist, they should function in parallel to other, non-temporal, decoding mechanisms.

Interactions with Other Tactile Mechanisms

If NPLL circuits do exist in the brain it is likely that (i) they do not exist as isolated circuits and (ii) they operate in parallel with other, temporal and non-temporal decoding mechanisms. In fact, it has been shown that some spatial features are most efficiently resolved by the SA system, and this resolution appears to occur without significant dependency on temporal parameters. Researchers have suggested that both "spatial" (involving the SA system) and "non-spatial" (involving the RA system) mechanisms underlie texture perception; the RA system probably encodes the microscopic dimensions and the SA the macroscopic dimensions of the texture. Similarly, it is likely that NPLL circuits are embedded in and intermingled with other circuits, and that, as a whole, these circuits function as a texture analyzer. Within such embedded and intermingled circuits, operations that obey NPLL principles should occur in parallel to other operations that obey other principles. Other possible operations could be purely spatial, such as spatial variation detection, or spatio-temporal, such as cross-coincidence detection among parallel phase-preserved input signals. In real time, the adaptive brain can emphasize one or another operation, according to the task at hand and previous experience. Thus, NPLL circuits, which probably occur predominantly in the RA system, can decode temporal information related to the pattern, i.e., to the fine details of the surface, while spatial mechanisms, which utilize predominantly the SA system, can decode rate-encoded information related to the macroscopic details, e.g., the roughness or shape, of textures. In addition, SA-based intensity mechanisms can refine pattern perception by using detailed spatial information, and NPLL circuits can refine roughness perception by using fine temporal information.

APPENDIX

A.1 Temporally- and Rate-encoded Neuronal Signals

Any spike train that consists of N spikes of a single neuron can be described as (FIG. 1a):

$$s(t) = \sum_{n=0}^{N-1} S(t - \eta(n)) \tag{1.1}$$

where S (t') describes a single spike triggered at t'=0 (FIG. 1a, inset), and η(n) describes the series of spike timings:

$$\eta(n) = \eta(0) + nT + M(n) = \eta(0) + nT + \sum_{j=1}^{n} m(j), \quad n > 0 \tag{1.2}$$

where T is the average ISI; M(n) is the "absolute" modulation of T for the n-th spike and represents the deviation of the timing of the n-th spike from the expected timing of the n-th spike of the equivalent ideal oscillator having the same T; and m(n) is the "cycle modulation" and represents the deviation of the n-th ISI from T. By definition, the total modulation over the whole spike train should be zero $$\left[ M(N) = \sum_{j=1}^{n} m(j) = 0 \right].$$

For an ideal oscillator, M(n)=m(n)=0 for every n. The instantaneous ISI is (see FIG. 1a):

$$I(n)=\eta(n)-\eta(n-1)=T+m(n), n>0 \tag{1.3}$$

$$\eta(n) = \eta(0) + \sum_{j=1}^{n} I(j), \quad n > 0 \quad (1.4)$$

It is assumed, as a convention, that the spike train was not modulated prior to n=0, therefore:

$$I(O)=T; \; m(o)=0; \; m(j)=0, j<0 \quad (1.5)$$

The information carried by the spike train is described by T and m. Generally speaking, the information carried by T and by m could be referred to as "rate-encoded" and "temporally-encoded", respectively, since T is a measure of the average firing rate over the whole period and m is a measure of the fine temporal modulations within that period.

Figure 1B:
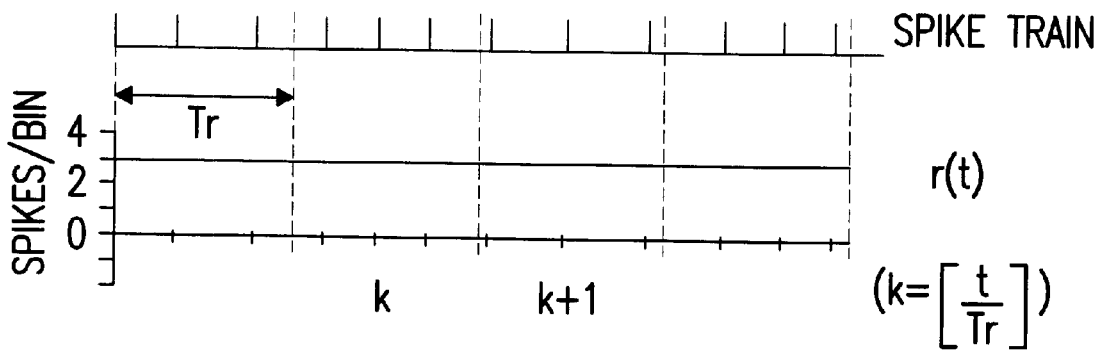
FIG. 1b shows waveforms which illustrate rate encoding of an input pulse train.

A description of a signal by rate requires the division of a spike train into rate-bins, with each rate-bin being represented by a single number (see "Introduction"). Each of these single numbers can be evaluated by a variety of functions, ranging from a simple spike count to a weighted average that utilizes a postsynaptic filter function. Herein, rate-encoded signals will be represented by simple spike counts over each rate-bin. If other measurements are required, the spike-count terms [e.g., A(k) in (1.6)] should simply be replaced with other terms. Thus, a spike train can be described by a series of counts of spikes, where each count corresponds to a single rate-bin (FIG. 1b):

$$R_x(t) = \sum_{k=0}^{N_r-1} A(k) R(t - kT_r) \quad (1.6)$$

where $T_r$ is the rate-bin, R(t') is a pulse function that equals 1 for $0<t'<T_r$ and 0 otherwise (FIG. 1b, inset), A(k) is the spike count of the neuron at the k-th rate-bin, and $N_r$ is the number of rate-bins in the spike train.

For simplicity, negative 'firing rates' will be ascribed to inhibitory inputs. Thus, a rate signal is defined as the difference between the count of spikes leading to EPSPs and the count of spikes leading IPSPs. For example, a single excitatory cell can produce only positive rate values while a single inhibitory cell can produce only negative rate values.

Two kinds of population rate coding are considered here: population sum, which, per each rate-bin k, is the sum of all $A_i$ (k) and population vector, which, per each rate-bin k, is the array of all $A_i$ (k).

A.2 Phase-locked Loop
A.2.1 Rate-Controlled Oscillator
The RCO's output signal is:

$$s_o(t) = \sum_{n=0}^{N-1} S(t - \eta_o(n)) \quad (2.1)$$

where $$\eta_o(n) = \eta_o(0) + nT_c + M_c(n) \quad (2.2)$$

$T_c$ is the RCO's intrinsic period, i.e., its ISI when it receives no input, and $M_c$ (n) is the n-th spike's absolute modulation [see (1.2) and (1.3) for other related definitions]. The ISI (the "cycle") of the RCO is controlled by its input in the following way:

$$I_o(n)=T_c+g_o(R_d(n)) \quad (2.3)$$

where $g_o$, in the general case, is a monotonic decreasing or a monotonic increasing function, $g_o(0)=0$, and $R_d(n)$ is the input to the RCO integrated over the interval preceding spike n, i.e., during $I_o(n)$ (see FIG. 1 and 2.2.2). In neuronal implementations $g_o$ will probably always be a decreasing function in which the more positive (excitatory) the oscillator's input is, the sooner the oscillator will fire its next spike, and vice versa for more negative (inhibitory) inputs.

The average value of $R_d(n)$ is not necessarily, and usually will not be, 0. Therefore, $T_c$ will not necessarily equal the average ISI of the RCO. To be consistent with (1.3), for any given "decoding period", $R_d(n)$ will be described as being composed of two components: a DC component, i.e., the average value, $R_{dc}$, and an AC component, i.e., the residual modulations, $R_{ac}$ (n):

$$R_d(n)=R_{dc}+R_{ac}(n) \quad (2.4)$$

and the average ISI of the RCO, $T_o$, will be:

$$T_o=T_c+<g_o(R(_n))> \quad (2.5)$$

where <x> is the average value of x over the described decoding period. Thus, the output timings of the RCO can be rewritten as:

$$\eta_o(n) = \eta_o(0) + nT_o + M_o(n) = \eta_o(0) + nT_o + \sum_{j=1}^{n} m_o(j), \quad (2.6)$$

$$n > 0$$

For a linear $g_o$:

$$<g_o(R_d(n))>=g_0(R_{dc}) \quad (2.7)$$

and the instantaneous ISI is [from (1.3), (2.3) and (2.5)]:

$$I_o(n)=T_o+g_o(R_{ac}(n)) \quad (2.8)$$

A.2.2 Phase Detector
The PD's output, $R_d(n)$, is a rate-encoded signal, which is a function of the difference between the arrival times of the PD's two inputs:

$$R_d(n+1)=g_d(\eta_o(n)-n_i(n)) \quad (2.9)$$

where $g_d$ is a monotonic increasing or a monotonic decreasing function. The difference $\eta_o(n)-(n)$ is simply the difference between the times of appearance of the n-th spikes of the RCO and the NPLL's input, where n is counted only within a locked state, i.e., when the RCO's and the input's spikes are "paired". With neuronal implementations, $g_d$ probably cannot achieve a strict monotonic shape, but rather will assume a staircase-like form. There will be ranges of phase difference within which the PD will produce a constant output. The size of these ranges determines the PD's resolution (see 2.2.1), and hence, also the NPLL's resolution.

A.2.3 The Loop Gain
The ability of the NPLL to be locked to the input depends on the loop's functioning as a negative feedback loop. In such a negative feedback loop, any deviation of the input from its expected frequency will produce an error signal ($R_{ac}$) that will drive the RCO's frequency in the direction that will reduce the error, i.e., in the same direction as the input's deviation. To provide a negative feedback, the gain along the loop during one cycle, referred to as the "loop gain", should be negative. The loop gain, G, is computed per a "working point", e.g., the crossing point in FIG. 2b, assuming a constant input. It is equal to the gain of a small perturbation from the working point that is obtained after one cycle and is approximately (exactly for a linear system):

$$G \approx g_o' g_d' \quad (2.10)$$

where, with continuous g0 and $g_d$, $g_o'$ and $g_d'$ are the derivatives of $g_o$ and $g_d$, respectively, at the working point. With discrete $g_o$ or $g_d$, $g_x'$ equals $\Delta y/\Delta x$, where $\Delta y$ is the output change generated by a minimal input change ($\Delta x$). The NPLL will be stable only if any deviation from a working point, generated within the loop while the input is constant, will be attenuated at the next cycle. A perturbation will be canceled at the next cycle if G=−1, will be attenuated if −1<G<0, and will be inverted and attenuated if −2<G<−1. Outside this range any perturbation will increase in absolute magnitude with each successive cycle. Thus, a necessary, although not sufficient, requirement for a stable NPLL is:

$$-2 < G < 0 \quad (2.11)$$

Figure 2B:
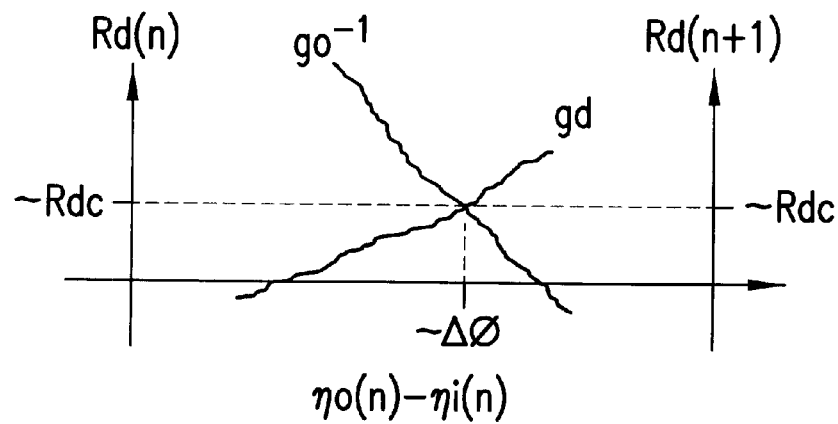

Therefore, to keep a NPLL stable $g_d$ and $g_o$ must have opposite slopes around the working point (see, for example, FIG. 2b). A range within which input modulations can be decoded is defined as a "working range" of the NPLL. This range is determined by (2.11), the dynamic range of the RCO and the input average frequency.

A.3 Tracking

For clarity, consider an "ideal NPLL", in which the derivatives of $g_d$ and $g_o$ are constant (equal to $k_d$ and $k_o$, respectively), G=−1, the RCO fires single spikes per cycle and there is no noise. Suppose the input to the NPLL (hereafter "the input") is:

$$s_i(t) = \sum_{n=0}^{N-1} S(t - \eta_i(n)), \quad I_i(n) = T_i + m_i(n), \quad n > 0 \quad (3.1)$$

and $$m_i(n) = 0, \quad n < o$$

When the loop is locked, there is one and only one RCO spike is per each input spike. If the input is not modulated, i.e., perfectly periodic, the timings of the RCO's spikes will differ from the input spikes only by a constant time delay (phase shift):

$$\eta_o(n) = \eta_n(n) + \Delta\phi \quad (3.2)$$

where $\Delta\phi$ is a constant time difference and n is the index of the input cycle. And $$I_o(n) = I_i(n) \quad (3.3)$$

When the input is temporally modulated, the modulation is detected by the PD, which detects the difference between the expected $\eta_i(n)$ ["stored" as $\eta_o(n)$] and the actual timing. The detected difference corrects the RCO's frequency so that the latter matches the input frequency. However, this correction will take place only at the following cycle (n+1):

$$I_o(n) = I_i(n-1) \quad (3.4)$$

and from (1.3):

$$T_o + m_o(n) = T_i + m_i(n-1) \quad (3.5)$$

By definition, $T_o$ is the average ISI of the RCO, and, as long as the loop is locked, it is equal to the average input ISI, $T_i$:

$$T_o = T_i \quad (3.6)$$

and, therefore $$m_o(n) = m_i(n-1) \quad (3.7)$$

Thus, the input modulation is replicated by the RCO's modulation, with one cycle lag.

The average periods, $T_o$ and $T_i$, are defined de-facto for every decoding period. Thus, the NPLL does not 'know' the exact values for these averages during the decoding, and a decomposition of its output signal to the different components will fit the above definitions only at the end of the decoding period. However, this is only with regard to the observer's interpretation of the decoding process and does not affect the process itself, since the decoding utilizes the actual timings [$n_i(n)$] of the signals.

A.4 Decoding

It can be shown that with ideal NPLLs $$R_{dc} = g_d(\Delta\phi) \quad (4.1)$$

$$R_{ac}(n+1) = -g_d(m_i(n)) = g_o^{-1}(m_i(n)) \quad (4.2)$$

$$\Delta\phi\Delta\phi = T_c T_i + \phi_m \quad (4.3)$$

$\Delta\phi$ is the average phase difference and, together with $R_{dc}$, determines the NPLL's working point (see FIG. 2b). $\phi_m$ is a constant delay that depends on the implementation (e.g., A.6).

If $g_d$ or $g_o$ is not linear, the AC component will depend on the DC component, i.e., on the working point. However, since $g_d$ (and $g_o^{-1}$) is monotonic $R_d(n)$ is unique (within the resolution limits) for every input. When G≠−1, the above solutions are the steady-state solutions that are obtained after a variable number of cycles, depending on G.

Using minimal rate-bin (=$T_i$), the output of the ideal NPLL is (see [(1.6)]

$$R_d(t) = g_d(T_c - T_i + \phi_m) - \sum_{n=0}^{N-1} [g_d(m_i(n-1))R(t - nT_i)] \quad (4.4)$$

Readout mechanism that employ longer rate-bins should sample, or integrate the PLL's output.

A.5 PD Implementations

A single neuron PD. The working range of such a PD is determined by the effective widths of its inputs, i.e., the maximal delay from an onset of an EPSP in which, if an EPSP from the other input is added, the membrane voltage will cross the threshold. For similar inputs whose (EPSP amplitude)/(threshold distance)=A $$T_w = \tau \ln (A/(1-A)) \quad (5.1)$$

Assuming τ=10 ms is the decay time constant, if A=0.8, the working range ($T_w$) is almost 14 ms, and if A=0.9, it is about 22 ms.

Population PDs ePLL

Within the working range of the ePLL ($T_{we}$, FIG. 4d):

$$R_d(n+1) = R_{max} + k_d[\eta_o(n) - \eta_i(n)], \quad k_d > 0 \quad (5.2)$$

Since $g_o$ is monotonic decreasing, G<0 and the basic algorithm can be implemented straight forwardly by the circuit denoted by the dashed lines in FIG. 3a. With the PD implementation of FIG. 4d, the average delay is $$\Delta\phi = T_c - T_i - R_{max}/k_d \quad (5.3)$$

iPLL
Within the working range of the iPLL ($T_{wi}$, FIG. 4d);

$$R_d(n+1) = R_{max} - k_d[\eta_o(n) - \eta_i(n)], \; k_d > 0 \quad (5.4)$$

In this case, G<0 because of the inhibitory neurons (INH) that are added to the loop (FIG. 3a, solid lines). The average delay for the FIG. 4d iPLL implementation is $$\Delta\circledR = T_c - T_i + R_{max}/k_d \quad (5.5)$$

The NPLL's output, in both the excitatory and inhibitory implementations, is a population output.

A.6 Tactile Signals

It is assumed that for any given scanning direction, all ridges have the same width. Textures consisting of a collection of such ridges can be described, along any one-dimensional direction, in a discrete form by:

$$u_i(x) = \sum_{n=0}^{N} A_i(n) U[x - \xi_i(n)] \quad (6.1)$$

where U(x') describes a single ridge at x'=0 with a unit height, $A_i(n)$ is the height of the n-th ridge, and $\zeta_i(n)$ describes the location of the n-th ridge:

$$\xi_i(n) = \xi_i(0) + nX_i + P_i(n) = \xi_i(0) + nX_i + \sum_{j=0}^{n} p_i(j); \quad (6.2)$$

$$G_i(n) = X_i + p_i(n)$$

where $X_i$ is the average spatial period, $P_i(n)$ is the 'absolute' modulation of this period for the n-th ridge, $p_i(n)$ is the cycle modulation and Gi(n) is the inter-ridge-interval (see A.1). If a mechanoreceptor response in a 1:1 manner, then for a constant finger velocity, V, the sensory transformation is simply:

$$\eta_i(n) = \zeta_i(n)/V, \eta_i(0) = \eta_i(0) = 0 \quad (6.3)$$

and similar relationships hold for the signals' components:

$$T_i = X_i/V; \; I_i(n) = G_i(n)/V; \; m_i(n) = p_i(n)/V \quad (6.4)$$

A.7 Tactile Decoding

With ideal NPLLs, minimal rate-bins (=$T_i$) and constant finger velocity, the two output components [see (4.4) and (6.4)] are:

$$R_{dc}(t) = g_d(T_c - X_i(t)/V(t) + \phi_m) \quad (7.1)$$

$$R_{ac}(t) = -\sum_{n=0}^{N-1} [g_d(p_i(n-1)/V(t))R(t - nT_i)] \quad (7.2)$$

where $\phi_m$ is an implementation specific delay.

A.8 Automatic Velocity Control

Suppose the desired working point is $T_{cw}$, then the requirement is that:

$$X_i(t)/V(t) = T_{cw}, \; dx = V(t)dt \quad (8.1)$$

and $$V(t) = X_i(t)/T_{cw} \quad (8.2)$$

is the finger velocity that the AVC should produce. The AVC is a servo-regulating loop (FIG. 10) whose controlled variable, $T_i(t)$, should be kept constant. The loop equations are:

$$V(t) = g_v(R_{max} - R_{dc}(t)) + V_{other} \quad (8.3)$$

$$R_{dc}(t) = g_{p11}(T_i(t) - T_c) \quad (8.4)$$

where $g_{p11}$ and $g_v$ are the NPLL's and VC's transfer functions, respectively (FIG. 10b), $R_{max}$ is the maximal possible $R_{dc}(t)$, $V_{other}$ is the velocity additive component caused by the "Other velocity control," and $T_c$ is the NPLL's intrinsic frequency (see appendix A.2).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A neuronal component, comprising:
    an input element for receiving an input signal including a sequence of pulses which are temporally modulated;
    an output element for providing an output which is phase locked to said input signal;
    at least one first neural network element configured as a phase detector having first and second inputs for receiving temporally modulated signals, and an output for supplying a signal having a firing rate which is a function of a time difference between said temporally modulated signals, said first input being connected to receive said input signal, and said output of said at least one neural network element being connected to said output element; and
    at least one second neural network element configured as a rate controlled oscillator having an input connected to said output of said at least one first neural network element, and an output connected to said second input of said at least one first neural network element.

2. A neuronal component according to claim 1, comprising a plurality of said first and second neural network elements connected in parallel.

3. A neuronal component according to claim 2, wherein said first and second neural network elements are connected by diverging and converging pathways.

4. Apparatus for determining at least one of spatial location and movement of an object within a contact area, comprising:
    a tactual sensor array having a matrix of individual tactual sensors each detecting spatial information from objects in said contact area;
    means for causing said tactual sensor array to scan said contact area at at least one predetermined frequency and in at least one predetermined direction, whereby objects in said contact area trace at least one path across said matrix; and
    a processor for processing relative phase and frequency information contained in output signals from sensors in said matrix to determine spatial location and movement of said objects within said contact area;
    wherein said processor comprises a phase locked loop circuit comprised of neuronal network elements.

5. Apparatus according to claim 4, wherein said tactual sensor array scans with at least two frequencies, which are one of superimposed and time sequential.

6. Apparatus for determining at least one of spatial location and movement of an object within a contact area, comprising:
- a tactual sensor array having a matrix of individual tactual sensors each detecting spatial information from objects in a contact area;
- means for causing said tactual sensor array to scan said contact area at at least one predetermined frequency and in at least one predetermined direction, whereby objects in said contact area trace at least one path across said matrix; and
- a process for processing relative phase and frequency information contained in output signals from sensors in said matrix to determine spatial location and movement of said objects within said contact area, said processor comprising
- at least one phase detector having first and second inputs for receiving temporally encoded signals and an output for supplying a signal having a firing rate which is a function of a time difference of said temporally encoded signals, said first input being connected to receive said output signals from said tactual sensor array, and said output of said phase detector being connected to said output element; and
- at least one rate controlled oscillator having an input connected to said output of said phase detector and an output connected to said second input of said phase detector;
- wherein at least one of said at least one phase detector and said at least one rate controlled oscillator comprises a neural network component.

7. The signal processing device according to claim 6, wherein said neural network component comprises a neuronal simulator.

8. An object identification apparatus, comprising:
- a tactual sensor array having a matrix of individual tactual sensors each detecting spatial information from objects in a contact area;
- means for causing said tactual sensor array to scan said contact area at at least one predetermined frequency and in at least one predetermined direction, whereby objects in said contact area view trace at least one path across said matrix; and
- a processor for processing relative phase and frequency information contained in output signals from sensors in said matrix to identify an object within said contact area;
- wherein said processor comprises a phase locked loop circuit comprised of neuronal network elements.

9. The object identification apparatus according to claim 8, wherein said tactual sensor array scans with at least two frequencies, which are one of superimposed and time sequential.

10. An object identification apparatus, comprising:
- a tactual sensor array having a matrix of individual tactual sensors each detecting spatial information from objects in a contact area;
- means for causing said tactual sensor array to scan said contact area at at least one predetermined frequency and in at least one predetermined direction, whereby objects in said contact area trace at least one path across said matrix; and
- a processor for processing relative phase and frequency information contained in output signals from sensors in said matrix to identify an object within said contact area, said processor comprising
- at least one phase detector having first and second inputs for receiving temporally encoded signals and an output for supplying a signal having a firing rate which is a function of a time difference of said temporally encoded signals, said first input being connected to receive said output signals from said tactual sensor array, and said output of said phase detector being connected to said output element; and
- at least one rate controlled oscillator having an input connected to said output of said phase detector and an output connected to said second input of said phase detector;
- wherein at least one of said at least one phase detector and said at least one rate controlled oscillator comprises a neural network component.

11. A grip control apparatus, comprising:
- at least one finger adapted to contact an object within a contact area on a surface of said object;
- a tactual sensor array having a matrix of individual tactual sensors disposed on a tip of said finger and contacting said contact area of said object, for detecting spatial information characterizing surface features in said contact area;
- means for causing said sensor array to scan said contact area at at least one predetermined frequency and in at least one predetermined direction, whereby surface features in said contact area trace at least one path across said matrix;
- a processor for processing relative phase and frequency information contained in output signals from detectors in said matrix to determine movements of said objects; and
- means for regulating a force exerted on said contact area in response to an output of said processor;
- wherein said processor comprises a phase locked loop circuit comprised on neuronal network elements.

12. A grip control apparatus, comprising:
- at least one finger adapted to contact an object within a contact area on a surface of said object;
- a tactual sensor array having a matrix of individual tactual sensors disposed on a tip of said finger and contacting said contact area of said object, for detecting spatial information characterizing surface features in said contact area;
- means for causing said sensor array to scan said contact area at at least one predetermined frequency and in at least one predetermined direction, whereby surface features in said contact area trace at least one path across said matrix;
- a processor for processing relative phase and frequency information contained in output signals from detectors in said matrix to determine movements of said objects; and
- means for regulating a force exerted on said contact area in response to an output of said processor; said processor comprising
  - at least one phase detector having first and second inputs for receiving temporally encoded signals and an output for supplying a signal having a firing rate which is a function of a time difference of said temporally encoded signals, said first input being connected to receive said output signals from said tactual sensor array, and said output of said phase detector being connected to said output element; and
  - at least one rate controlled oscillator having an input connected to said output of said phase detector and an output connected to said second input of said phase detector;

wherein at least one of said at least one phase detector and said at least one rate controlled oscillator comprises a neural network component.

13. A neuronal signal processor comprising:

at least one neuronal phase detector comprising a neural component composed of a single layer of at least one neuron, a first and second input to each neuron in the single layer, and an output from each neuron in the single layer having a value that is one of an AND function and an OR function of its inputs, and at least one neuronal oscillator comprising a neural component being composed of a single layer of at least one neuron having an intrinsic oscillating frequency, a spiking input train to and a spiking output train from each neuron of the single layer of the neural component, where the rate of the spiking input train to each said neural component controls the oscillating frequency of the neuronal oscillator, said spiking input train to the neuronal oscillator being the output of the neuronal phase detector, and said spiking output train of said neuronal oscillator being one of the inputs to the neuronal phase detector.

14. A neuronal signal processor according to claim 13 wherein all outputs of the single layer of the at least one neuronal phase detector compose a vector the value of which is proportional to the phase difference between the first and second, inputs.

15. A neuronal signal processor according to claim 13 wherein the single layer of the at least one neuronal phase detector is composed of a plurality of neurons, and the first inputs to the plurality of neurons is differentially delayed to at least a portion of the plurality of neurons.

16. A neuronal signal processor according to claim 13 wherein the control of the oscillating frequency of the at least one neuronal oscillator is one of an excitatory and inhibitory control.

17. A neuronal signal processor according to claim 13 wherein the single layer neural of the at least one neuronal oscillator is composed of a plurality of neurons which are inter-connected.

18. A neuronal phase detector comprising a neural component composed of a single layer of at least one neuron, a first and second input to each neuron in the single layer, and an output from each neuron in the single layer having a value that is one of an AND function and an OR function of its inputs.

19. A neuronal phase detector according to claim 18 wherein all outputs of the single layer compose a vector the value of which is proportional to the phase difference between the first and second inputs.

20. A neuronal phase detector according to claim 18 wherein the single layer is composed of a plurality of neurons, and the first inputs to the plurality of neurons is differentially delayed to at least a portion of the plurality of neurons.

21. A neuronal oscillator comprising a neural component being composed of a single layer of at least one neuron having an intrinsic oscillating frequency, a spiking input train to and a spiking output train from each neuron of the single layer of the neural component, where the rate of the input spike train to each said neural component controls the oscillating frequency of the oscillator.

22. A neuronal oscillator according to claim 21 wherein the control is one of an excitatory and inhibitory control.

23. A neural oscillator according to claim 21 wherein the single layer is composed of a plurality of neurons which are interconnected.

24. A spatial encoding device comprising:

a sensor array having a matrix of individual sensors each detecting spatial information from objects in a field of view;

a controller controlling said sensor array to control scanning of said field of view at least at one predetermined frequency and in at least one predetermined direction whereby objects in said field of view trace a path across said matrix; and a processor for processing relative phase and frequency information contained in output signals from detectors in said matrix to determine spatial location and movement of said objects within said field of view;

wherein said processor includes a phase locked loop circuit comprised of at least one neuronal phase detector comprising a neural component composed of a single layer of at least one neuron, a first and second input to each neuron in the single layer, and an output from each neuron in the single layer having a value that is one of an AND function and an OR function of its inputs, and at least one neuronal oscillator comprising a neural component being composed of a single layer of at least one neuron having an intrinsic oscillating frequency, a spiking input train to and a spiking output train from each neuron of the single layer of the neural component, where the rate of the spiking input train to each said neural component controls the oscillating frequency of the neuronal oscillator, said spiking input train to the neuronal oscillator being the output of the neuronal phase detector, and said spiking output train of said neuronal oscillator being one of the inputs to the neuronal phase detector.

25. A spatial encoding device according to claim 24, wherein said sensor array is a video camera.

26. A spatial encoding device according to claim 25, wherein said video camera scans with at least two frequencies, which are one of superimposed and time sequential.

27. A spatial encoding device according to claim 24, wherein all outputs of the single layer of the at least one neuronal phase detector compose a vector the value of which is proportional to the phase difference between the first and second inputs.

28. A spatial encoding device according to claim 24, wherein the single layer of the at least one neuronal phase detector is composed of a plurality of neurons, and the first inputs to the plurality of neurons is differentially delayed to at least a portion of the plurality of neurons.

29. A spatial encoding device according to claim 24, wherein the control of the oscillating frequency of the at least one neuronal oscillator is one of an excitatory and inhibitory control.

30. A spatial encoding device according to claim 24, wherein the single layer neural of the at least one neuronal oscillator is composed of a plurality of neurons which are inter-connected.

31. A spatial encoding device comprising:

a sensor array having a matrix of individual sensors each detecting spatial information from objects in a field of view;

a controller controlling said sensor array to scan said field of view at least at one predetermined frequency and in at least one predetermined direction, whereby objects in said field of view trace a path across said matrix; and a processor for processing relative phase and frequency information contained in output signals from detectors in said matrix to determine spatial location and movement of said objects within said field of view, said processor comprising
- at least one neuronal phase detector comprising a neural component composed of a single layer of at least one neuron, a first and second input to each neuron in the single layer, and an output from each neuron in the single layer having a value that is one of an AND function and an OR function of its inputs, and
- at least one neuronal oscillator comprising a neural component being composed of a single layer of at least one neuron having an intrinsic oscillating frequency, a spiking input train to and a spiking output train from each neuron of the single layer of the neural component, where the rate of the spiking input train to each said neural component controls the oscillating frequency of the neuronal oscillator, said spiking input train to the neuronal oscillator being the output of the neuronal phase detector, and said spiking output train of said neuronal oscillator being one of the inputs to the neuronal phase detector.

32. A spatial encoding device according to claim 31, wherein all outputs of the single layer of the at least one neuronal phase detector compose a vector the value of which is proportional to the phase difference between the first and second inputs.

33. A spatial encoding device according to claim 31, wherein the single layer of the at least one neuronal phase detector is composed of a plurality of neurons, and the first inputs to the plurality of neurons is differentially delayed to at least a portion of the plurality of neurons.

34. A spatial encoding device according to claim 31, wherein the control of the oscillating frequency of the at least one neuronal oscillator is one of an excitatory and inhibitory control.

35. A spatial encoding device according to claim 31, wherein the single layer neural of the at least one neuronal oscillator is composed of a plurality of neurons which are inter-connected.

36. Apparatus for determining at least one of spatial location and movement of an object within a contact area, comprising:
- a tactual sensor array having a matrix of individual tactual sensors each detecting spatial information from objects in said contact area;
- a controller controlling said tactual sensor array to scan said contact area at least at one predetermined frequency and in at least one predetermined direction, whereby objects in said contact area trace at least one path across said matrix; and
- a processor for processing relative phase and frequency information contained in output signals from sensors in said matrix to determine spatial location and movement of said objects within said contact area; said processor comprising a phase locked loop circuit comprised of:
  - at least one neuronal phase detector comprising a neural component composed of a single layer of at least one neuron, a first and second input to each neuron in the single layer, and an output from each neuron in the single layer having a value that is one of an AND function and an OR function of its inputs, and
  - at least one neuronal oscillator comprising a neural component being composed of a single layer of at least one-neuron having an intrinsic oscillating frequency, a spiking input train to –and a spiking output train from each neuron of the single layer of the neural component, where the rate of the spiking input train to each said neural component controls the oscillating frequency of the neuronal oscillator, said spiking input train to the neuronal oscillator being the output of the neuronal phase detector, and said spiking output train of said neuronal oscillator being one of the inputs to the neuronal phase detector.

37. Apparatus according to claim 36 wherein all outputs of the single layer of the at least one neuronal phase detector compose a vector the value of which is proportional to the phase difference between the first and second inputs.

38. Apparatus according to claim 36 wherein the single layer of the at least one neuronal phase detector is composed of a plurality of neurons, and the first inputs to the plurality of neurons is differentially delayed to at least a portion of the plurality of neurons.

39. Apparatus according to claim 36 wherein the control of the oscillating frequency of the at least one neuronal oscillator is one of an excitatory and inhibitory control.

40. Apparatus according to claim 36 wherein the single layer neural of the at least one neuronal oscillator is composed of a plurality of neurons which are inter-connected.

41. Apparatus according to claim 36, wherein said tactual sensor array scans with at least two frequencies, which are one of superimposed and time sequential.

42. An object identification apparatus, comprising:
- a tactual sensor array having a matrix of individual tactual sensors each detecting spatial information from objects in a contact area;
- a controller for controlling said tactual sensor array to scan said contact area at least at one predetermined frequency and in at least one predetermined direction, whereby objects in said contact area view trace at least one path across said matrix; and
- a processor for processing relative phase and frequency information contained in output signals from sensors in said matrix to identify an object within said contact area;
- said processor comprising a phase locked loop circuit comprised of at least one neuronal phase detector comprising a neural component composed of
  - a single layer of at least one neuron, a first and second input to each neuron in the single layer, and an output from each neuron in the single layer having a value that is one of an AND function and an OR function of its inputs, and
  - at least one neuronal oscillator comprising a neural component being composed of a single layer of at least one neuron having an intrinsic oscillating frequency, a spiking input train to and a spiking output train from each neuron of the single layer of the neural component, where the rate of the spiking input train to each said neural component controls the oscillating frequency of the neuronal oscillator, said spiking input train to the neuronal oscillator being the output of the neuronal phase detector, and said spiking output train of said neuronal oscillator being one of the inputs to the neuronal phase detector.

43. The object identification apparatus according to claim 42, wherein said tactual sensor array scans with at least two frequencies, which are one of superimposed and time sequential.

44. The object identification apparatus according to claim 42, wherein all outputs of the single layer of the at least one neuronal phase detector compose a vector the value of which is proportional to the phase difference between the first and second inputs.

45. The object identification apparatus according to claim 42, wherein the single layer of the at least one neuronal phase detector is composed of a plurality of neurons, and the first inputs to the plurality of neurons is differentially delayed to at least a portion of the plurality of neurons.

46. The object identification apparatus according to claim 42, wherein the control of the oscillating frequency of the at least one neuronal oscillator is one of an excitatory and inhibitory control.

47. The object identification apparatus according to claim 42, wherein the single layer neural of the at least one neuronal oscillator is composed of a plurality of neurons which are interconnected.

48. A grip control apparatus, comprising:
- at least one finger adapted to contact an object within a contact area on a surface of said object;
- a tactual sensor array having a matrix of individual tactual sensors disposed on a tip of said finger and contacting said contact area of said object, for detecting spatial information characterizing surface features in said contact area;
- a controller for controlling said sensor array to scan said contact area at at least one predetermined frequency and in at least one predetermined direction, whereby surface features in said contact area trace at least one path across said matrix;
- a processor for processing relative phase and frequency information contained in output signals from detectors in said matrix to determine movements of said objects; and
- a regulator for regulating a force exerted on said contact area in response to an output of said processor;
- said processor comprising a phase locked loop circuit comprised of
  - at least one neuronal phase detector comprising a neural component composed of a single layer of at least one neuron, a first and second input to each neuron in the single layer, and an output from each neuron in the single layer having a value that is one of an AND function and an OR function of its inputs, and
  - at least one neuronal oscillator comprising a neural component being composed of a single layer of at least one neuron having an intrinsic oscillating frequency, a spiking input train to and a spiking output train from each neuron of the single layer of the neural component, where the rate of the spiking input train to each said neural component controls the oscillating frequency of the neuronal oscillator,
- said spiking input train to the neuronal oscillator being the output of the neuronal phase detector, and said spiking output train of said neuronal oscillator being one of the inputs to the neuronal phase detector.

49. A grip control apparatus according to claim 48 wherein all outputs of the single layer of the at least one neuronal phase detector compose a vector the value of which is proportional to the phase difference between the first and second inputs.

50. A grip control apparatus according to claim 48 wherein the single layer of the at least one neuronal phase detector is composed of a plurality of neurons, and the first inputs to the plurality of neurons is differentially delayed to at least a portion of the plurality of neurons.

51. A grip control apparatus according to claim 48 wherein the control of the oscillating frequency of the at least one neuronal oscillator is one of an excitatory and inhibitory control.

52. A grip control apparatus according to claim 48 wherein the single layer neural of the at least one neuronal oscillator is composed of a plurality of neurons which are interconnected.

53. Apparatus for determining at least one of spatial location and movement of an object within a field of view, comprising:
- an optical sensor device having a matrix of individual sensors each detecting spatial information from objects in a field of view;
- a controller for controlling said optical sensor device to scan said field of view at at least one predetermined frequency and in at least one predetermined direction, whereby objects in said field of view trace a path across said matrix; and
- a processor for processing relative phase and frequency information contained in output signals from detectors in said matrix to determine spatial location and movement of said objects within said field of view;
- said processor comprising a phase locked loop circuit comprised of
  - at least one neuronal phase detector comprising a neural component composed of a single layer of at least one neuron, a first and second input to each neuron in the single layer, and an output from each neuron in the single layer having a value that is one of an AND function and an OR function of its inputs, and
  - at least one neuronal oscillator comprising a neural component being composed of a single layer of at least one neuron having an intrinsic oscillating frequency, a spiking input train to and a spiking output train from each neuron of the single layer of the neural component, where the rate of the spiking input train to each said neural component controls the oscillating frequency of the neuronal oscillator,
- said spiking input train to the neuronal oscillator being the output of the neuronal phase detector, and said spiking output train of said neuronal oscillator being one of the inputs to the neuronal phase detector.

54. Apparatus for determining at least one of spatial location and movement of an object within a field of view according to claim 53 wherein all outputs of the single layer of the at least one neuronal phase detector compose a vector the value of which is proportional to the phase difference between the first and second inputs.

55. Apparatus for determining at least one of spatial location and movement of an object within a field of view according to claim 53 wherein the single layer of tie at least one neuronal phase detector is composed of a plurality of neurons, and the first inputs to the plurality of neurons is differentially delayed to at least a portion of the plurality of neurons.

56. Apparatus for determining at least one of spatial location and movement of an object within a field of view according to claim 53 wherein the control of the oscillating frequency of the at least one neuronal oscillator is one of an excitatory and inhibitory control.

57. Apparatus for determining at least one of spatial location and movement of an object within a field of view according to claim 53 wherein the single layer neural of the at least one neuronal oscillator is composed of a plurality of neurons which are interconnected.

58. A slip control apparatus, comprising:
- an optical sensor device having a matrix of individual sensors each detecting spatial information from objects in a field of view;

a controller for controlling said optical sensor device to scan said field of view at least at one predetermined frequency and in at least one predetermined direction, whereby objects in said field of view trace a path across said matrix; and a processor for processing relative phase and frequency information contained in output signals from detectors in said matrix to determine spatial location and movement of said objects within said field of view, said processor comprises a phase locked loop circuit comprised of at least one neuronal phase detector comprising a neural component composed of a single layer of at least one neuron, a first and second input to each neuron in the single layer, and an output from each neuron in the single layer having a value that is one of an AND function and an OR function of its inputs, and at least one neuronal oscillator comprising a neural component being composed of a single layer of at least one neuron having an intrinsic oscillating frequency, a spiking input train to and a spiking output train from each neuron of the single layer of the neural component, where the rate of the spiking input train to each said neural component controls the oscillating frequency of the neuronal oscillator, said spiking input train to the neuronal oscillator being the output of the neuronal phase detector, and said spiking output train of said neuronal oscillator being one of the inputs to the neuronal phase detector.

59. A slip control apparatus according to claim 58 wherein all outputs of the single layer of the at least one neuronal phase detector compose a vector the value of which is proportional to the phase difference between the first and second inputs.

60. A slip control apparatus according to claim 58 wherein the single layer of the at least one neuronal phase detector is composed of a plurality of neurons, and the first inputs to the plurality of neurons is differentially delayed to at least a portion of the plurality of neurons.

61. A slip control apparatus according to claim 58 wherein the control of the oscillating frequency of the at least one neuronal oscillator is one of an excitatory and inhibitory control.

62. A slip control apparatus according to claim 58 wherein the single layer neural of the at least one neuronal oscillator is composed of a plurality of neurons which are interconnected.

* * * * *